United States Patent
Ihara et al.

(10) Patent No.: US 11,765,468 B2
(45) Date of Patent: Sep. 19, 2023

(54) IMAGE PROCESSING DEVICE AND METHOD THEREOF, IMAGING ELEMENT, AND IMAGING DEVICE

(71) Applicant: SONY CORPORATION, Tokyo (JP)

(72) Inventors: Toshinori Ihara, Tokyo (JP); Takefumi Nagumo, Kanagawa (JP)

(73) Assignee: SONY CORPORATION, Tokyo (JP)

(*) Notice: Subject to any disclaimer, the term of this patent is extended or adjusted under 35 U.S.C. 154(b) by 574 days.

(21) Appl. No.: 16/975,368

(22) PCT Filed: Feb. 15, 2019

(86) PCT No.: PCT/JP2019/005570
§ 371 (c)(1),
(2) Date: Aug. 24, 2020

(87) PCT Pub. No.: WO2019/167673
PCT Pub. Date: Sep. 6, 2019

(65) Prior Publication Data
US 2020/0396381 A1  Dec. 17, 2020

(30) Foreign Application Priority Data

Mar. 1, 2018 (JP) ............... JP2018-036212

(51) Int. Cl.
*H04N 23/80* (2023.01)
*H04N 19/124* (2014.01)
*H04N 19/85* (2014.01)

(52) U.S. Cl.
CPC ........... *H04N 23/80* (2023.01); *H04N 19/124* (2014.11); *H04N 19/85* (2014.11)

(58) Field of Classification Search
CPC ...... H04N 19/117; H04N 19/82; H04N 19/85; H04N 19/124; H04N 23/80; H04N 23/90;
(Continued)

(56) References Cited

U.S. PATENT DOCUMENTS 6,744,929 B1   6/2004  Okada
2003/0179302 A1  9/2003  Harada et al.
(Continued)

FOREIGN PATENT DOCUMENTS

CN   102348074 A   2/2012
CN   104584551 A   4/2015
(Continued)

OTHER PUBLICATIONS

International Search Report and Written Opinion of PCT Application No. PCT/JP2019/005570, dated May 14, 2019, 09 pages of ISRWO.
(Continued)

*Primary Examiner* — Thomas R Cairns
*Assistant Examiner* — Johana Dumeng-Roman
(74) *Attorney, Agent, or Firm* — CHIP LAW GROUP

(57) ABSTRACT

The present disclosure relates to an image processing device and a method thereof, an imaging element, and an imaging device in which a signal value deviation generated through encoding and decoding of an amplified signal group can be restrained. Adaptive processing is executed on an image in which signal amplification has been executed, and the resultant image is encoded. For example, an offset value that is randomly set within a value range that depends on a gain value of the signal amplification executed on the image is added to each pixel value of the image, and then, the resultant image is encoded. The present disclosure is applicable to an image processing device, an image encoding device, an image decoding device, an imaging element, or an imaging device, for example.

19 Claims, 34 Drawing Sheets

(58) Field of Classification Search
CPC .... H04N 23/95; H04N 23/951; H04N 23/955; H04N 23/957; H04N 23/958; H04N 23/959
See application file for complete search history.

(56) References Cited

U.S. PATENT DOCUMENTS

| | | |
|---|---|---|
| 2011/0292247 A1 | 12/2011 | Gharavi-Alkhansari et al. |
| 2012/0099639 A1* | 4/2012 | Caster ................. H04N 19/17 |
| | | 375/E7.026 |
| 2012/0219231 A1 | 8/2012 | Gharavi-Alkhansari et al. |
| 2015/0222913 A1 | 8/2015 | Sato |
| 2015/0281539 A1 | 10/2015 | Ueki et al. |
| 2015/0358617 A1 | 12/2015 | Sato |
| 2018/0077416 A1* | 3/2018 | Hong ................... H04N 19/137 |
| 2018/0176577 A1* | 6/2018 | Puri ..................... H04N 19/196 |

FOREIGN PATENT DOCUMENTS

| | | |
|---|---|---|
| EP | 1111904 A2 | 6/2001 |
| JP | 11-098511 A | 4/1999 |
| JP | 2000-244922 A | 9/2000 |
| JP | 03-703436 B2 | 10/2005 |
| JP | 3703436 B2 | 10/2005 |
| JP | 2006-303689 A | 11/2006 |
| JP | 2014-103543 A | 6/2014 |
| WO | 2016/158402 A1 | 10/2016 |
| WO | 2017/145752 A1 | 8/2017 |

OTHER PUBLICATIONS

Office Action for CN Patent Application No. 201980015298.4, dated Jan. 30, 2022, 14 pages of English Translation and 10 pages of Office Action.

* cited by examiner

PHOTOGRAPH BLACK IMAGE WITH ×1.0 DIGITAL GAIN

DIGITAL GAIN IS INCREASED EIGHT-FOLD, COMPRESSION HAS NOT BEEN EXECUTED
8-digit CYCLE DIGITAL GAIN IS INCREASED EIGHT-FOLD, COMPRESSION HAS BEEN EXECUTED
ONLY +DIRECTION ERROR IS GENERATED, AND DC DEVIATION IS CAUSED

F I G . 4

| METHOD | MEANS | EFFECTS |
|---|---|---|
| #1 | CORRECT IMAGE BY RANDOM OFFSET AND EXECUTE ENCODING/DECODING SET OFFSET VALUE RANGE IN ACCORDANCE WITH DIGITAL GAIN | SUPPRESS DEVIATION OF QUANTIZATION ERROR SUPPRESS DC DEVIATION |
| #2 | SUBTRACT OFFSET FROM IMAGE IN ACCORDANCE WITH DIGITAL GAIN, EXECUTE ENCODING/DECODING, AND ADD OFFSET TO DECODED IMAGE IN ACCORDANCE WITH DIGITAL GAIN | SUPPRESS DEVIATION OF QUANTIZATION ERROR SUPPRESS DC DEVIATION |
| #3 | SET VALUE RANGE OF QUANTIZATION VALUE TO BE USED FOR ENCODING IN ACCORDANCE WITH DIGITAL GAIN | SUPPRESS REDUCTION IN ENCODING EFFICIENCY SUPPRESS INCREASE IN LOAD DUE TO ENCODING PROCESS |
| #4 | CANCEL (DIVIDE) DIGITAL GAIN, EXECUTE ENCODING/DECODING, AND MULTIPLY DECODED IMAGE BY DIGITAL GAIN | SUPPRESS DC DEVIATION SUPPRESS REDUCTION IN ENCODING EFFICIENCY SUPPRESS INCREASE IN LOAD DUE TO ENCODING PROCESS |

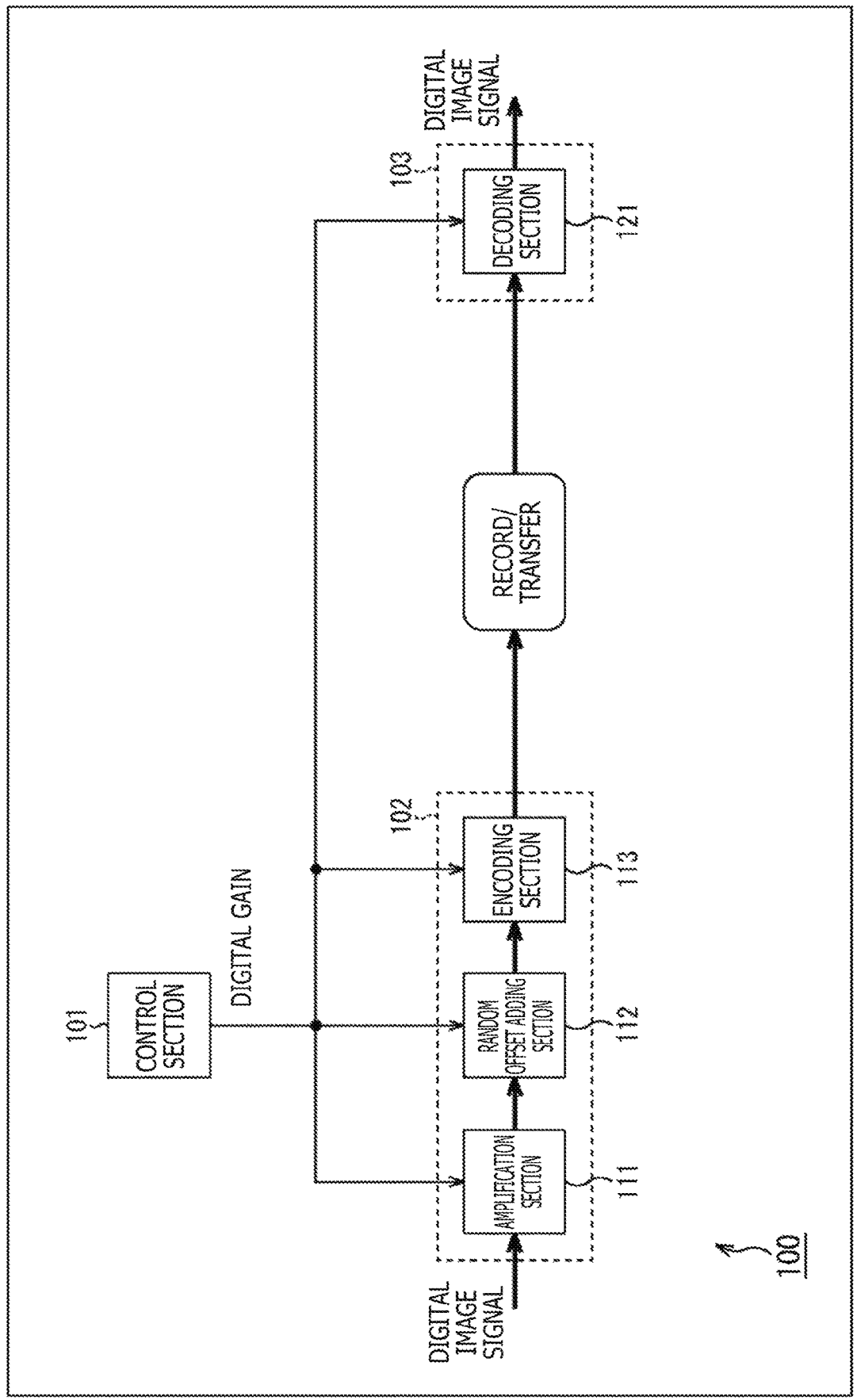

FIG. 8

```
if( gain %2 == 0 ){
    offset = ((int)rand % (2*gain) + 1)/2 - gain/2;
} else {
    offset = (int)rand % gain - gain/2;
}
```

FIG. 16

| AVERAGE PIXEL VALUE | MAXIMUM bit loss | | |
|---|---|---|---|
| | 2 | 3 | ... |
| ... | | | |
| 60 | -2 | 0 | |
| 61 | -3 | -1 | |
| 62 | 0 | -2 | |
| 63 | -1 | -3 | |
| 64 | -2 | -4 | |
| 65 | -3 | -5 | |
| 66 | 0 | -6 | |
| 67 | -1 | -7 | |
| 68 | -2 | 0 | |
| ... | | | |

FIG. 24

| DIGITAL GAIN | QUANTIZATION VALUE TO BE USED |
|---|---|
| LESS THAN 2.0 | 1~8 |
| AT LEAST 2.0 BUT LESS THAN 4.0 | 2~8 |
| AT LEAST 4.0 BUT LESS THAN 8.0 | 3~8 |
| ... | |

EXAMPLE OF SELECTING QUANTIZATION VALUE RANGE

IMAGE PROCESSING DEVICE AND METHOD THEREOF, IMAGING ELEMENT, AND IMAGING DEVICE

CROSS REFERENCE TO RELATED APPLICATIONS

This application is a U.S. National Phase of International Patent Application No. PCT/JP2019/005570 filed on Feb. 15, 2019, which claims priority benefit of Japanese Patent Application No. JP 2018-036212 filed in the Japan Patent Office on Mar. 1, 2018. Each of the above-referenced applications is hereby incorporated herein by reference in its entirety.

TECHNICAL FIELD

The present disclosure relates to an image processing device and a method thereof, an imaging element, and an imaging device, and particularly, relates to an image processing device and a method thereof, an imaging element, and an imaging device by which a signal value deviation generated through encoding and decoding of an amplified signal group can be restrained.

BACKGROUND ART

Various methods are conventionally proposed as methods for encoding (compressing) and decoding (decompressing) images. For example, a method for encoding (compressing) image data to a fixed length through DPCM (Differential Pulse Code Modulation) of image data sets and through addition of refinement data, is proposed (for example, see PTL 1).

CITATION LIST

Patent Literature

[PTL 1]
Japanese Patent Laid-Open No. 2014-103543

SUMMARY

Technical Problem

However, when a captured image obtained by high-digital gain imaging, which is for amplifying pixel signals by means of an imaging element or the like, is encoded and decoded by this method, a pixel deviation may occur in the decoded image.

The present disclosure has been arrived at in view of these conditions, and can restrain a signal value deviation which is generated through encoding and decoding of an amplified signal group.

Solution to Problem

An image processing device according to one aspect of the present technology includes an adaptive processing section that executes adaptive image processing of an image in which signal amplification has been executed, and an encoding section that executes simple encoding of the image having undergone the adaptive image processing executed by the adaptive processing section.

An image processing method according to the one aspect of the present technology includes executing adaptive image processing of an image in which signal amplification has been executed, and executing simple encoding of the image having undergone the adaptive image processing.

An imaging element according to another aspect of the present technology includes an imaging section that captures an image of a subject, an adaptive processing section that executes adaptive image processing of the captured image which has been generated by the imaging section and in which signal amplification has been executed, and an encoding section that executes simple encoding of the captured image having undergone the adaptive image processing executed by the adaptive processing section.

An imaging device according to still another aspect of the present technology includes an imaging element including an imaging section that captures an image of a subject, an adaptive processing section that executes adaptive image processing of the captured image which has been generated by the imaging section and in which signal amplification has been executed, and an encoding section that generates encoded data by executing simple encoding of the captured image having undergone the adaptive image processing executed by the adaptive processing section, and a decoding section that executes simple decoding of the encoded data generated by the encoding section.

In the image processing device according to the one aspect of the present technology, adaptive image processing is executed on an image in which signal amplification has been executed, and simple encoding of the image having undergone the adaptive image processing is executed.

In the imaging element according to the other aspect of the present technology, adaptive image processing is executed on a captured image which has been generated by capturing an image of a subject and in which signal amplification has been executed, and simple encoding of the captured image having undergone the adaptive image processing is executed.

In the imaging device according to the still other aspect of the present technology, adaptive image processing is executed on a captured image which has been generated by capturing an image of a subject and in which signal amplification has been executed, simple encoding of the captured image having undergone the adaptive image processing is executed, and simple decoding of the encoded data thus generated is executed.

Advantageous Effect of Invention

According to the present disclosure, images can be processed. In particular, a signal value deviation, which is generated through encoding and decoding of an amplified signal group, can be restrained.

BRIEF DESCRIPTION OF DRAWINGS

FIG. 4 is a diagram depicting a list of processing methods adopting the present technology.
FIG. 5 is a block diagram depicting a main configuration example of an image processing system for performing a method #1.

FIG. 8 is a diagram depicting an example of a syntax for imposing a limitation on the value range of an offset.

FIG. 16 is a diagram depicting an example of a table which is used for selecting an offset.

FIG. 24 is a diagram depicting an example of a table which is used for selecting the range of a quantization value.

DESCRIPTION OF EMBODIMENTS

Hereinafter, embodiments for carrying out the present disclosure (hereinafter, referred to as embodiments) will be explained. It is to be noted that the explanations will be given in accordance with the following order.
1. Fixed Length Encoding
2. General Concept (Outline of Methods)
3. First Embodiment (Details of Method #1)
4. Second Embodiment (Details of Method #2)
5. Third Embodiment (Details of Method #3)
6. Fourth Embodiment (Details of Method #4)
7. Fifth Embodiment (Application Example: Imaging Element)
8. Sixth Embodiment (Application Example: Imaging Device)
9. Supplementary Note 1. Fixed Length Encoding <Support Documents Etc. Supporting Technical Matters and Technical Terms>

The scope disclosed by the present technology encompasses not only the disclosure in the embodiments, but also the disclosures in the following documents which have been publicly known at the time of filing of the present application.

PTL 1: (see above)
PTL 2: Japanese Patent Laid-Open No. 2006-303689
PTL 3: US 2011/0292247
PTL 4: US 2012/0219231

That is, the disclosures in the above documents also constitute the grounds for determining the support requirements.

<High-Digital Gain Imaging>

Figure 1A:
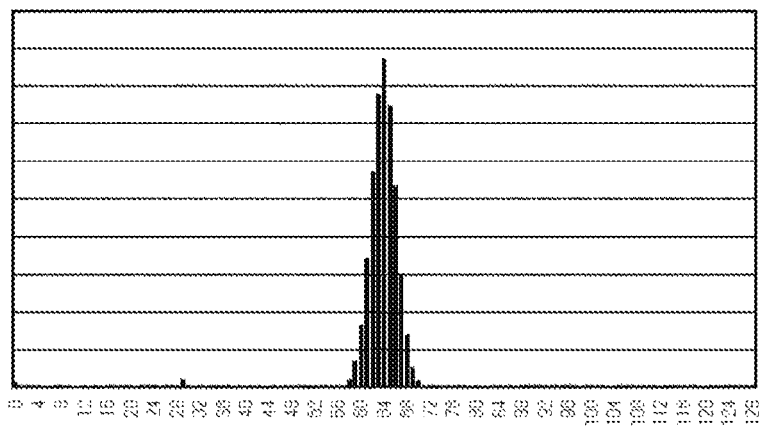
FIGS. 1A, 1B, and 1C are diagrams depicting a histogram of a captured image.

There is an imaging method called high-digital gain imaging of multiplying a captured image by a prescribed gain value in order to carry out imaging in a dark place, for example. A case in which a histogram in FIG. 1A is obtained from a captured image (e.g., a captured image that is obtained with a lens case left unremoved) that is obtained by capturing a black image, for example, is assumed. It is to be noted that, in the histogram illustrated in FIG. 1A, the horizontal axis indicates a pixel value while the vertical axis indicates a frequency (the number of pixels).

Figure 1B:
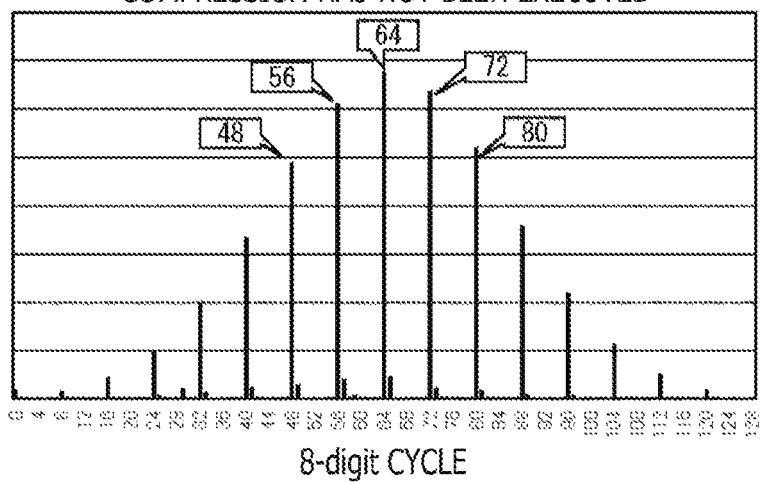

When this captured image is multiplied by a digital gain that is increased eight-fold in order to enhance the sensitivity, the difference among the pixel values of respective pixels is increased eight-fold. Therefore, the histogram of this image is widened, as illustrated in FIG. 1B. That is, the histogram which is dense in FIG. 1A is changed to be sparse in FIG. 1B in which the values are dispersed to multiples of 8, that is, 48, 56, 64, 72, 80, etc., for example.

<Generation of DC Deviation Through Encoding and Decoding>

Meanwhile, various methods have been conventionally proposed as methods for encoding (compressing) and decoding (decompressing) images. For example, a method for executing fixed length encoding (compression) of image data through DPCM (Differential Pulse Code Modulation) among image data sets and through addition of refinement data has been proposed, as disclosed in PTL 1 to 4.

Figure 1C:
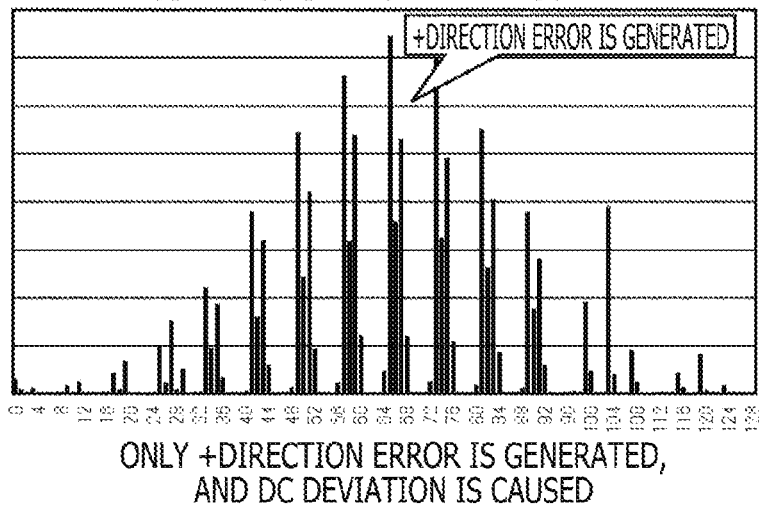

However, if a captured image obtained through the aforementioned digital gain imaging is encoded and decoded by this method, a histogram such as that illustrated in FIG. 1C, for example, is obtained for the decoded image. That is, errors in pixel values are generated only on the + direction side. Thus, there is a possibility that a deviation of an average pixel value in the decoded image (also referred to as DC deviation) is generated.

<Principle of Generation of DC Deviation>

Figure 2:
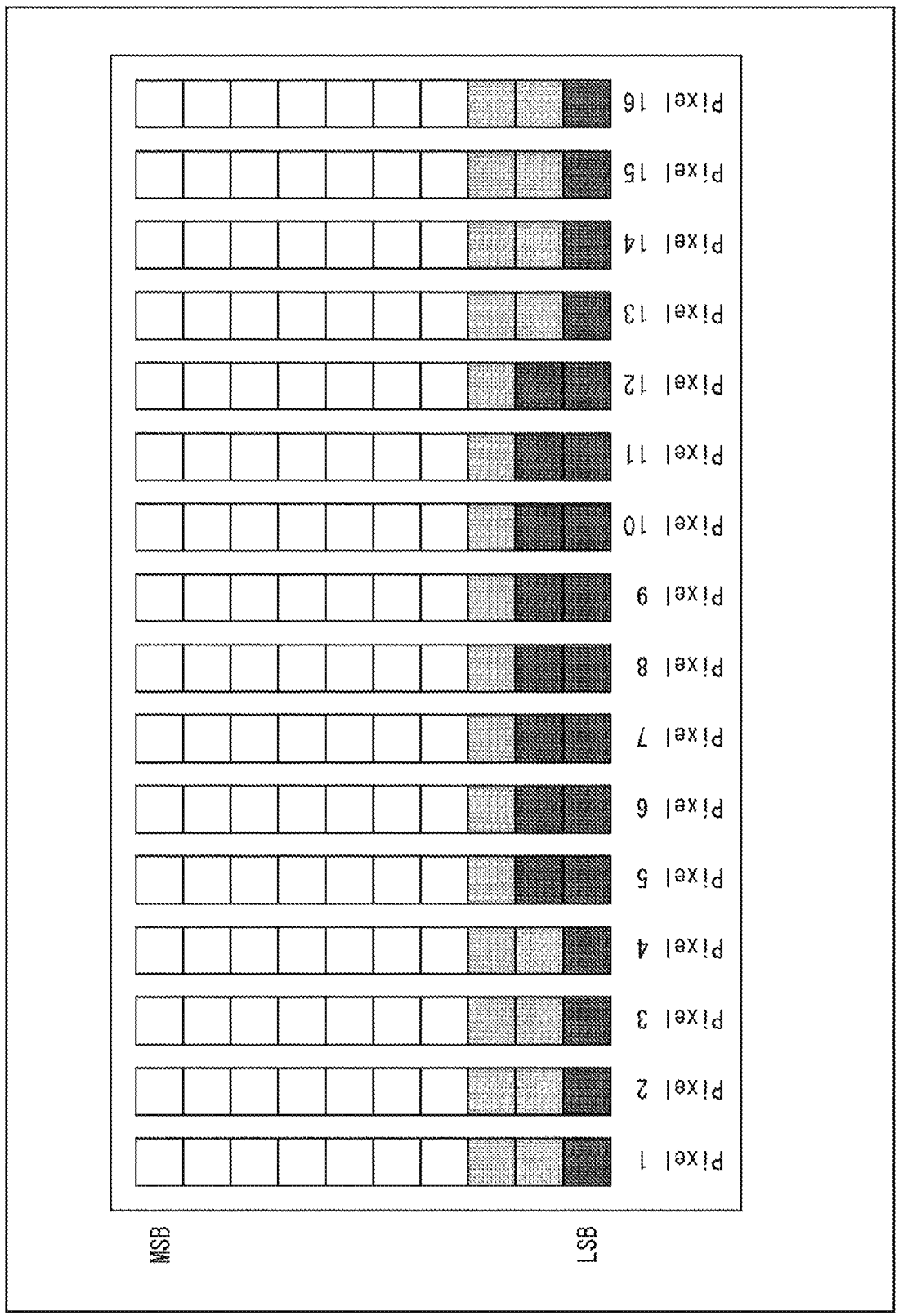
FIG. 2 is a diagram depicting an example of fixed length encoding.

Generation of DC deviation will be more specifically explained. First, the aforementioned fixed length encoding will be explained. FIG. 2 is a schematic diagram depicting image data including pixel blocks including 16 pixels (Pixels 1 to 16). Squares of each pixel in FIG. 2 represent bits of a pixel value. Each square illustrated on the top represents an MSB (Most Significant Bit), and each square illustrated on the bottom represents an LSB (Least Significant Bit). That is, each pixel value is 10-bit data.

The aforementioned fixed length encoding is executed for each of the blocks. First, each pixel value in a block is quantized, and a prescribed number of bits (lower bits) from the LSB are deleted. That is, only bits which are represented by white squares in FIG. 2 remain. Next, the difference of the quantized pixel value from that in the next pixel is calculated (DPCM is executed). The obtained differential value (DPCM residual) is encoded data.

More specifically, the pixel data in the block of FIG. 2 is processed in order from the left side to the right side in FIG. 2, for example. PCM (Pulse Code Modulation) encoding is executed on higher 7 bits (seven bits from the MSB) in pixel data to be processed first (the leftmost column in FIG. 2). That is, while being in an uncompressed state, higher 7 bits in pixel data to be processed first is outputted as encoded data. Then, DPCM (Differential Pulse Code Modulation) encoding is executed on pixel data to be processed second or later. That is, for higher 7 bits in the second or later pixel data from the left in FIG. 2, subtraction of higher 7 bits of the preceding (left side in FIG. 2) pixel data is executed, and the differential value therebetween is outputted as encoded data.

Then, in order to adjust the respective lengths of the encoded data to a fixed length, the difference (i.e., the amount of data shortage) between a prescribed data amount and the data amount of the encoded data at this time point is calculated, and the shortage amount of bits among the deleted lower bits is added (refinement is executed). In FIG. 2, light-gray squares represent bits that are added by the refinement.

To decode this encoded data, the bits added by the refinement are first extracted, and a DPCM differential value in higher bits is added in order from the right side. Thus, the higher bits in the pixel data are decoded. The extracted bits are added to the higher bits, and further, are subjected to inverse quantization. That is, the bits lost through encoding are replaced with prescribed values.

In other words, as a result of this encoding, information regarding bits represented by dark-gray squares in FIG. 2 is lost. That is, this fixed length encoding/decoding is executed in an irreversible way.

In such fixed length encoding and decoding, image data is encoded and decoded in a simpler way, compared to an encoding and decoding method such as AVC (Advanced Video Coding) or HEVC (High Efficiency Video Coding). Therefore, compared to AVC, HEVC, or the like, this fixed length encoding and decoding involve a lower load so that encoding and decoding can be executed at higher speed. In addition, downsizing can be easily achieved so that encoding and decoding can be executed at lower cost.

Such encoding is sometimes called simple encoding (or simple compression). Moreover, decoding corresponding to this simple encoding is sometimes called simple decoding (or simple decompression). Simple encoding is an image encoding technology for reducing a data transfer rate and a memory band. In simple encoding, data is encoded (compressed) to keep the subjective image quality at the same level. A compression rate of simple encoding is typically lower (for example, approximately 50%) than that of general-purpose encoding such as AVC in order to keep the subjective image quality at the same level.

In such simple encoding (simple compression) and simple decoding (simple decompression), a code amount is a fixed length. Accordingly, compared to a case where a code amount is variable, management of encoded data is easy. Consequently, management of encoded data in a DRAM, into which encoded data is recorded, for example, is also so easy that reading and writing can be executed at higher speed and the cost can be further reduced.

Also, in such simple encoding (simple compression) and simple decoding (simple decompression), blocks of image data are independently encoded and decoded. Accordingly, the entire of a picture can be encoded and decoded, and also only a part of a picture can be encoded and decoded. That is, in a case where only a part of a picture is encoded and decoded, encoding and decoding of unnecessary data can be inhibited so that more efficient encoding and decoding can be executed. That is, an unnecessary increase in an encoding and decoding load can be restrained so that the processing speed can be increased and the cost can be reduced.

Figure 3:
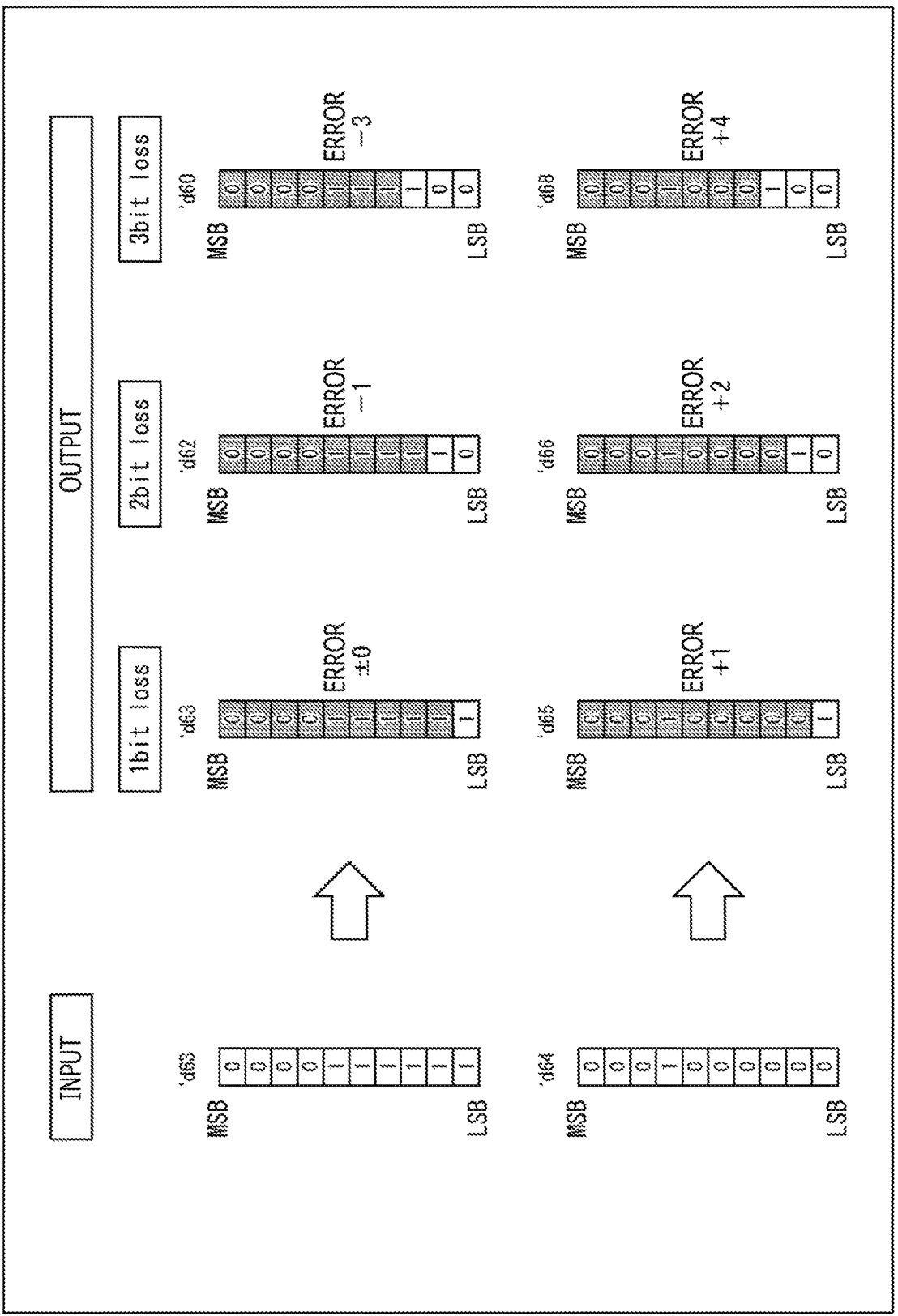
FIG. 3 is a diagram depicting an example of DC deviation.

As described previously, information (non-encoded bit) lost through (quantization and inverse quantization in) simple encoding and simple decoding is decompressed by an intermediate value during decoding (FIG. 3). For example, as depicted in FIG. 3, in a case where loss of a lower 1 bit is caused by quantization, "1" is set at the lower 1 bit during decoding. Also, in a case where loss of lower 2 bits is caused by quantization, "10 (=2)" is set at the lower 2 bits during decoding. Further, in a case where loss of lower 3 bits is caused by quantization, "100 (=4)" is set at the lower 3 bits during decoding.

When the non-encoded bits are decompressed by a prescribed value (e.g., intermediate value) in the aforementioned manner, an input-output error is generated. This error between an input pixel value and an output pixel value generated through quantization is also referred to as quantization error. For example, it is assumed that a pixel value (also referred to as input pixel value) of "63" (0000111111) is inputted, as depicted on the upper side in FIG. 3. In a case where loss of a lower 1 bit is caused by quantization, "1" is set at the lower 1 bit in the aforementioned manner, and a decompressed pixel value (also referred to as output pixel value) is "63" (0000111111). That is, in this case, the quantization error is "0."

Also, in a case where loss of lower 2 bits is caused by quantization, "10" is set at the lower 2 bits in the aforementioned manner, and thus, an output pixel value is "62" (0000111110). Therefore, the quantization error is "−1." In a case where loss of lower 3 bits is caused by quantization, "100" is set at the lower 3 bits in the aforementioned manner, and thus, an output pixel value is "60" (00001111100). Therefore, the quantization error is "−3."

Meanwhile, it is assumed that an input pixel value is "64" (0001000000), as depicted on the lower side in FIG. 3. In a case where loss of a lower 1 bit is caused by quantization, "1" is set at the lower 1 bit in the aforementioned manner, and thus, an output pixel value is "65" (0001000001). Therefore, the quantization error is "+1."

Also, in a case where loss of lower 2 bits is caused by quantization, "10" is set at the lower 2 bits in the aforementioned manner, and thus, an output pixel value is "66" (0001000010). Therefore, the quantization error is "+2." In a case where loss of lower 3 bits is caused by quantization, "100" is set at the lower 3 bits in the aforementioned manner, and thus, an output pixel value is "68" (0001000100). Therefore, the quantization error is "+4."

That is, the direction of a quantization error depends on an input pixel value. In contrast, in a case where a captured image is multiplied by a digital gain as described previously, a dense histogram as depicted in FIG. 1A is widened to become sparse according to the gain value, as depicted in FIG. 1B. As a result of this widening, many pixel values are converted to pixel values having quantization errors in the same direction. Therefore, there is a possibility that the direction of quantization errors is shifted toward one side. For example, in a case where many pixel values are distributed to multiples of 8, as depicted in FIG. 1B, the direction of quantization errors is shifted toward the + direction, as depicted in FIG. 1C.

When the direction in which quantization errors are generated is shifted toward one side, there is a possibility that the average value of an image (also referred to as decoded image) that is obtained by decompression of an encoded and decoded input image (captured image), is deviated from the average pixel value of the input image (DC deviation is generated).

When an average pixel value deviation (DC deviation) is generated, the subjective image quality of a decoded image is deteriorated (degraded) (that is, the visual difference between a decompressed image and an input image is increased). For example, when an average pixel value is shifted toward the + direction as in the above case, there is a possibility that the decompressed image is brighter than the input image.

Further, for example, in a case where an input image (captured image) is regarded as a measurement result (sensor data), there is a possibility that the data accuracy is deteriorated (data having lower accuracy is obtained). When the data accuracy is deteriorated, there is a possibility that an influence on subsequent processes (control, computation, etc.) using the decoded image (sensor data) is increased. For example, in a case where black-level setting is performed with a captured image (sensor data) obtained by imaging a black image as in the example in FIGS. 1A, 1B, and 1C, there is a possibility that a pixel value to be set to a black level is deviated due to the DC deviation.

It is to be noted that, when a captured image is multiplied by a digital gain, as described previously, the pixel value difference is increased according to the gain value. Consequently, the DPCM residual is increased so that there is a possibility that the encoding efficiency is deteriorated. Since this encoding is irreversible fixed length encoding as described previously, there is a possibility that deterioration in the encoding efficiency leads to deterioration (degradation) in the subjective image quality of a decoded image.

2. General Concept

<Adaptive Processing to Digital Gain>

To this end, adaptive image processing is executed on an image in which signal amplification has been executed, and simple encoding is executed on the image having undergone the adaptive image processing.

For example, an image processing device includes an adaptive processing section that executes adaptive image processing of an image in which signal amplification has been executed, and an encoding section that executes simple encoding of the image having undergone the adaptive image processing executed by the adaptive processing section.

As a result of this configuration, a signal value deviation (e.g., DC deviation), which is generated through encoding and decoding of a signal group amplified with a digital gain, can be restrained.

More specifically, as the adaptive image processing, any one of processes (any one of methods #1 to #4) described in a table in FIG. 4 is executed, for example.

For example, in the method #1, in a case where an image is multiplied by a digital gain, each pixel value of the image multiplied by the digital gain is corrected with a random offset, and then, the aforementioned simple encoding and simple decoding are executed. As a result of addition of the random offset, the pixel values can be diffused. In addition, the value range of the offset is set according to the gain value of the digital gain. As a result of this, diffusion of the pixel values caused by the offset can be limitedly set within a prescribed range that depends on the gain value.

Therefore, a sparse histogram in which pixel values are concentrated at a few values as in FIG. 1B, can be prevented so that the direction of quantization errors of the respective pixel values generated through simple encoding and simple decoding can be inhibited from being shifted toward one side. That is, DC deviation can be restrained.

Consequently, when the method #1 is used, deterioration in the subjective image quality of a decoded image can be restrained, for example. In addition, for example, in a case where an input image (captured image) is regarded as a measurement result (sensor data), deterioration in the data accuracy can be suppressed, and an influence on subsequent processes (control, computation, etc.) using the decoded image (sensor data) can be restrained. For example, in a case where black-level setting is performed with a captured image (sensor data) obtained by imaging a black image as in the example in FIGS. 1A, 1B, and 1C, the black level can be detected with higher accuracy.

Also, in the method #2, for example, in a case where an image is multiplied by a digital gain, an offset is subtracted from the image, simple encoding and simple decoding are executed, and the offset is added to the decoded image. As explained above with reference to FIGS. 1A, 1B, 1C, 2, and 3, the direction of a quantization error depends on a pixel value. In other words, there is a pixel value for which the quantization error is smaller than those of the other pixel values. Therefore, in a state where an offset is used to convert the pixel values of an image to values having small quantization errors, simple encoding and simple decoding are executed. The pixel values of a decoded image are restored to the respective original states. Accordingly, the quantization errors can be reduced. For example, in a case where a non-encoded bit is decompressed with an intermediate value, a pixel value is set to the intermediate value with use of an offset, and simple encoding and simple decoding are executed. In this case, the quantization error ideally becomes 0.

As explained above with reference to FIGS. 1A, 1B, and 1C, when an image is multiplied by a digital gain, the histogram is widened to include intervals according to the gain value (a sparse state is established). Further, in many pixels, quantization errors of the pixel values are generated toward the same direction. That is, the direction of quantization errors is shifted toward one side. However, when the offset is subtracted from each pixel value in the aforementioned manner, the quantization errors become small. As a result, shift of the quantization errors to the one side is lessened. That is, shift of the direction of quantization errors of pixel values generated through simple encoding and simple decoding can be restrained.

It is to be noted that a pixel value (e.g., median value) for which a smaller quantization error is generated, depends on the number of bits to become lost through quantization. Therefore, it is sufficient that the value of the offset is set according to the number of bits to become lost. That is, in this method, an offset that depends on the number of bits to become lost through quantization is given to the image. Also, in this method, since it is sufficient to shift a pixel value to a desired value, the offset may be subtracted from a pixel value or the offset may be added to a pixel value in the aforementioned manner.

Moreover, as a result of multiplication by a digital gain in the aforementioned manner, many pixel values are converted to values to generate respective quantization errors toward the same direction. Therefore, an offset such as that described previously is given to (for example, subtracted from) each pixel value so that quantization errors can be reduced for many pixel values. That is, a shift of quantization errors toward one side as a whole can be inhibited. Consequently, this offset value is only required to be set according to the average pixel value (and the number of bits to become lost) of an image. As a result of this, compared to a case an offset value is obtained for each pixel, an offset value can be easily obtained.

Also, for example, in the method #3, in a case where an image is multiplied by a digital gain, the value range of a quantization value (qf) for use in (quantization in) simple encoding is set according to the gain value of the digital gain. The quantization value (qf) represents a value by which a pixel value is multiplied in quantization (that is, a value representing the number of lower bits to become lost).

In general, when the quantization value (qf) is increased, the number of bits to become lost becomes greater so that the encoding efficiency is enhanced but the subjective image quality of a decoded image is deteriorated. Therefore, in conventional fixed length encoding such as that disclosed in PTL 3 and 4, for example, encoding results about all the values that the quantization value can take are verified such that an optimum one is selected from among the values.

However, when an image is multiplied by a digital gain in the aforementioned manner, the number of lower bits of a pixel value is degraded (an incorrect value is obtained) according to the gain value. In other words, even if these degraded lower bits become lost through quantization, less influence of the quantization is exerted on the subjective image quality of a decoded image (the degree of deterioration in the image quality is substantially equal to that in a case where quantization is not executed). Therefore, the quantization value (qf) of bits lower than the number of bits corresponding to the gain value does not need to be verified (it is clearly preferable that the quantization value (qf) is set to a number equal to or greater than the number of bits corresponding to the gain value). That is, it is sufficient that encoding results only about the quantization value (qf) of bits equal to or greater than this number of bits are verified.

That is, a limitation according to the gain value of a digital gain is imposed on the value range of a quantization value (qf). As a result of this, an increase in the load of verifying the aforementioned encoding results can be restrained. That is, an increase in a load of the encoding process can be restrained.

In addition, information indicating a quantization value (qf) thus selected is contained in encoded data, and is transmitted to the decoding side. As a result of the aforementioned limitation on the value range of a quantization value (qf), the quantization value (qf) can be expressed by fewer bits (word length). That is, since the code amount can be reduced, deterioration in the encoding efficiency can be accordingly restrained.

Also, for example, in the method #4, in a case where an image is multiplied by a digital gain, the digital gain is canceled (that is, division by the gain value of the digital gain is conducted), simple encoding and simple decoding are executed, and then, the image is multiplied again by the digital gain (multiplied by the gain value). That is, computation according to the gain value of the digital gain is executed. As explained above with reference to FIGS. 1A, 1B, and 1C, as a result of multiplication by a digital gain, the histogram of an image becomes sparse. Thus, as a result of cancel of the digital gain, simple encoding and simple decoding can be executed while the dense state of the histogram is kept.

Consequently, DC deviation can be restrained. In addition, an increase in pixel value difference can be restrained so that deterioration in the encoding efficiency can be restrained.

3. First Embodiment

<Image Processing System>

Next, the methods in FIG. 4 will be more specifically explained. In the present embodiment, the method #1 will be explained. FIG. 5 is a block diagram depicting one example of a configuration according to one aspect of an image processing system to which the present technology is applied. An image processing system 100 depicted in FIG. 5 encodes image data on a captured and inputted image etc. by multiplying the image data by a digital gain, records or transfers the encoded data, decodes the encoded data, and outputs image data about the decoded image.

As depicted in FIG. 5, the image processing system 100 includes a control section 101, an encoding-side structure 102, and a decoding-side structure 103. The control section 101 executes processing related to control of (the processing sections in) the encoding-side structure 102 and (the processing sections in) the decoding-side structure 103. For example, the control section 101 sets a gain value of a digital gain (signal amplification on an image), and supplies the gain value to an amplification section 111 to amplify image data (each pixel value) with the gain value. In addition, the control section 101 also supplies the gain value to a random offset adding section 112, an encoding section 113, and a decoding section 121. It is to be noted that the control section 101 may be provided separately from the encoding-side structure 102 and the decoding-side structure 103, as illustrated in FIG. 5, or may be provided in the encoding-side structure 102, or may be provided in the decoding-side structure 103.

The encoding-side structure 102 is disposed on an encoding side for encoding image data, and includes the amplification section 111, the random offset adding section 112, and the encoding section 113, for example.

Figure 6A:
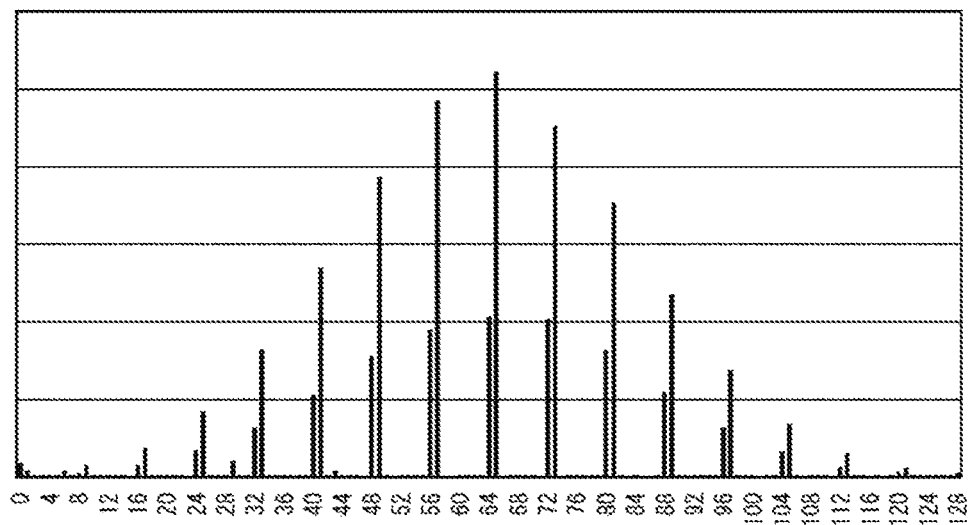
FIGS. 6A and 6B are diagrams depicting an example of a change in a histogram generated as a result of processing.

Under control of the control section 101, the amplification section 111 multiplies, by a digital gain, image data (a digital image signal) inputted to the image processing system 100. That is, the amplification section 111 multiplies, by a gain value supplied from the control section 101, each pixel value of the image data. As a result of this process, for example, a histogram such as that depicted in FIG. 1A is changed to a sparse state such as that depicted in FIG. 6A. The amplification section 111 supplies the image data multiplied by the digital gain to the random offset adding section 112.

Under control of the control section 101, the random offset adding section 112 executes adaptive image processing on the image data (image in which signal amplification has been executed) multiplied by the digital gain. For example, the random offset adding section 112 executes the image processing of adding, to each pixel value of the image data, an offset value which is randomly set within a value range depending on the gain value of the digital gain. As a result of addition of the random offset value, the histogram of the image data is changed from the sparse state such as that depicted in FIG. 6A, to a dense state such as that depicted in FIG. 6B. The random offset adding section 112 supplies the image data to which the offset value has been added, to the encoding section 113.

Under control of the control section 101, the encoding section 113 executes simple encoding of the image data the histogram of which has been changed to the dense state as a result of addition of the offset value. For example, the encoding section 113 deletes lower bits by quantizing each block of the image data, and obtains a DPCM residual. Then, the encoding section 113 refines the lower bits, as appropriate, such that the code amounts are adjusted to a fixed length. By the encoding section 113, the fixed length encoded data thus generated is recorded into a recording medium or is transmitted via a transmission medium.

The decoding-side structure 103 is disposed on a decoding side for decoding encoded data generated by the encoding-side structure 102, and includes a decoding section 121, for example.

Under control of the control section 101, the decoding section 121 acquires the encoded data generated by the encoding section 113 via a recording medium or a transmission medium, and executes simple decoding of the encoded data. For example, the decoding section 121 extracts refined lower bits from each block of the encoded data, and further, decompresses higher bits by inversely processing the DPCM residual so that the lower bits lost through inverse quantization are decompressed. The decoding section 121 outputs the image data (digital image signal) thus decompressed to the outside of the image processing system 100.

<Random Offset Adding Section>

Figure 7:
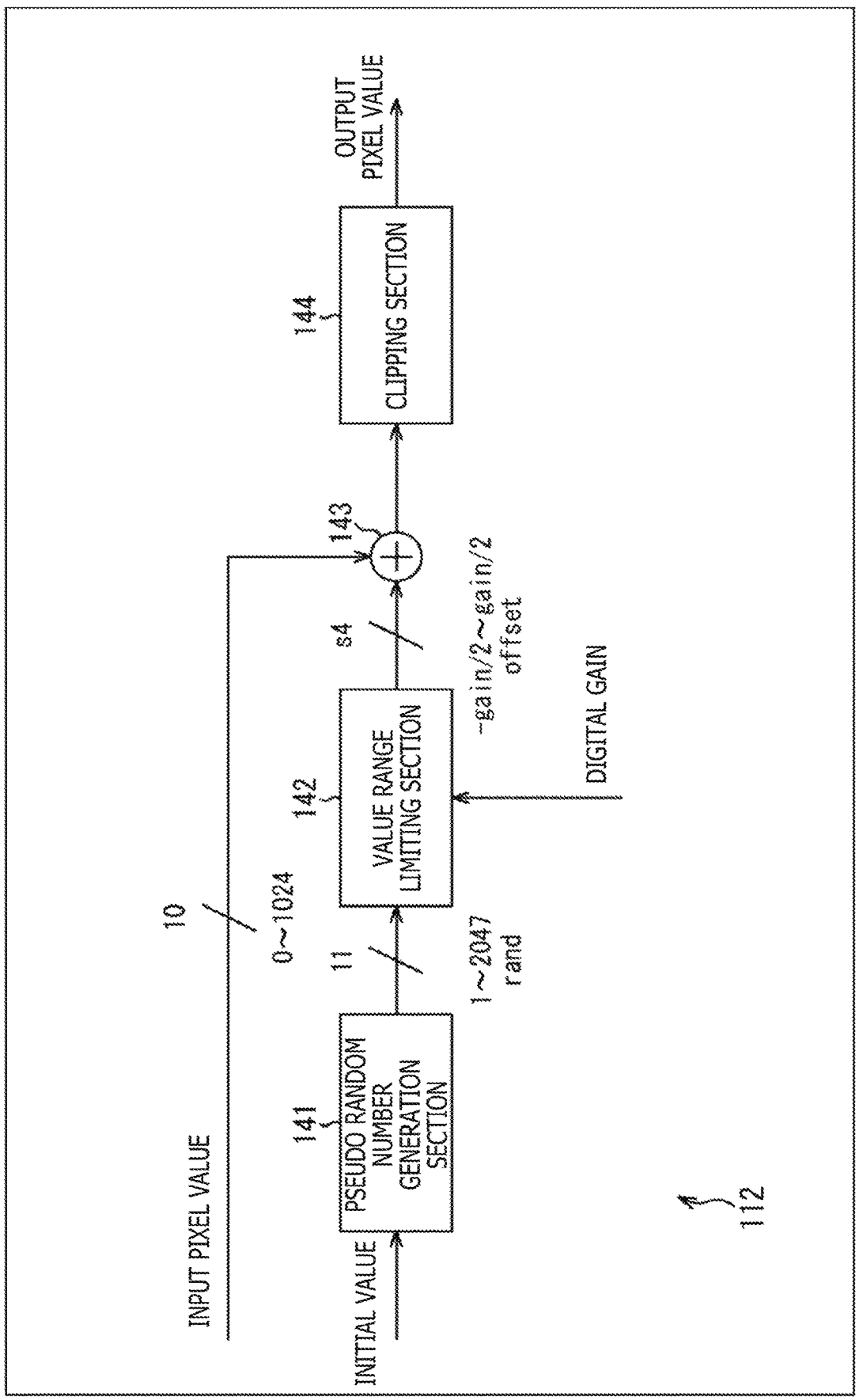
FIG. 7 is a diagram depicting a main configuration example of a random offset adding section.

FIG. 7 is a block diagram depicting a main configuration example of the random offset adding section 112. As depicted in FIG. 7, the random offset adding section 112 includes a pseudo random number generation section 141, a value range limiting section 142, a computing section 143, and a clipping section 144.

The pseudo random number generation section 141 executes a process regarding generation of a pseudo random number. For example, the pseudo random number generation section 141 receives a prescribed initial value as an input, and generates a pseudo random number for each inputted pixel value. For example, the pseudo random number generation section 141 generates an 11-bit pseudo random number, and supplies the pseudo random number to the value range limiting section 142. The number of bits of the pseudo random number is arbitrarily defined.

The value range limiting section 142 executes a process regarding imposing a limitation on the value range of a pseudo random number. For example, the value range limiting section 142 receives, as inputs, an 11-bit pseudo random number supplied from the pseudo random number generation section 141 and the gain value (gain) of a digital gain supplied from the control section 101, and limits the value range of the pseudo random number to a range according to the gain value (corrects the pseudo random number to fall within the range). For example, the value range limiting section 142 corrects the value range of the pseudo random number on the basis of a syntax such as that depicted in FIG. 8.

Figure 9:
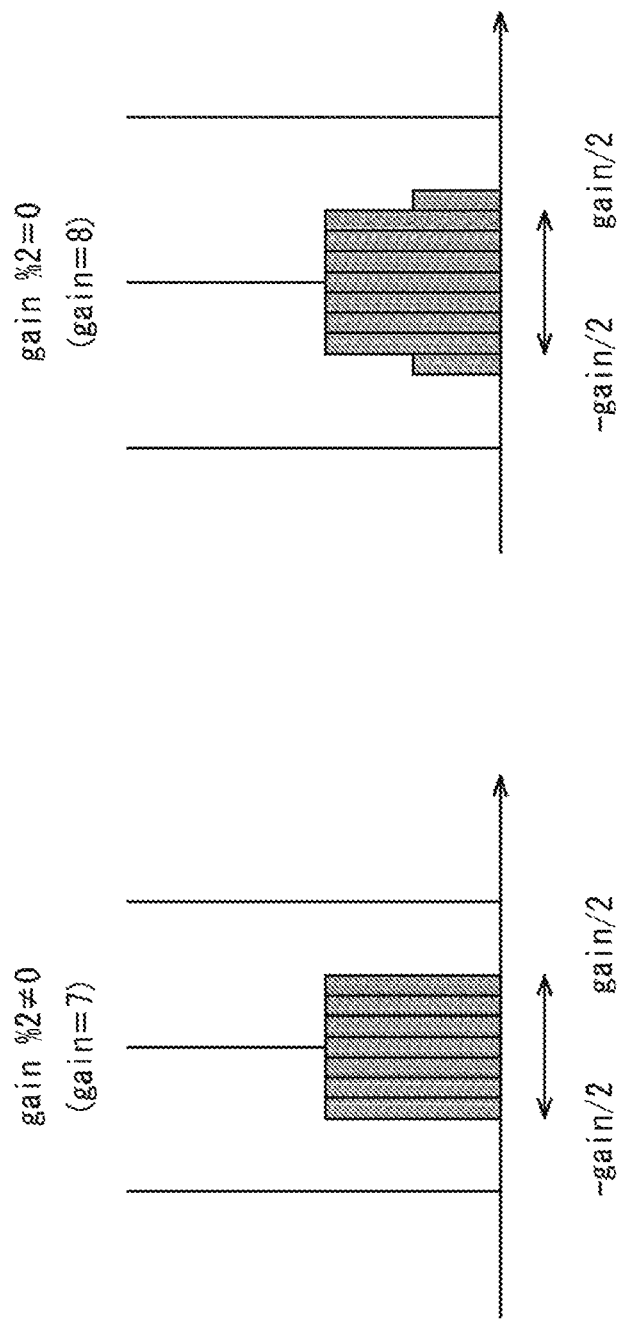
FIGS. 9A and 9B are diagrams depicting an example of imposing a limitation on the value range of an offset.

In the process is executed in accordance with the syntax in FIG. 8, the value range limiting section 142 limits the value range of the pseudo random number to a range from "−gain/2" to "gain/2." That is, for example, in a case where the gain value is an odd number (for example, gain=7), the value range limiting section 142 sets a random offset value within the range from "−gain/2" to "gain/2," as in a histogram depicted in FIG. 9A. In this case, the number of offset values at each value from "−gain/2" to "gain/2" is identical (fixed).

Also, for example, in a case where the gain value is an even number (for example, gain=8), the value range limiting section 142 sets a random offset value within a range from "−gain/2" to "gain/2," as in a histogram depicted in FIG. 9B. That is, in this case, the number of offset values at each value from "−gain/2+1" to "gain/2−1" is identical (fixed). In the case where the gain value is an even number, "−gain/2" and "gain/2" each overlap the value range of the corresponding adjacent offset value. Therefore, in this case, the number of offset values at each of "−gain/2" and "gain/2" is half of that at the remaining values, as depicted in FIG. 9B.

The value range limiting section 142 supplies, as an offset value, the pseudo random number the value range of which has been thus limited, to the computing section 143.

Figure 6B:
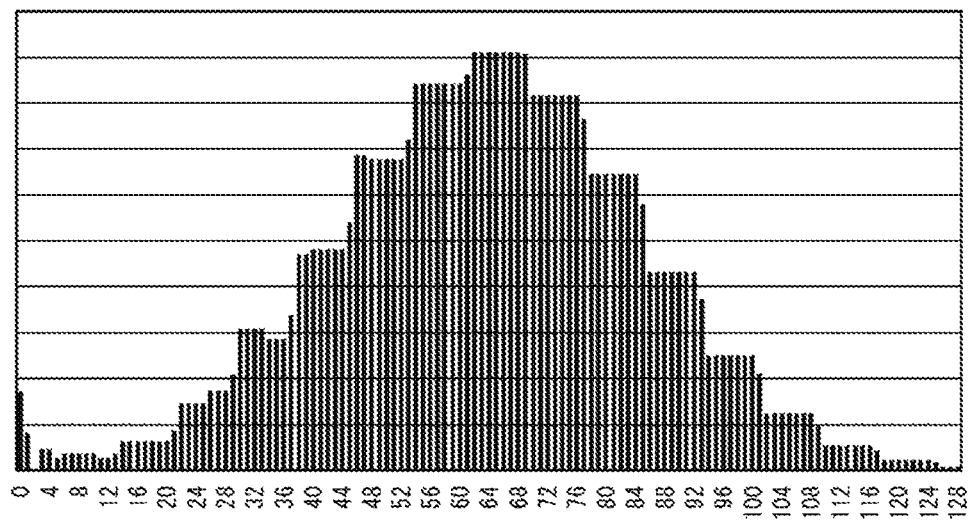

The computing section 143 gives (for example, adds), to each input pixel value, the offset value supplied from the value range limiting section 142. For example, in a case where the gain value is an odd number (gain % 2 ≠0), the median pixel value in the value range of the offset value is equally dispersed in the range from "−gain/2" to "gain/2," as a result of addition of the offset value. Also, for example, in a case where the gain value is an even number (gain % 2=0), the median pixel value in the value range of the offset value is dispersed in the range from "−gain/2" to "gain/2" in such a manner depicted in FIG. 9B, as a result of addition of the offset value. Accordingly, the dense histogram is obtained, as depicted in FIG. 6B. That is, the computing section 143 adds, as an offset value, the pseudo random number corrected to fall within the value range according to the gain value, to each pixel value (input pixel value) of the image. The computing section 143 supplies the image data to which the offset value has been given, to the clipping section 144.

The clipping section 144 executes clipping to adjust a pixel value that is outside a prescribed range (e.g., a range from 0 to 1023), to the upper limit value (1023) or the lower limit value (0) such that, for example, the bit length is adjusted to 10 bits. The clipping section 144 supplies the image data (output pixel value) having undergone the clipping, to the encoding section 113.

As described previously, simple encoding is executed after a random offset value is added to image data so that simple encoding and simple decoding can be executed while the histogram is in a dense state. Consequently, shift of quantization errors of respective pixel values to one side through simple encoding and simple decoding can be inhibited. That is, when the method #1 is adopted, the image processing system 100 can restrain an average signal value deviation (DC deviation) which is generated through encoding and decoding of an amplified single group.

It is to be noted that an influence which is exerted on the subjective image quality of a decoded image is small because, even if an offset value is added in the aforementioned manner, only lower bits that include errors mainly due to a digital gain are changed. That is, while the influence which is exerted on the subjective image quality of a decoded image is restrained, DC deviation which is generated through encoding and decoding can be restrained.

<Flow of Encoding Process>

Figure 10:
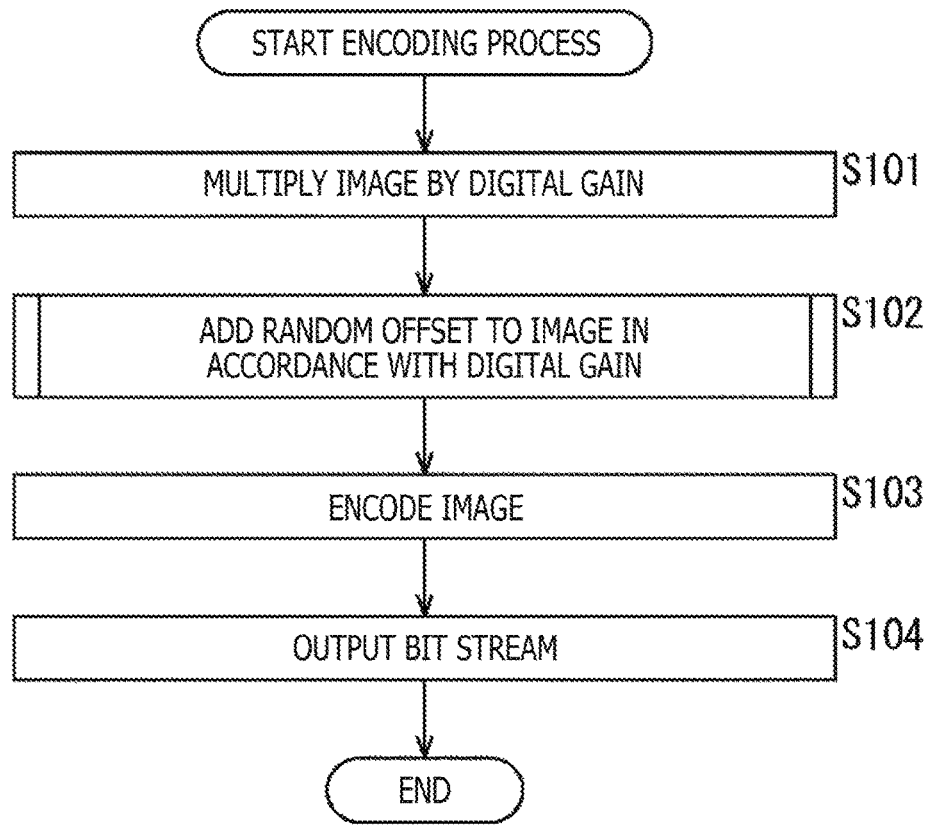
FIG. 10 is a flowchart for explaining an example of the flow of an encoding process based on the method #1.

Next, the flow of a process which is executed in the image processing system 100 will be explained. First, an example of the flow of an encoding process which is executed in the encoding-side structure 102 will be explained with reference to a flowchart in FIG. 10.

When the encoding process is started, the amplification section 111 on the encoding side of the image processing system 100 multiplies, at step S101, inputted image data by a digital gain having a gain value set by the control section 101.

At step S102, the random offset adding section 112 adds a random offset to the image data according to the gain value of the digital gain at step S101.

At step S103, the encoding section 113 executes simple encoding of the image data to which the random offset has been added. For example, the encoding section 113 executes simple encoding of each block of the image data.

At step S104, the encoding section 113 outputs, in the form of a bit stream, for example, the encoded data generated by simple encoding. For example, by the encoding section 113, the bit stream is recorded into a recording medium or is transmitted via a transmission medium.

When step S104 is completed, the encoding process is ended.

<Flow of Offset Addition Process>

Figure 11:
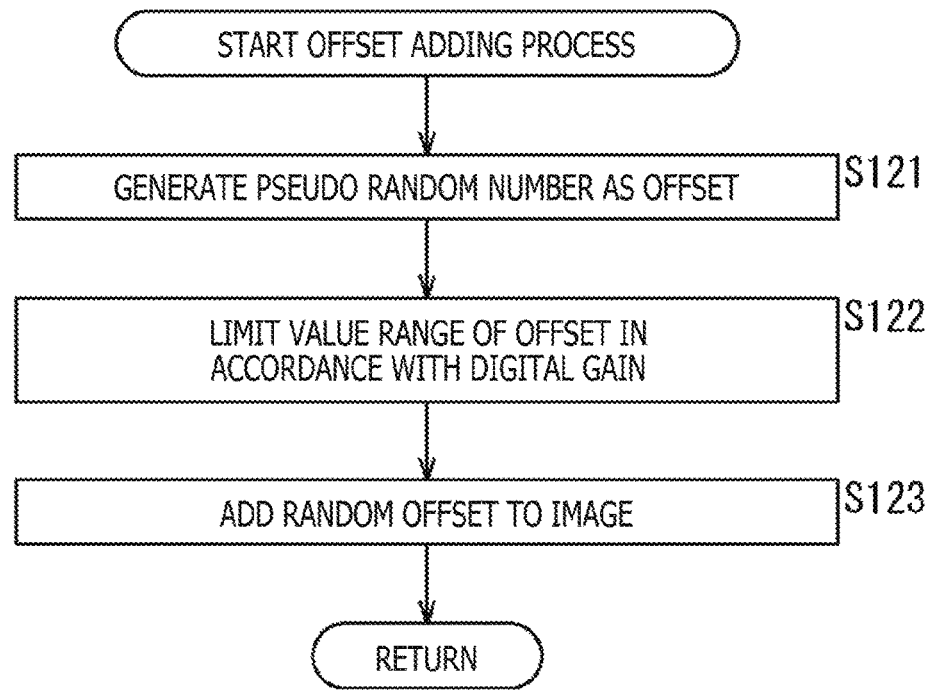
FIG. 11 is a flowchart for explaining an example of the flow of an offset addition process.

Next, an example of the flow of an offset addition process of adding a random offset to a pixel value will be explained with reference to a flowchart in FIG. 11.

When the offset addition process is started, the pseudo random number generation section 141 generates, at step S121, a pseudo random number as an offset to be given to an input pixel value.

At step S122, the value range limiting section 142 imposes a limitation on the value range of the offset (pseudo random number) set at step S121, according to the gain value of the digital gain.

At step S123, the computing section 143 adds, to each pixel value of the image, the offset (pseudo random number) the value range of which has been set at step S122. In addition, the clipping section 144 executes clipping on the addition result, thereby converting the addition result to data of a prescribed bit length (e.g., 10 bits).

When step S123 is completed, the offset addition process is ended. Then, the process returns to FIG. 10.

<Flow of Decoding Process>

Figure 12:
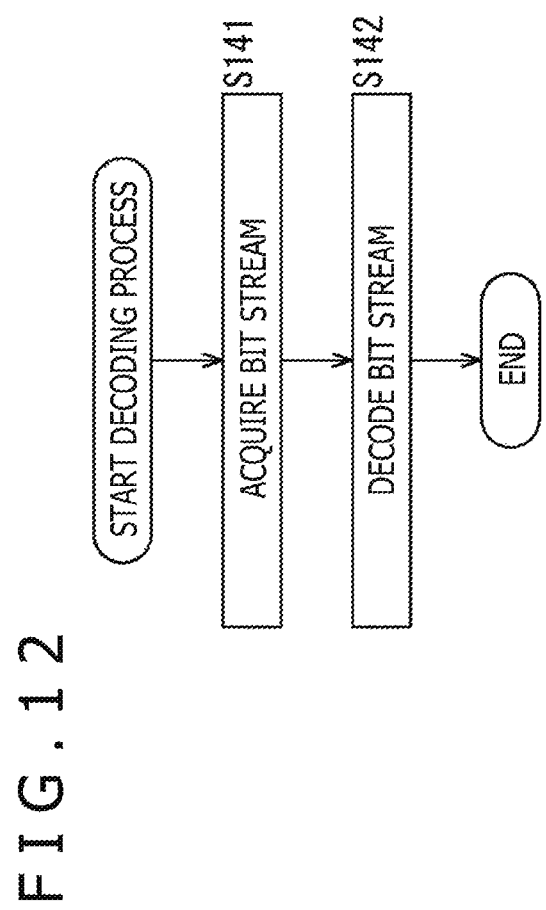
FIG. 12 is a flowchart for explaining an example of the flow of a decoding process based on the method #1.

Next, an example of the flow of a decoding process which is executed in the decoding-side structure 103 will be explained with reference to a flowchart in FIG. 12.

When the decoding process is started, the decoding section 121 in the decoding-side structure 103 acquires, at step S141, the bitstream (encoded data) generated by the encoding-side structure 102 via a recording medium or a transfer medium.

At step S142, the decoding section 121 executes simple decoding of the bitstream acquired at step S141. For example, the decoding section 121 executes simple decoding of each block of the bitstream.

When step S142 is completed, the decoding process is ended.

By executing the aforementioned processes, the image processing system 100 can encode and decode an amplified signal group by the method #1. Accordingly, the image processing system 100 can restrain an average signal value deviation (DC deviation) which is generated through encoding and decoding of an amplified signal group.

Consequently, the image processing system 100 can deterioration in the accuracy of data (as a measurement result), for example. In addition, for example, deterioration in the subjective image quality of a decoded image can be restrained.

<Another Configuration of Image Processing System>

It is to be noted that the configuration of the image processing system 100 is not limited to the example in FIG. 5. For example, as depicted in FIG. 13, encoded data (a bitstream) may be transmitted from the encoding-side structure 102 to the decoding-side structure 103 through communication based on a prescribed communication scheme.

Figure 13:
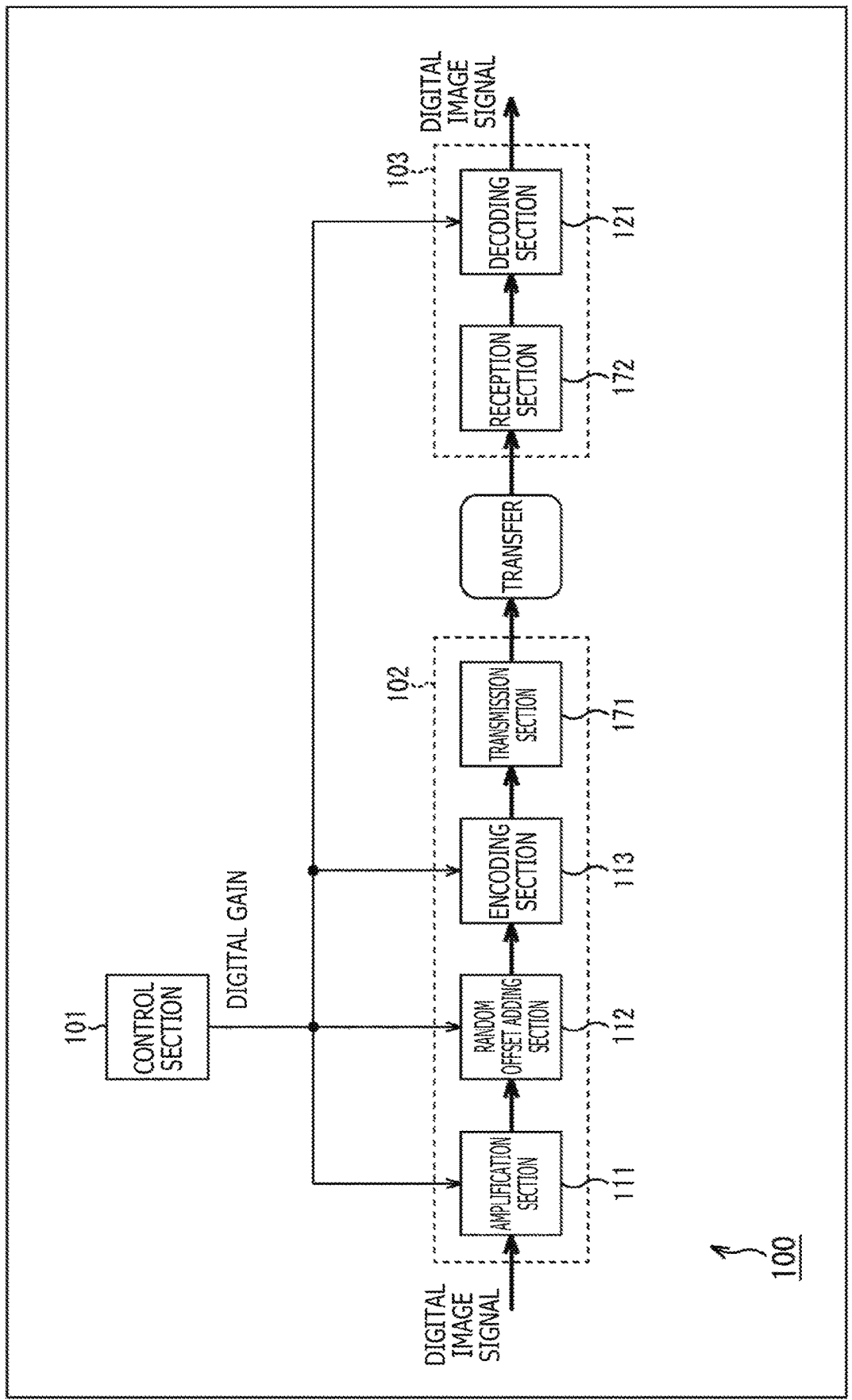
FIG. 13 is a block diagram depicting another configuration example of an image processing system that performs the method #1.

In this case, the image processing system 100 further includes a transmission section 171 in the encoding-side structure 102, as depicted in FIG. 13. In addition, the image processing system 100 further includes a reception section 172 in the decoding-side structure 103.

In the encoding-side structure 102, the encoding section 113 supplies generated encoded data (a bitstream) to the transmission section 171.

The transmission section 171 and the reception section 172 are prescribed communication interfaces that exchange information by performing communication by a scheme conforming to a prescribed communication standard. For example, the transmission section 171 converts (for example, packetizes) a bitstream supplied from the encoding section 113, to transmission data of a format conforming to the communication standard, and supplies the transmission data to the reception section 172 via a prescribed transmission path. The reception section 172 receives the transmission data (e.g., packets) of the prescribed format, and decompresses the encoded data. The reception section 172 supplies the decompressed encoded data to the decoding section 121.

In the aforementioned manner, encoded data (a bitstream) having undergone simple encoding can be transmitted from an encoding side to a decoding side by a scheme conforming to a prescribed communication standard. Consequently, for example, an existing communication standard can be adopted as the communication standard in this case, and development thereof can be facilitated.

4. Second Embodiment

<Image Processing System>

Figure 14:
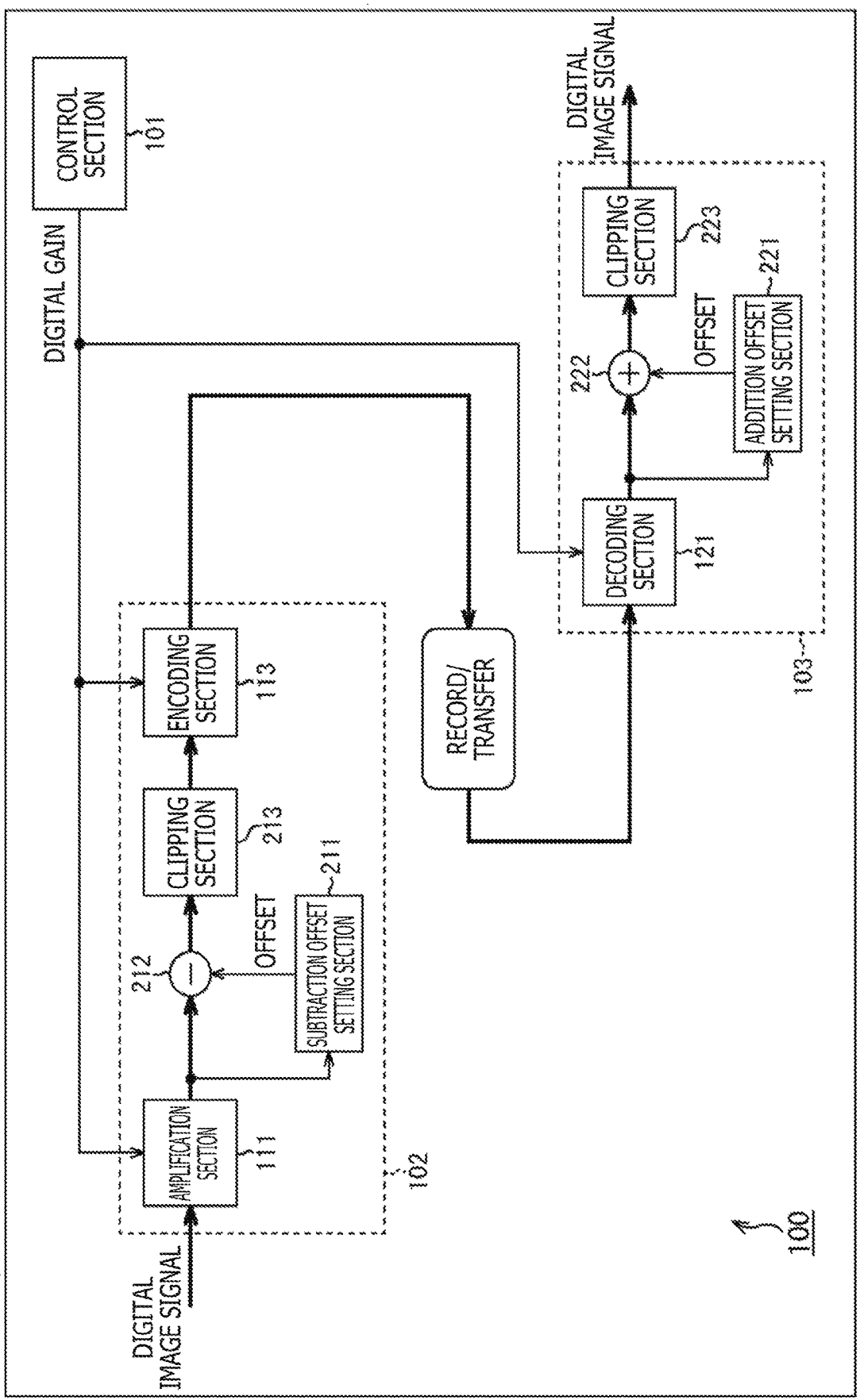
FIG. 14 is a block diagram depicting a main configuration example of an image processing system that performs a method #2.

In the present embodiment, the method #2 in FIG. 4 will be explained. FIG. 14 is a block diagram depicting one example of a configuration according to one aspect of an image processing system to which the present technology is applied.

In FIG. 14, the encoding-side structure 102 of the image processing system 100 includes the amplification section 111, a subtraction offset setting section 211, a computing section 212, a clipping section 213, and the encoding section 113.

The subtraction offset setting section 211 executes a process regarding setting of a subtraction offset. A subtraction offset is to be subtracted from each pixel value of image data multiplied by a digital gain by the amplification section 111. The subtraction offset setting section 211 sets such a subtraction offset on the basis of image data multiplied by a digital gain by the amplification section 111. More specifically, the subtraction offset setting section 211 sets a subtraction offset value on the basis of the average pixel value of image data multiplied by a digital gain and a quantization value (a quantization value of quantization which is executed in simple encoding) of simple encoding which is executed by the encoding section 113. The subtraction offset setting section 211 supplies the set subtraction offset to the computing section 212.

The computing section 212 executes adaptive image processing of subtracting the subtraction offset set by the subtraction offset setting section 211, from each pixel value of the image data multiplied by the digital gain by the amplification section 111. The computing section 212 supplies the subtraction result to the clipping section 213.

The clipping section 213 executes clipping of the supplied subtraction result (image data which has been multiplied by the digital gain and from which the subtraction offset has been subtracted), and clips the lower limit thereof (e.g., 0). The clipping section 213 supplies the clipped image data to the encoding section 113.

The encoding section 113 executes simple encoding of the image data supplied from the clipping section 213. By the encoding section 113, the fixed length encoded data thus generated is recorded into a recording medium or is transmitted via a transmission medium.

Moreover, in FIG. 14, the decoding-side structure 103 includes the decoding section 121, an addition offset setting section 221, a computing section 222, and a clipping section 223.

The addition offset setting section 221 executes a process regarding setting of an addition offset. An addition offset is to be added to each pixel value of image data decompressed by the decoding section 121. The addition offset setting section 221 sets an addition offset by a method basically similar to that of the subtraction offset setting section 211. For example, the addition offset setting section 221 sets an addition offset on the basis of the decompressed image data. More specifically, the addition offset setting section 221 sets an addition offset value on the basis of the average pixel value of the decompressed image data and a quantization value (the quantization value supplied from the encoding side) of quantization (simple encoding) which is executed by the encoding section 113. The addition offset setting section 221 supplies the set addition offset to the computing section 222.

The computing section 222 executes adaptive processing of adding the addition offset supplied from the addition offset setting section 221, to each pixel value of the decompressed image data supplied from the decoding section 121. The computing section 222 supplies the addition result to the clipping section 223.

The clipping section 223 executes clipping of the supplied subtraction result (the image data which has been decompressed and to which the addition offset has been added), and clips the upper limit (maximum value) thereof. The clipping section 223 outputs the clipped image data to the outside of the image processing system 100.

In this case, as described previously with reference to FIG. 4, as a result of subtraction of the subtraction offset from each pixel value of the image data multiplied by the digital gain in the encoding-side structure 102, the pixel values are shifted to values for which smaller quantization errors are generated. In other words, the subtraction offset is set to a value to achieve this shift.

Then, as a result of addition of the addition offset to each pixel value of the decompressed image data in the decoding-side structure 103, the pixel values are shifted to the original values (that is, the shift of the pixel values using the subtraction offset in the encoding-side structure 102 is canceled). In other words, the addition offset is set to a value to achieve this cancel.

Through the aforementioned processes, simple encoding and simple decoding can be executed while quantization errors are made smaller. Therefore, as a result, a shift of the direction of quantization errors to one side can be lessened. That is, a shift of the direction of quantization errors of pixel values to one side due to encoding and decoding can be restrained.

<Subtraction Offset Setting Section>

Figure 15:
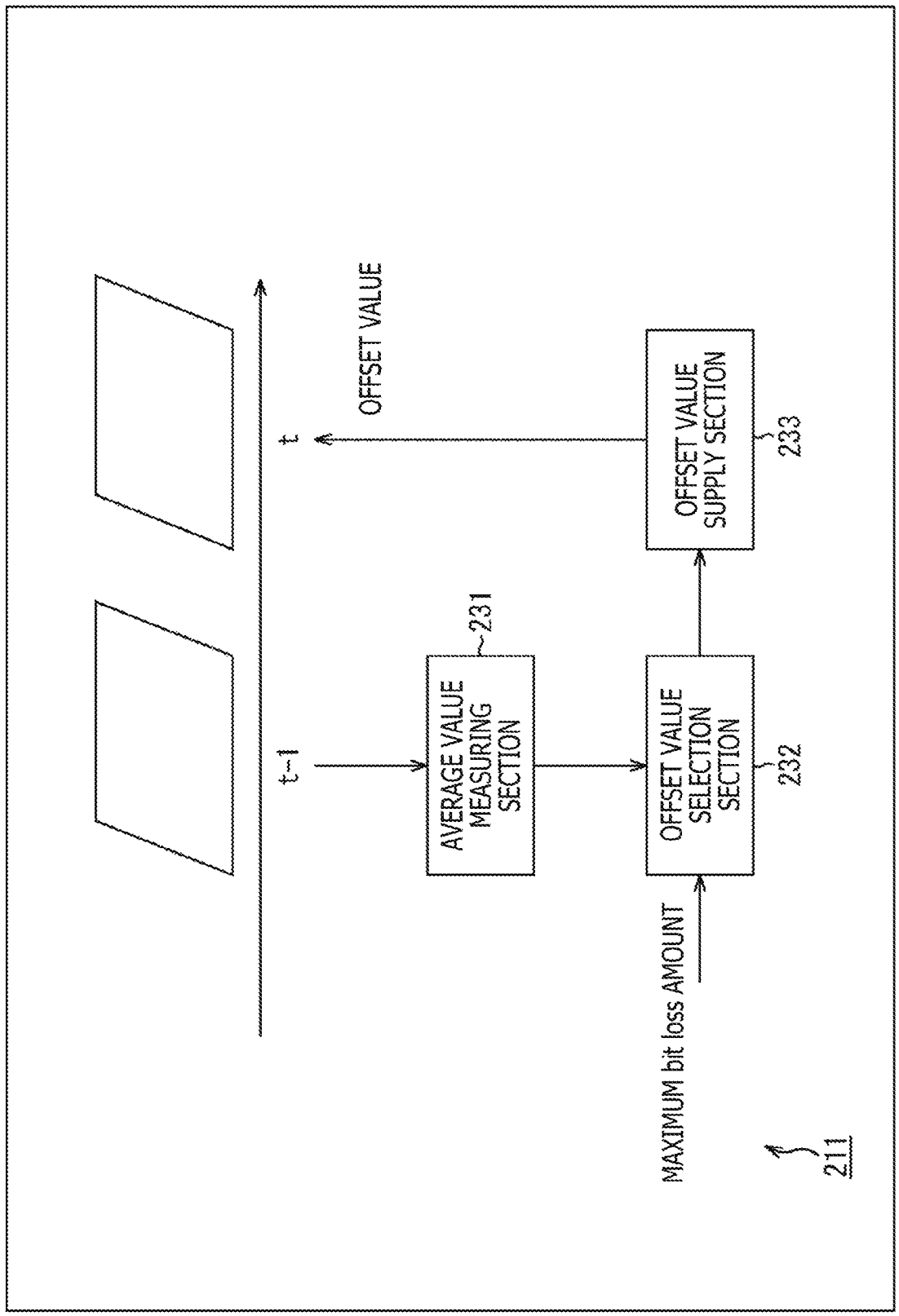
FIG. 15 is a block diagram depicting a main configuration example of a subtraction offset setting section.

FIG. 15 is a block diagram depicting a main configuration example of the subtraction offset setting section 211. As depicted in FIG. 15, the subtraction offset setting section 211 includes an average value measuring section 231, an offset value selection section 232, and an offset value supply section 233.

The average value measuring section 231 calculates the average pixel value of a frame (t−1) preceding a process target frame (current frame t) of image data supplied from the amplification section 111. The average value measuring section 231 supplies the calculated average pixel value to the offset value selection section 232.

The offset value selection section 232 sets an offset value (a subtraction offset) on the basis of the average pixel value of the frame (t−1) supplied from the average value measuring section 231 and a maximum quantization bit loss amount that is determined in accordance with a compression rate of simple encoding.

As described previously, an offset value to make quantization errors smaller depends on the average pixel value of image data multiplied by a digital gain and a maximum bit loss amount in quantization. For example, in a case where image data corresponds to the histogram depicted in FIG. 1B, the value of a subtraction offset to make quantization errors smaller can be obtained on the average pixel value of the image and the maximum bit loss amount, as illustrated in a table in FIG. 16.

That is, the offset value selection section 232 holds the table in advance, and obtains the value of a subtraction offset with reference to the table. Accordingly, the offset value selection section 232 can more easily set a subtraction offset. The offset value selection section 232 supplies the set subtraction offset to the offset value supply section 233.

The offset value supply section 233 supplies, as a subtraction offset for the current frame (t), the subtraction offset supplied from the offset value selection section 232, to the computing section 212.

It is to be noted that an average pixel value may be calculated by using a frame that is previous to the current frame by two or more. That is, a subtraction offset may be calculated by using a frame that is previous to the current frame by two or more. However, when a frame that is closer to the current frame is used to obtain the average pixel value, a subtraction offset of a more accurate value (a value to make quantization errors smaller) is likely to be obtained.

In addition, a subtraction offset may be set for each of colors (for example, for each of R, G, and B) in image data. In this case, the average value measuring section 231 may calculate an average pixel value for each color, and the offset value selection section 232 may set a subtraction offset value for each color by using the average pixel value calculated for each color. As a result of this, a subtraction offset of a more accurate value (a value to make quantization errors smaller) can be easily obtained. For example, even in a case where the maximum bit loss amounts for respective colors are different from one another, an offset value to make quantization errors smaller can be obtained in the aforementioned manner.

It is to be noted that the addition offset setting section 221 also has a configuration similar to that of the subtraction offset setting section 211, and sets an addition offset by a method similar to that for the subtraction offset setting section 211. Thus, an explanation thereof is omitted.

As described so far, when the method #2 is adopted, the image processing system 100 can restrain an average signal value deviation (DC deviation) which is generated through encoding and decoding of an amplified signal group.

<Flow of Encoding Process>

Next, the flow of a process which is executed in the image processing system 100 will be explained. First, an example of the flow of an encoding process which is executed in the encoding-side structure 102 will be explained with reference to the flowchart in FIG. 17.

When the encoding process is started, the amplification section 111 which is an encoding-side section of the image processing system 100 multiplies, at step S201, inputted image data by a digital gain of a gain value set by the control section 101.

At step S202, the subtraction offset setting section 211 obtains and sets a subtraction offset in the aforementioned manner.

At step S203, the computing section 212 subtracts the subtraction offset from the image data multiplied by the digital gain at step S201.

At step S204, the clipping section 213 executes clipping of the subtraction result calculated at step S203, that is, the image data which has been multiplied by the digital gain and from which the subtraction offset has been subtracted, thereby clips the lower limit of each pixel value.

At step S205, the encoding section 113 executes simple encoding of the image data the lower limit of which has been clipped.

At step S206, the encoding section 113 outputs, in the form of a bitstream, for example, the encoded data generated through simple encoding. By the encoding section 113, the bitstream is recorded into a recording medium or is transmitted via a transmission medium, for example.

When step S206 is completed, the encoding process is ended.

<Flow of Offset Value Setting Process>

Figure 17:
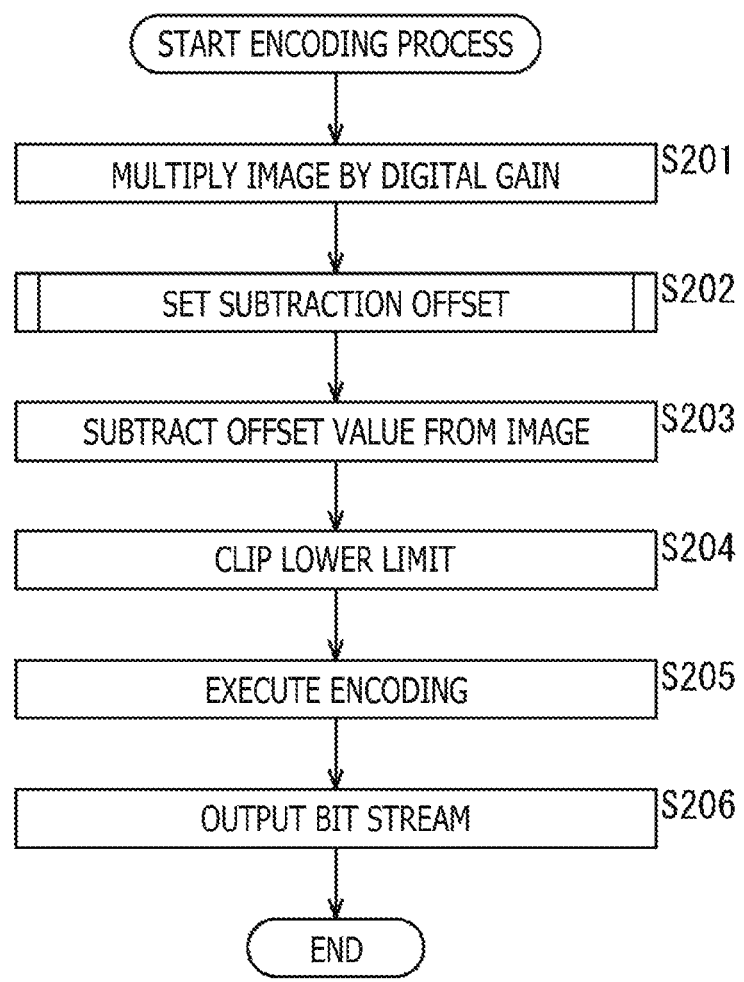
FIG. 17 is a flowchart for explaining an example of the flow of an encoding process based on the method #2.
Figure 18:
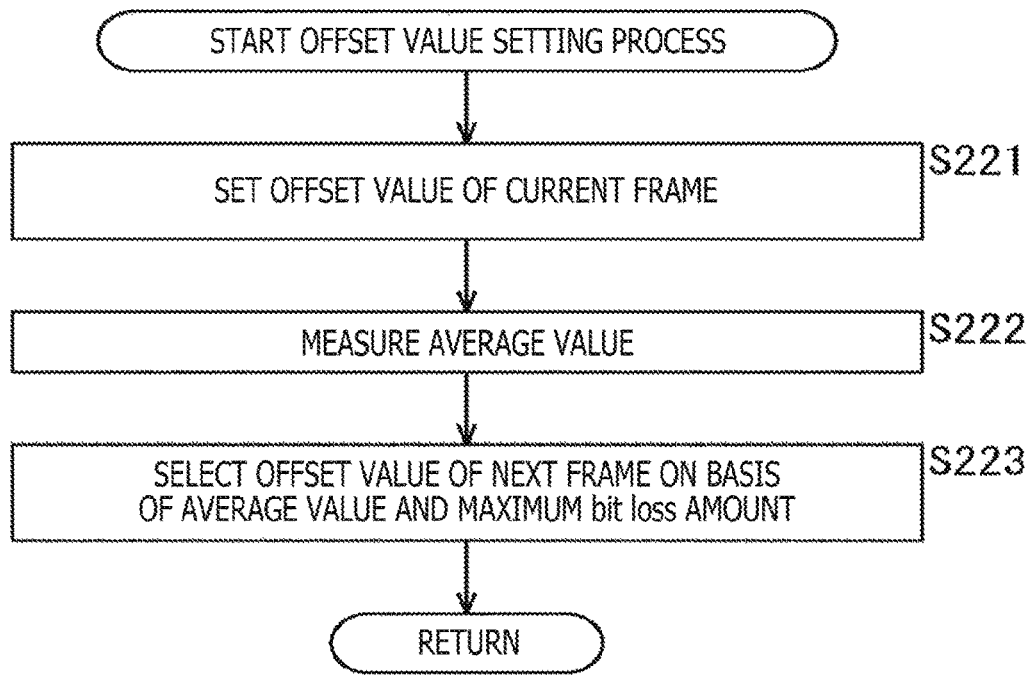
FIG. 18 is a flowchart for explaining an example of the flow of an offset value setting process.

Next, the flow of an offset value setting process, which executed at step S202 in FIG. 17, of setting a subtraction offset will be explained with reference to a flowchart in FIG. 18.

When the offset value setting process is started, the offset value supply section 233 supplies and sets a subtraction offset for the current frame to the computing section 212 at step S221. The subtraction offset is an offset value (offset value that has been already set) set by the past process (for example, when the frame preceding the current frame was a process target). That is, the offset value is set on the basis of image data on the frame (t−1) preceding the current frame (t).

At step S222, the average value measuring section 231 calculates the average pixel value of the image data on the current frame.

At step S223, the offset value selection section 232 selects (sets) a subtraction offset for a frame succeeding to the current frame, with reference to the table in FIG. 16, for example, on the basis of the average pixel value calculated at step S222 and the maximum bit loss amount of the current frame calculated according to the compression rate. The offset value supply section 233 holds the subtraction offset until the next frame is processed. Then, at step S221 for the next frame, the offset value supply section 233 supplies the subtraction offset to the computing section 212.

When step S223 is completed, the offset value setting process is ended. Then, the process returns to FIG. 17.

<Flow of Decoding Process>

Figure 19:
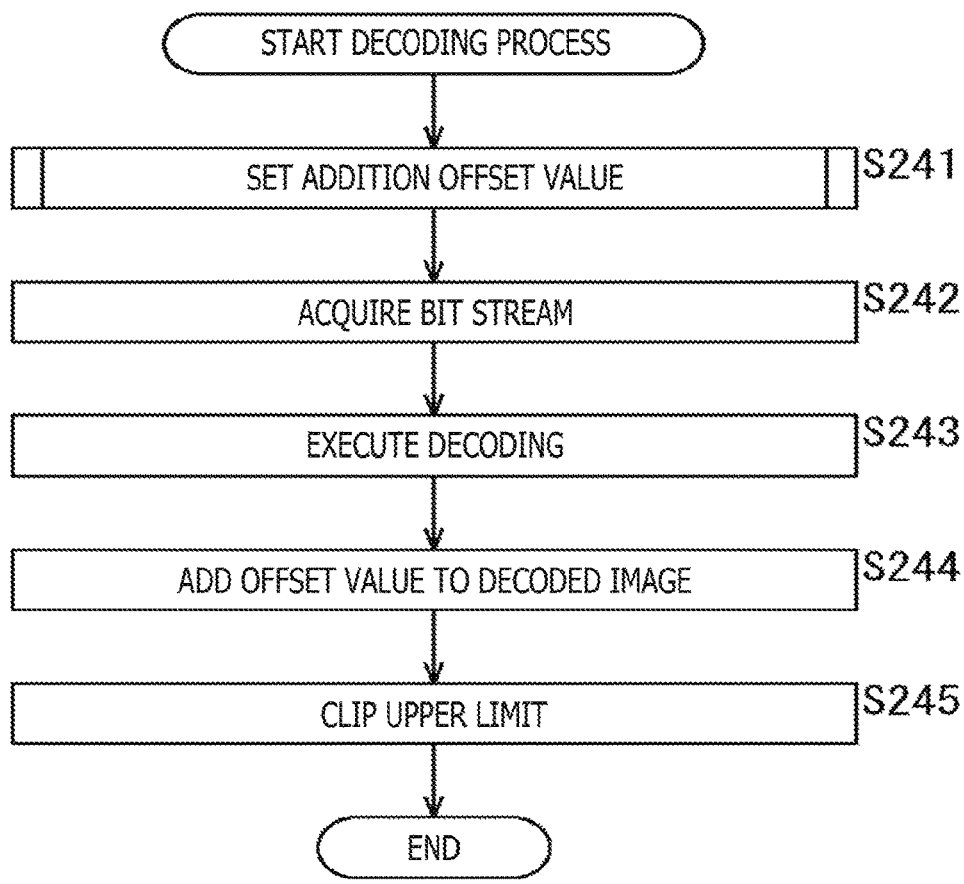
FIG. 19 is a flowchart for explaining an example of the flow of a decoding process based on the method #2.

Next, an example of the flow of a decoding process which is executed in the decoding-side structure 103 will be explained with reference to a flowchart in FIG. 19.

When the decoding process is started, the addition offset setting section 221 in the decoding-side structure 103 obtains and sets an addition offset at step S241. It is to be noted that the addition offset is set in accordance with a flow similar to that for setting a subtraction offset (the offset value setting process), which has been explained previously with reference to the flowchart in FIG. 18. Thus, an explanation thereof will be omitted.

At step S242, the decoding section 121 acquires a bitstream (encoded data) generated in the encoding-side structure 102, via a recording medium or a transmission medium.

At step S243, the decoding section 121 executes simple decoding of the bitstream acquired at step S242.

At step S244, the computing section 222 adds the addition offset set at step S241 to the decoded image generated as a result of step S243.

At step S245, the clipping section 223 clips the upper limit of the decoded image to which the addition offset has been added at step S244.

When step S245 is completed, the decoding process is ended.

By executing the aforementioned processes, the image processing system 100 can execute simple encoding and simple decoding of an amplified signal group by the method #2. Accordingly, the image processing system 100 can restrain an average signal value deviation (DC deviation) which is generated through encoding and decoding of an amplified signal group.

Consequently, the image processing system 100 can restrain deterioration in the accuracy of data (as a measurement result). In addition, for example, deterioration in the subjective image quality of a decoded image can be restrained.

<Another Configuration Example of Subtraction Offset Setting Section>

It is to be noted that a bit loss amount may be calculated from image data, and a subtraction offset may be set by use of the calculated bit loss amount.

Figure 20:
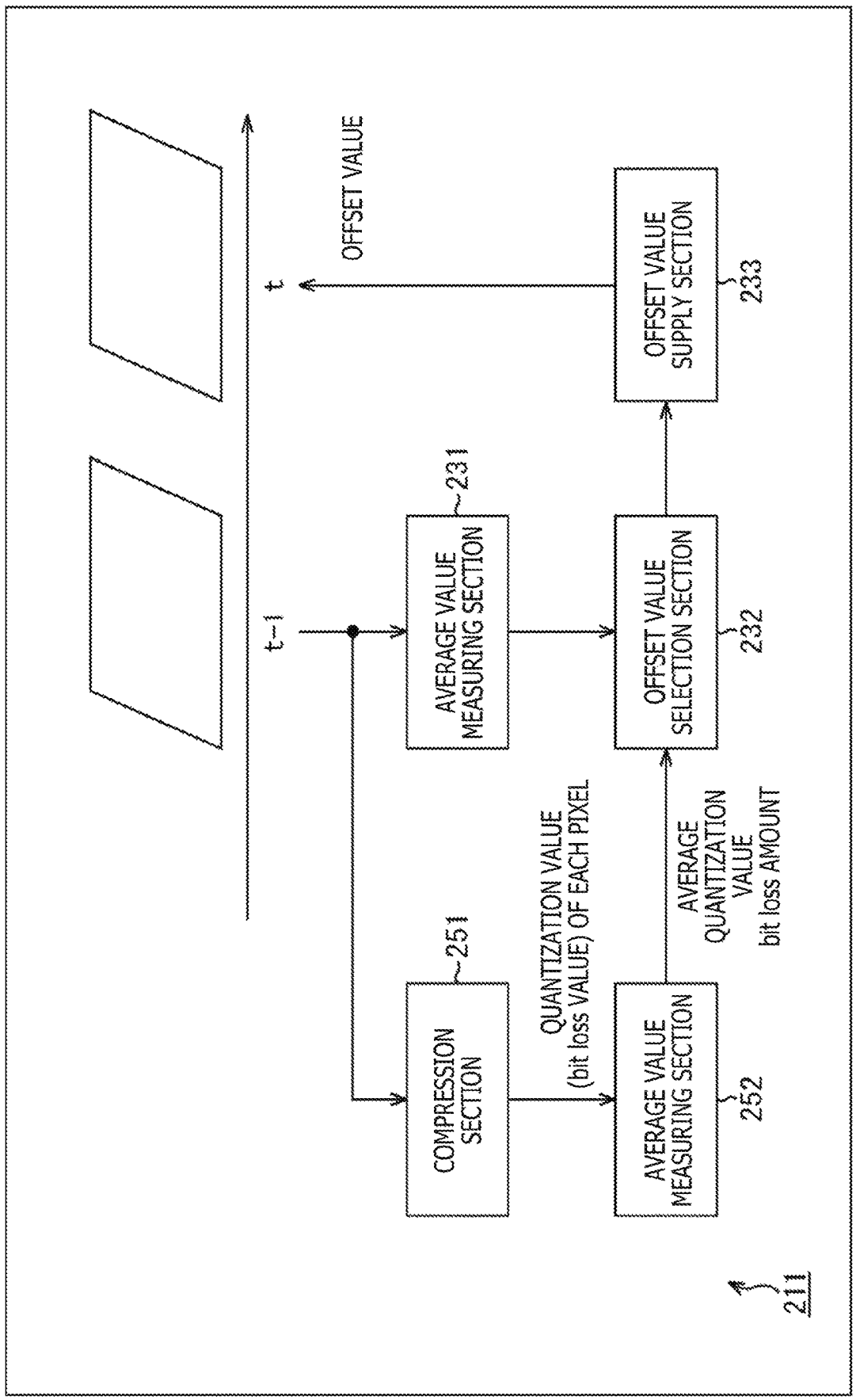
FIG. 20 is a block diagram depicting another configuration example of a subtraction offset setting section.

FIG. 20 is a block diagram depicting another example of the subtraction offset setting section 211. In this case, the subtraction offset setting section 211 includes a compression section 251 and an average value measuring section 252, in addition to the average value measuring section 231 to the offset value supply section 233, as depicted in FIG. 20.

The compression section 251 compresses (that is, executes simple encoding of) a frame (t−1) preceding a process target frame (current frame (t)) of image data supplied from the amplification section 111, in a manner similar to that of the encoding section 113, and obtains a quantization value (bit loss amount) of each pixel value. The compression section 251 supplies the calculated quantization value (bit loss amount) of each pixel value to the average value measuring section 252. It is to be noted that the bit loss amount may be calculated by using a frame that is previous to the current frame by two or more. That is, the subtraction offset may be calculated by using a frame that is previous to the current frame by two or more.

The average value measuring section 252 calculates the average value (average quantization value (bit loss amount)) of supplied quantization values of respective pixels. That is, the average value measuring section 252 calculates, for a frame (e.g., the frame (t−1) preceding the current frame (t)) preceding a process target frame (current frame (t)) of the image data supplied from the amplification section 111, the average value of quantization values of pixels in simple image encoding. The average value measuring section 252 supplies the calculated average quantization value to the offset value selection section 232.

The offset value selection section 232 sets a subtraction offset on the basis of the average pixel value supplied from the average value measuring section 231 and the average quantization value supplied from the average value measuring section 252. A method for setting the subtraction offset is basically similar to that in the case of FIG. 15, and is based on the table in FIG. 16, for example.

<Flow of Offset Value Setting Process>

Figure 21:
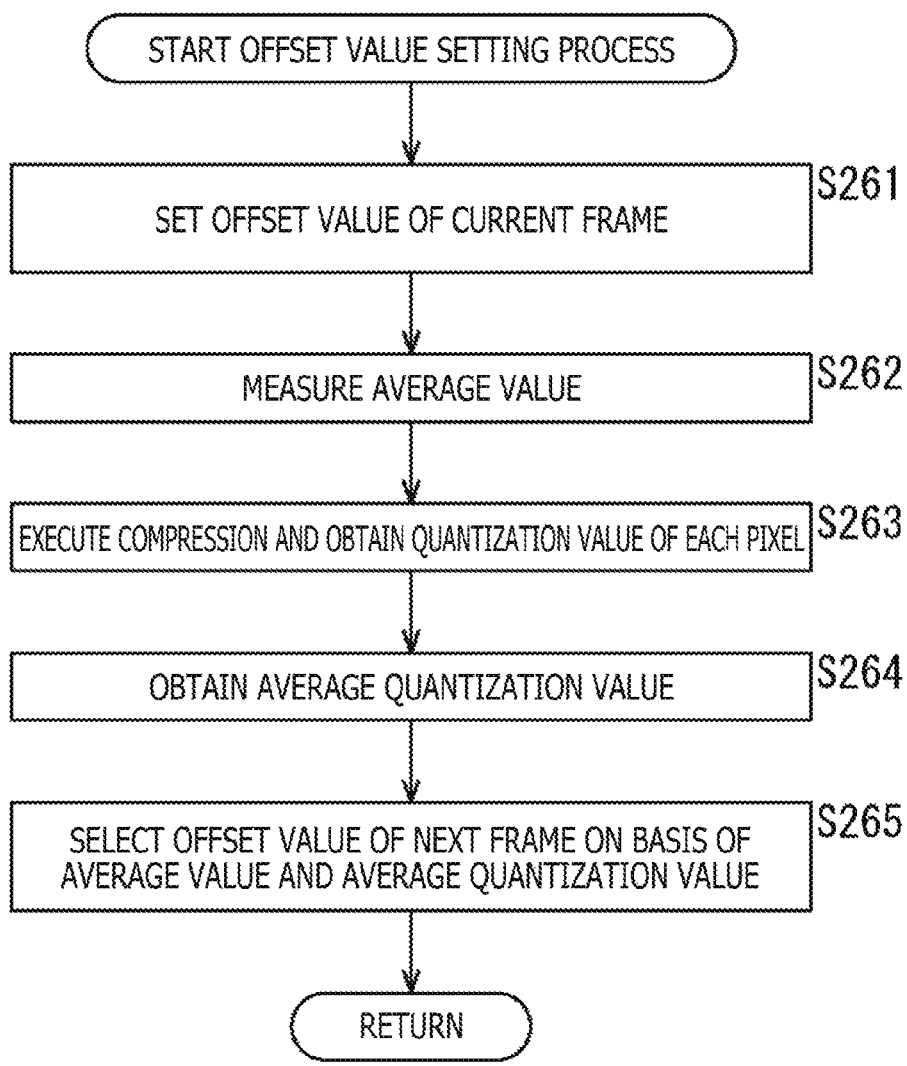
FIG. 21 is a flowchart for explaining an example of the flow of an offset value setting process.

An example of the flow of an offset value setting process in this case will be explained with reference to a flowchart in FIG. 21.

When the offset value setting process is started, the offset value supply section 233 supplies and sets, at step S261, a subtraction offset for the current frame to the computing section 212. The subtraction offset is an offset value (offset value that has been already set) set by the past process (for example, when the frame preceding the current frame was a process target). That is, the offset value is set on the basis of the image data on the frame (t−1) preceding the current frame (t).

At step S262, the average value measuring section 231 calculates an average pixel value of the image data on the current frame.

At step S263, the compression section 251 compresses the image data on the current frame in the manner similar to that of simple encoding which is executed by the encoding section 113, and obtains quantization values of respective pixels.

At step S264, the average value measuring section 252 obtains the average value (average quantization value) of the quantization values calculated at step S263.

At step S265, the offset value selection section 232 selects (sets) a subtraction offset for a frame next to the current frame with reference to the table in FIG. 16, for example, on the basis of the average pixel value calculated at step S262 and the average quantization value calculated at step S264. The offset value supply section 233 holds the subtraction offset until the next frame is processed. Then, at step S261 for the next frame, the offset value supply section 233 supplies the subtraction offset to the computing section 212.

When step S265 is completed, the offset value setting process is ended. Then, the process proceeds to FIG. 17.

As described so far, also in this case, the image processing system 100 can restrain an average signal value deviation (DC deviation) which is generated through encoding and decoding of an amplified signal group.

It is to be noted that, in the above explanation, image data on the current frame is processed and a subtraction offset for the next frame is set, but the subtraction offset setting section 211 may be configured to hold image data on one frame, and set a subtraction offset for the current frame by using image data on a frame preceding the current frame. The similar setting applies to an addition offset.

<Another Configuration of Image Processing System>

It is to be noted that the configuration of the image processing system 100 is not limited to the example in FIG. 14. For example, encoded data (a bitstream) may be transmitted from the encoding-side structure 102 to the decoding-side structure 103 through communication based on a prescribed communication scheme, as depicted in FIG. 22.

Figure 22:
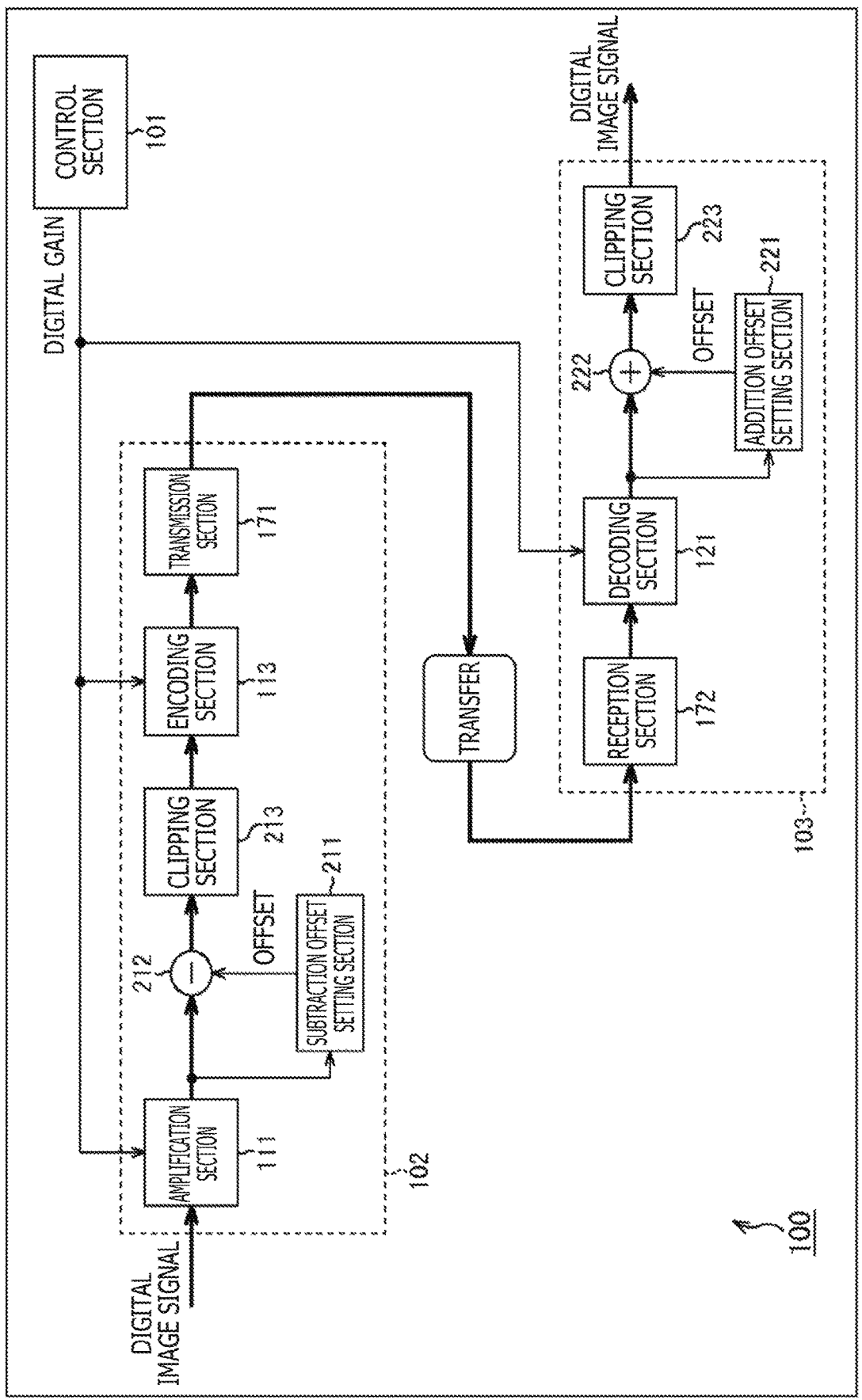
FIG. 22 is a block diagram depicting another configuration example of an image processing system that performs the method #2.

In this case, the image processing system 100 further includes the transmission section 171 in the encoding-side structure 102, as depicted in FIG. 22. In addition, the image processing system 100 further includes the reception section 172 in the decoding-side structure 103.

That is, for example, the transmission section 171 converts (for example, packetizes) a bitstream supplied from the encoding section 113, to transmission data of a format conforming to the communication standard, and supplies the transmission data to the reception section 172 via a prescribed transmission path. The reception section 172 receives the transmission data (e.g., packets) of the prescribed format, and decompresses the encoded data. The reception section 172 supplies the decompressed encoded data to the decoding section 121.

As a result of this, encoded data (a bitstream) having undergone simple encoding can be transmitted from an encoding side to a decoding side by a scheme conforming to a prescribed communication standard. Consequently, for example, an existing communication standard can be adopted as the communication standard in this case, and development thereof can be facilitated.

5. Third Embodiment

<Image Processing System>

Figure 23:
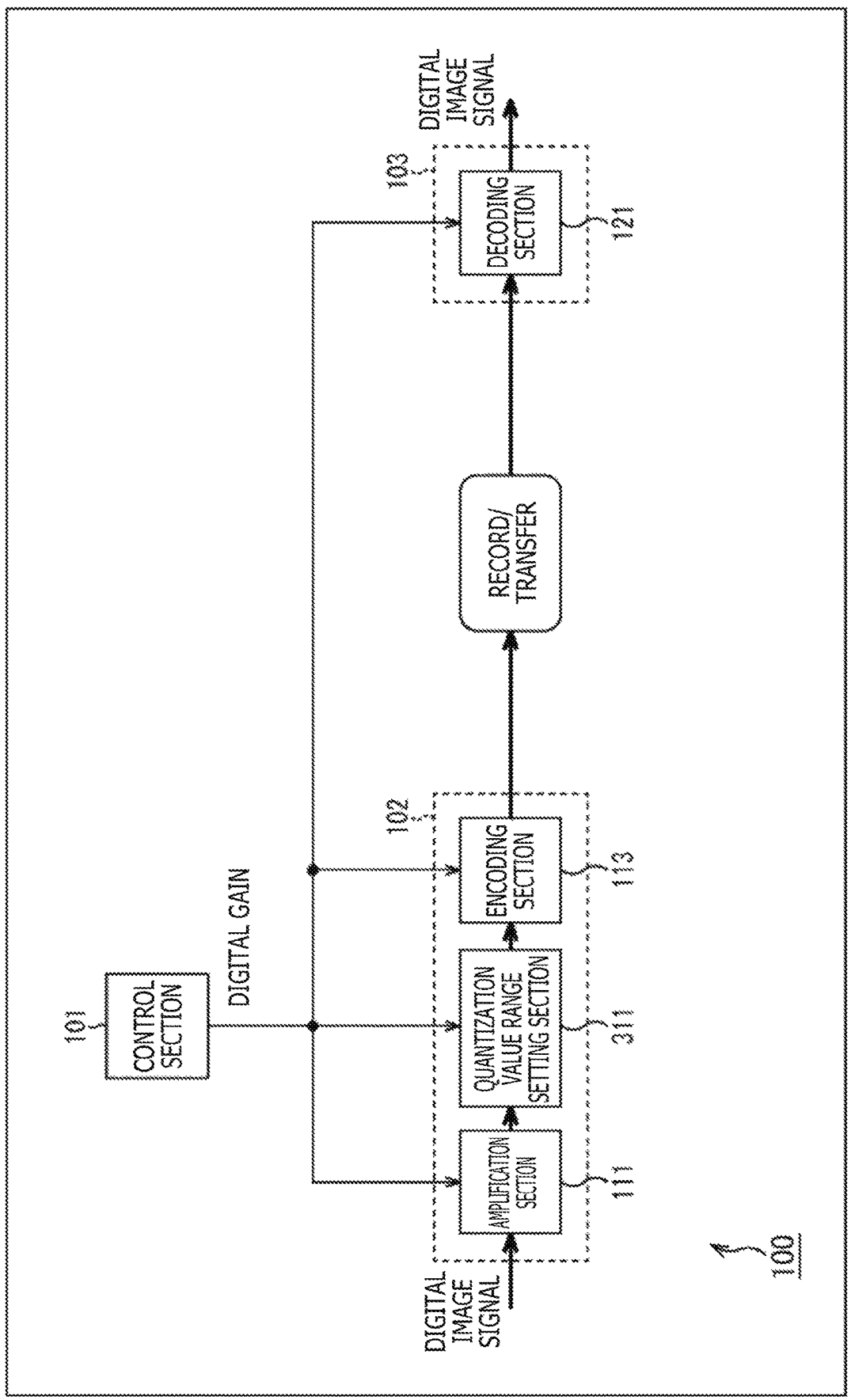
FIG. 23 is a block diagram depicting another configuration example of an image processing system that performs a method #3.

In the present embodiment, the method #3 in FIG. 4 will be explained. FIG. 23 is a block diagram depicting one example of a configuration according to one aspect of an image processing system to which the present technology is applied.

In FIG. 23, the encoding-side structure 102 of the image processing system 100 includes the amplification section 111, a quantization value range setting section 311, and the encoding section 113.

The quantization value range setting section 311 executes a process regarding setting of a quantization value range. For example, the quantization value range setting section 311 sets the range of a quantization value (qf) of (quantization which is executed in) simple encoding, according to the gain value of a digital gain supplied from the control section 101. As described previously with reference to FIG. 4, a limitation that depends on the gain value of the digital gain can be imposed on the value range of a quantization value (qf).

For example, the quantization value range setting section 311 previously has information regarding a table such as that depicted in FIG. 24, and sets the value range of a quantization value (qf) that corresponds to the gain value (i.e., the gain value of single amplification executed on an image) supplied from the control section 101, with reference to the table.

Figure 25B:
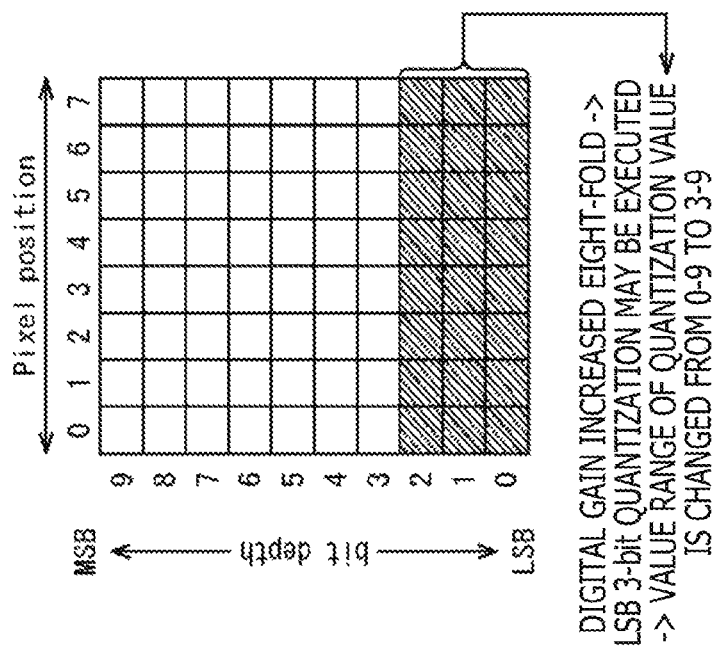
FIGS. 25A and 25B are diagrams depicting an example of setting the range of a quantization value.
Figure 25A:
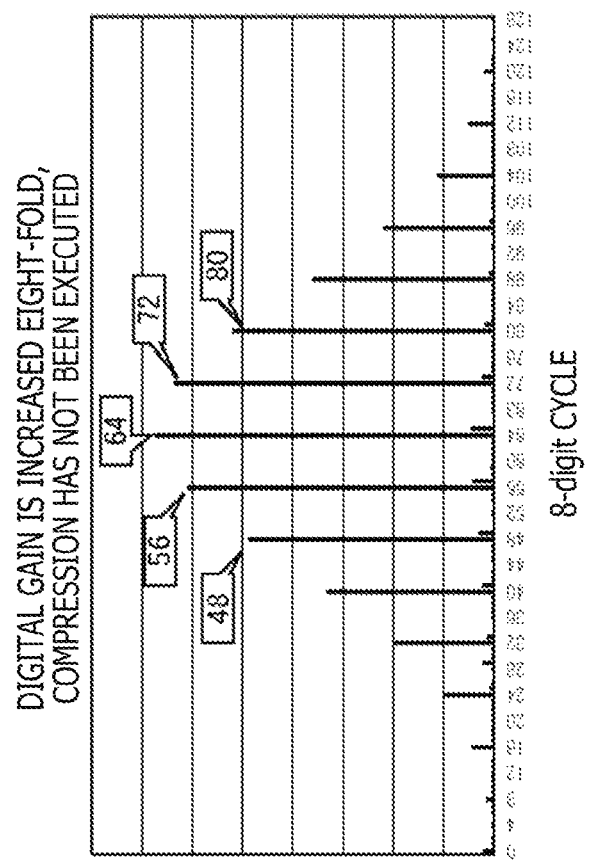

For example, in a case where image data is multiplied by a digital gain of an eight-fold gain value, as in FIG. 25A, information regarding lower 3 bits are degraded due to the digital gain, as depicted in FIG. 25B. Accordingly, while deterioration in the subjective image quality of a decoded image is restrained, loss of these lower 3 bits can be achieved through quantization. That is, a limitation is imposed such that the value range of a quantization value (qf) is changed from 0-9 to 3-9 (even if such a limitation is imposed, deterioration in the subjective image quality of a decoded image can be restrained).

Such a limitation is imposed on the value range of a quantization value (qf), whereby verification of encoding results can be omitted for the part where the limitation has been imposed on the value range of the quantization value (qf). Accordingly, an increase in the simple encoding load can be restrained.

Figure 26:
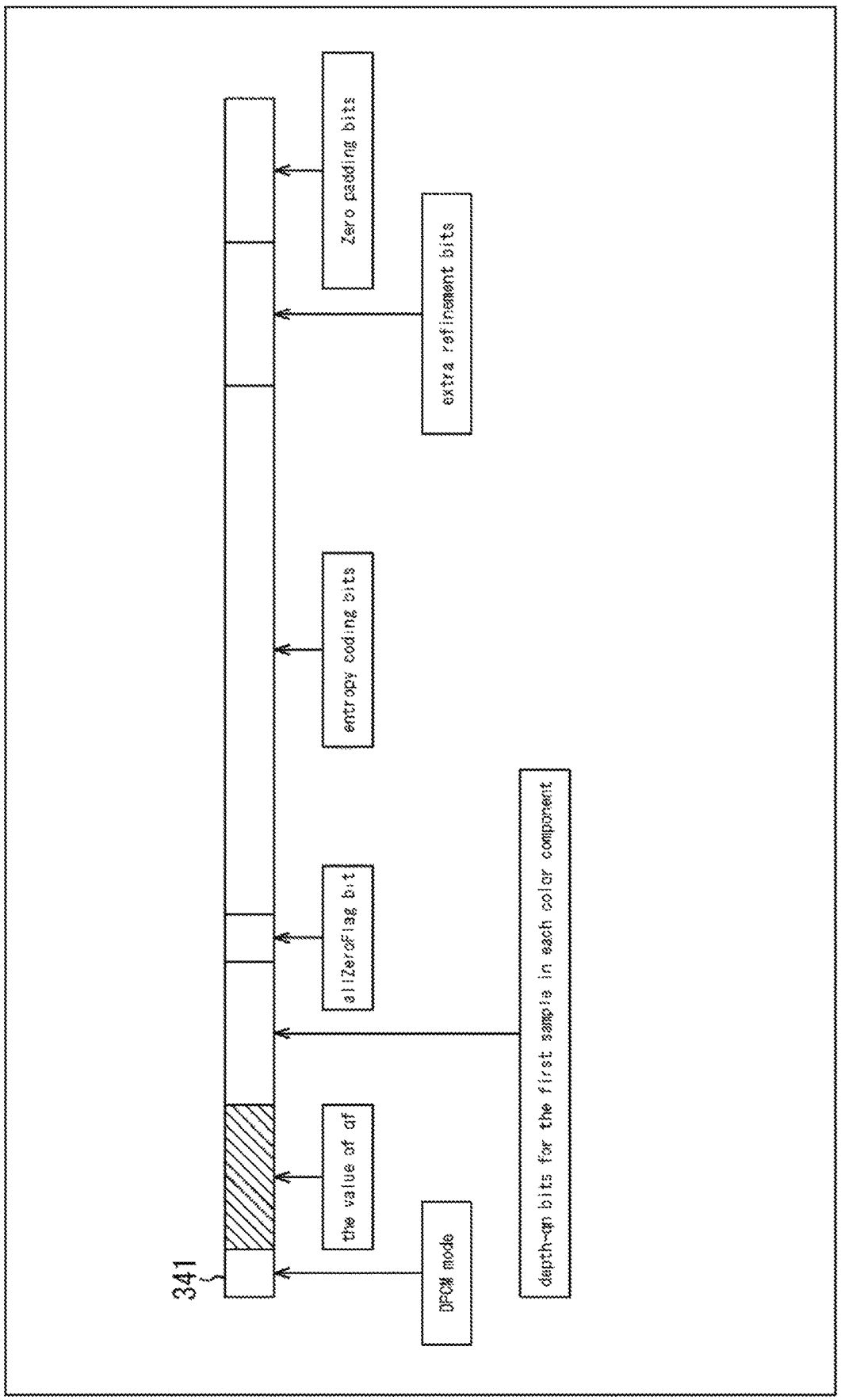
FIG. 26 is a diagram depicting a configuration example of encoded data.

In addition, FIG. 26 is a diagram depicting a main configuration example of encoded data. Encoded data 341, which is depicted in FIG. 26, contains information (the value of qf) representing a quantization value (qf) (a hatched part in FIG. 26). As described previously, when a limitation is imposed on the value range of a quantization value (qf), the quantization value (qf) can be expressed with fewer bits (word length). Accordingly, the code amount of information representing the quantization value (qf) in the encoded data can be suppressed. That is, deterioration in the encoding efficiency can be restrained, and deterioration in the subjective image quality of a decoded image can be restrained.

After setting the value range of a quantization value (qf), the quantization value range setting section 311 supplies information regarding the value range, the image data, etc. to the encoding section 113.

The encoding section 113 executes simple encoding of the image data in accordance with the supplied value range of a quantization value (qf). That is, the encoding section 113 verifies encoding results for the limited value range of a quantization value (qf), and selects an optimum one. In addition, through simple encoding, the encoding section 113 generates encoded data containing information regarding the value range of a quantization value (qf).

By the encoding section 113, the generated fixed length encoded data is recorded into a recording medium or is transmitted via a transmission medium.

The decoding-side structure 103 is disposed on a decoding-side for decoding encoded data generated by the encoding-side structure 102, and includes the decoding section 121, for example.

Under control of the control section 101, the decoding section 121 acquires the encoded data generated by the encoding section 113, via a recording medium or a transmission medium, and executes simple decoding of the encoded data.

During the simple decoding, the decoding section 121 makes reference to information regarding the value range of a quantization values (qf) contained in the encoded data, and executes inverse quantization on the basis of the information (on the basis of the value ranges of a quantization value (qf) indicated by the information). The decoding section 121 outputs the image data (digital image signal) thus decompressed, to the outside of the image processing system 100.

As described so far, when the method #3 is adopted, the image processing system 100 can restrain an increase in the encoding process load, and further, can restrain deterioration in the encoding efficiency.

<Flow of Encoding Process>

Figure 27:
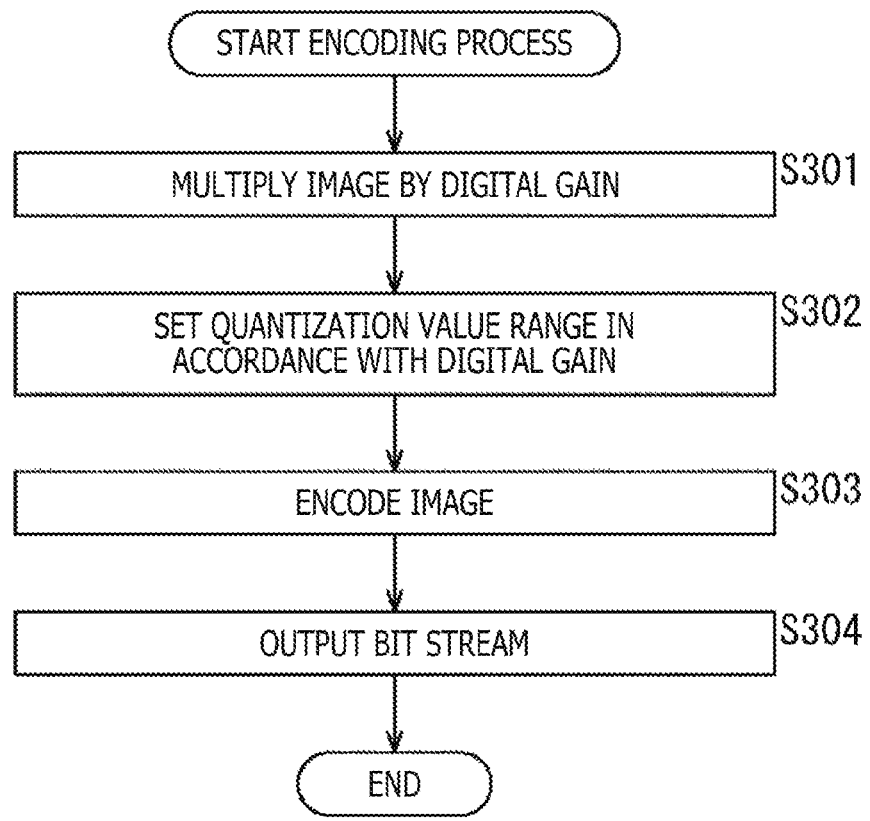
FIG. 27 is a flowchart for explaining an example of the flow of an encoding process based on the method #3.

An example of the flow of an encoding process which is executed in the encoding-side structure 102 in this case will be explained with a flowchart in FIG. 27.

When the encoding process is started, the amplification section 111 which is an encoding-side section of the image processing system 100 multiplies, at step S301, inputted image data by a digital gain of a gain value set by the control section 101.

At step S302, the quantization value range setting section 311 sets the range (value range) of a quantization value (qf) of simple encoding, according to the gain value of the digital gain.

At step S303, the encoding section 113 executes simple encoding of the image data multiplied by the digital gain at step S301, in accordance with the range (value range) of a quantization value (qf) set at step S302.

At step S304, the encoding section 113 outputs, in the form of a bitstream, for example, the encoded data thus generated. By the encoding section 113, the bitstream is recorded into a recording medium or is transmitted via a transmission medium, for example.

When step S304 is completed, the encoding process is ended.

<Flow of Decoding Process>

Figure 28:
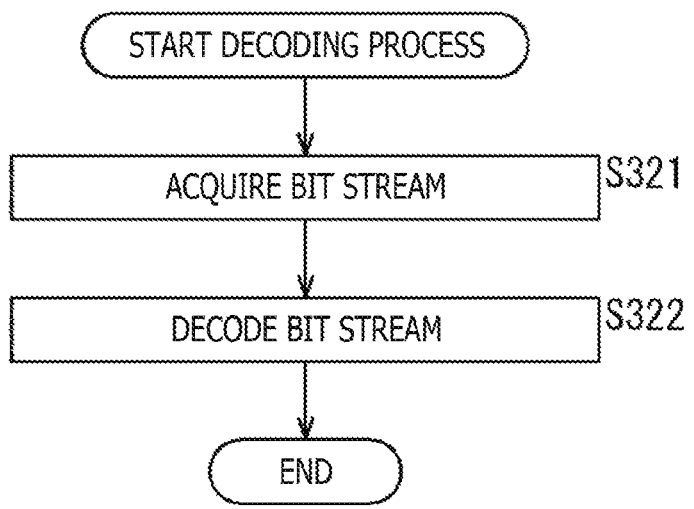
FIG. 28 is a flowchart for explaining an example of the flow of a decoding process based on the method #3.

Next, an example of the flow of a decoding process which is executed in the decoding-side structure 103 will be explained with reference to a flowchart in FIG. 28.

When the decoding process is started, the decoding section 121 in the decoding-side structure 103 acquires, at step S321, a bitstream (encoded data) generated in the encoding-side structure 102, via a recording medium or a transmission medium.

At step S322, the decoding section 121 executes simple decoding of the bitstream acquired at step S321. For example, the decoding section 121 executes simple decoding of each block of the bitstream (encoded data).

Here, the decoding section 121 makes reference to information regarding the value range of a quantization value (qf) contained in the encoded data, and executes inverse quantization on the basis of the information (on the basis of the value range of a quantization value (qf) indicated by the information). The decoding section 121 outputs the image data (digital image signal) thus decompressed, to the outside of the image processing system 100.

When step S322 is completed, the decoding process is ended.

By executing the aforementioned processes, the image processing system 100 can execute simple encoding and simple decoding of an amplified signal group by the method #3. Consequently, the image processing system 100 can restrain an increase in the encoding process load, and further, can restrain deterioration in the encoding efficiency.

<Another Configuration of Image Processing System>

It is to be noted that the configuration of the image processing system 100 is not limited to the example in FIG. 23. For example, encoded data (a bitstream) may be transmitted from the encoding-side structure 102 to the decoding-side structure 103 through communication based on a prescribed communication scheme, as depicted in FIG. 29.

Figure 29:
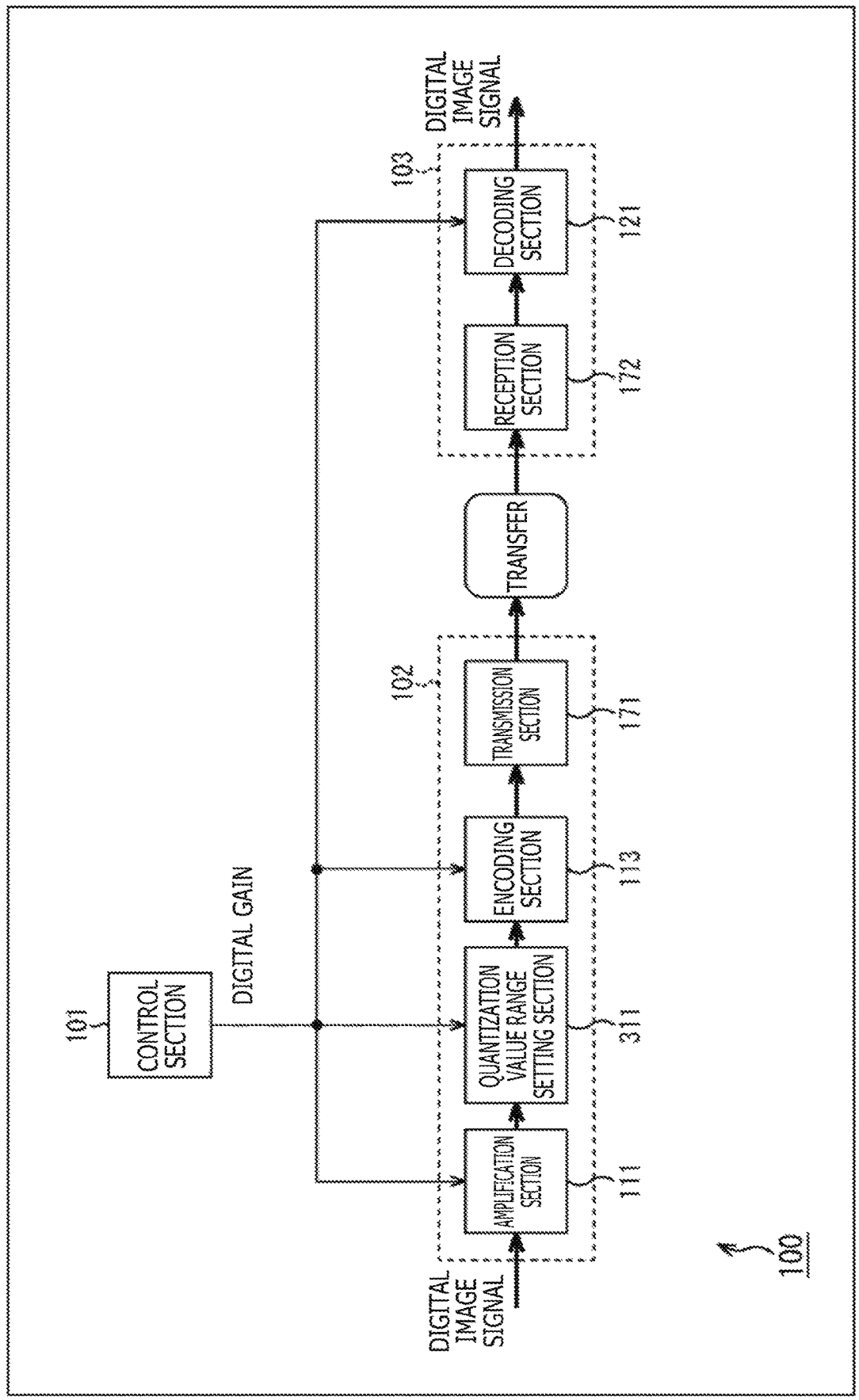
FIG. 29 is a block diagram depicting another configuration example of an image processing system that performs the method #3.

In this case, the image processing system 100 further includes the transmission section 171 in the encoding-side structure 102, as depicted in FIG. 29. In addition, the image processing system 100 further includes the reception section 172 in the decoding-side structure 103.

That is, for example, the transmission section 171 converts (for example, packetizes) the bitstream supplied from the encoding section 113, to transmission data of a format conforming to the communication standard, and supplies the transmission data to the reception section 172 via a prescribed transmission path. The reception section 172 receives the transmission data (e.g., packets) of the prescribed format, and decompresses the encoded data. The reception section 172 supplies the decompressed data to the decoding section 121.

In the manner described so far, encoded data (a bitstream) generated through simple encoding can be transmitted from the encoding side to the decoding side by a scheme conforming to a prescribed communication standard. Consequently, for example, an existing communication standard can be adopted as the communication standard in this case, and development thereof can be facilitated.

6. Fourth Embodiment

<Image Processing System>

Figure 30:
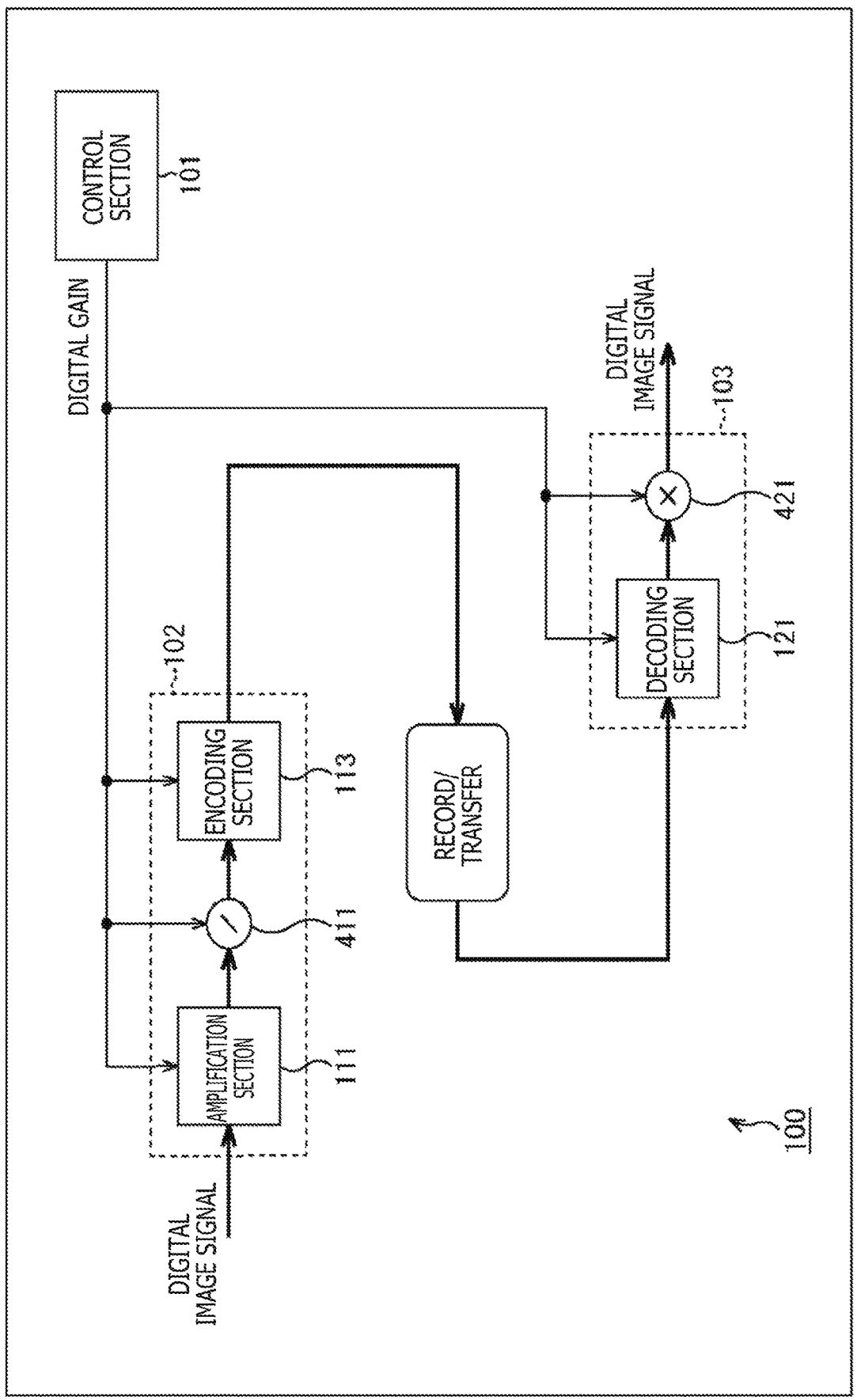
FIG. 30 is a block diagram depicting a main configuration example of an image processing system that performs a method #4.

In the present embodiment, the method #4 in FIG. 4 will be explained. FIG. 30 is a block diagram depicting one example of a configuration according to one aspect of an image processing system to which the present technology is applied. In FIG. 30, the encoding-side structure 102 of the image processing system 100 includes the amplification section 111, a computing section 411, and the encoding section 113.

The computing section 411 divides the image data supplied from the amplification section 111, that is, the image data multiplied by the digital gain, by the gain value of the digital gain supplied from the control section 101. That is, the computing section 411 cancels the digital gain by which the image data has been multiplied. Accordingly, the encoding section 113 executes simple encoding of the image data in which the digital gain has been canceled.

That is, simple encoding of the image data is executed while a dense state such as that depicted in FIG. 1A is established, for example. Accordingly, DC deviation which is generated through the simple encoding can be restrained. In addition, an increase in the pixel value difference generated by multiplication by a digital gain is also restrained. Thus, an increase in the DPCM residual can be restrained and an increase in the encoding efficiency can be restrained.

By the encoding section 113, the generated fixed length encoded data is recorded into a recording medium or is transmitted via a transmission medium.

In addition, in FIG. 30, the decoding-side structure 103 includes the decoding section 121 and a computing section 421. The computing section 421 multiplies the image data (each pixel value of the image data) decompressed by the decoding section, by a gain value of a digital gain supplied from the control section 101. That is, image data which has been multiplied by the digital gain is obtained. The computing section 421 outputs the image data which has been multiplied by the digital gain, to the outside of the image processing system 100.

As a result of this, the image processing system 100 can execute simple encoding and simple decoding of image data which has not been multiplied by a digital gain. That is, the influence of simple encoding and simple decoding can be inhibited from being exerted on image data which has been multiplied by a digital gain. Consequently, DC deviation can be restrained, and an increase in the encoding efficiency can be restrained.

<Flow of Encoding Process>

Figure 31:
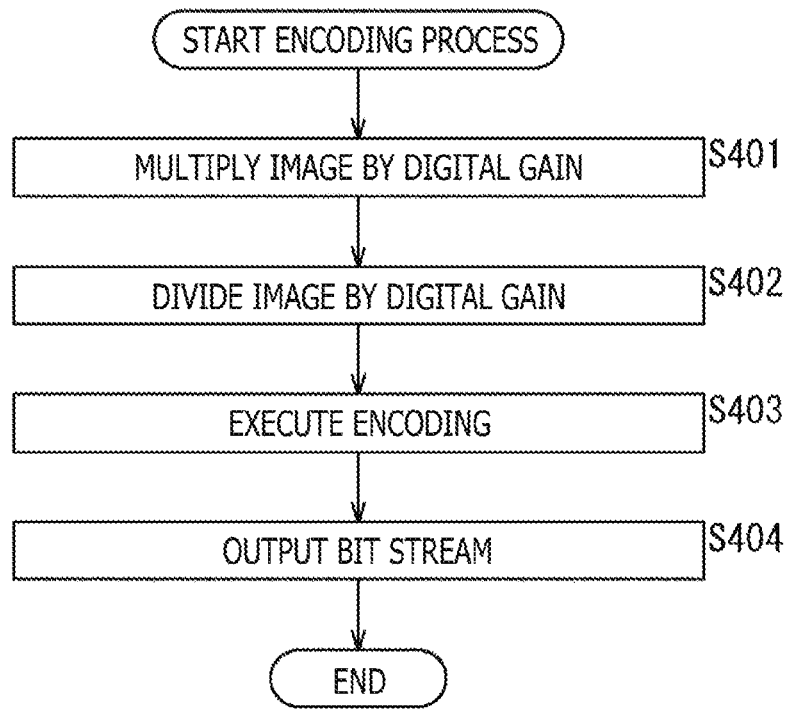
FIG. 31 is a flowchart for explaining an example of the flow of an encoding process based on the method #4.

Next, an example of an encoding process which is executed in the encoding-side structure 102 in this case will be explained with reference to a flowchart in FIG. 31.

When the encoding process is started, the amplification section 111 in the encoding-side structure 102 of the image processing system 100 multiplies, at step S401, inputted image data by a digital gain of a gain value set by the control section 101.

At step S402, the computing section 411 divides, by a gain value set by the control section 101, the image data multiplied by the digital gain, thereby cancels the digital gain.

At step S403, the encoding section 113 executes simple encoding of the image data in which the digital gain has been canceled. For example, the encoding section 113 executes simple encoding of each block of the image data.

At step S404, the encoding section 113 outputs, in the form of a bitstream, for example, the encoded data generated through the simple encoding. By the encoding section 113, the bitstream is recorded into a recording medium or is transmitted via a transmission medium, for example.

When step S404 is completed, the encoding process is ended.

<Flow of Decoding Process>

Figure 32:
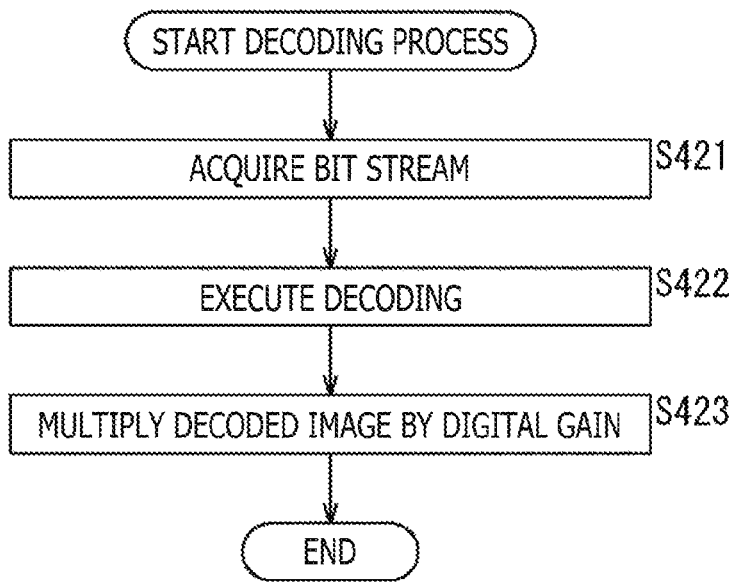
FIG. 32 is a flowchart for explaining an example of the flow of a decoding process based on the method #4.

Next, an example of the flow of a decoding process which is executed in the decoding-side structure 103 will be explained with reference to a flowchart in FIG. 32.

When the decoding process is started, the decoding section 121 in the decoding-side structure 103 acquires, at step S421, a bitstream (encoded data) generated by the encoding-side structure 102, via a recording medium or a transmission medium.

At step S422, the decoding section 121 executes simple decoding of the bitstream acquired at step S421. For example, the decoding section 121 executes simple decoding of each block of the encoded data.

At step S423, the computing section 421 multiplies the decoded image generated through simple decoding, by a digital gain of a gain value set by the control section 101.

When step S423 is completed, the decoding process is ended.

By executing the processes in the aforementioned manner, the image processing system 100 can encode and decode an amplified signal group by the method #4. Accordingly, the image processing system 100 can restrain an average signal value deviation (DC deviation).

Consequently, the image processing system 100 can restrain deterioration in the accuracy of data (as a measurement result), for example. In addition, deterioration in the subjective image quality of a decoded image can be restrained, for example.

In addition, the image processing system 100 can restrain an increase in the pixel value difference so that deterioration in the encoding efficiency can be restrained. It is to be noted that, although simple encoding of conducting division by a gain value after signal amplification has been explained above, the simple encoding is not limited to this. For example, simple encoding in which division by a gain value is conducted but signal amplification (that is, multiplication by a digital gain) is omitted may be executed. As a result of this, an increase in the encoding process load can be restrained.

<Another Configuration of Image Processing System>

It is to be noted that the configuration of the image processing system 100 is not limited to the example in FIG. 30. For example, encoded data (a bitstream) may be transmitted from the encoding-side structure 102 to the decoding-side structure 103 through communication based on a prescribed communication scheme, as depicted in FIG. 33.

Figure 33:
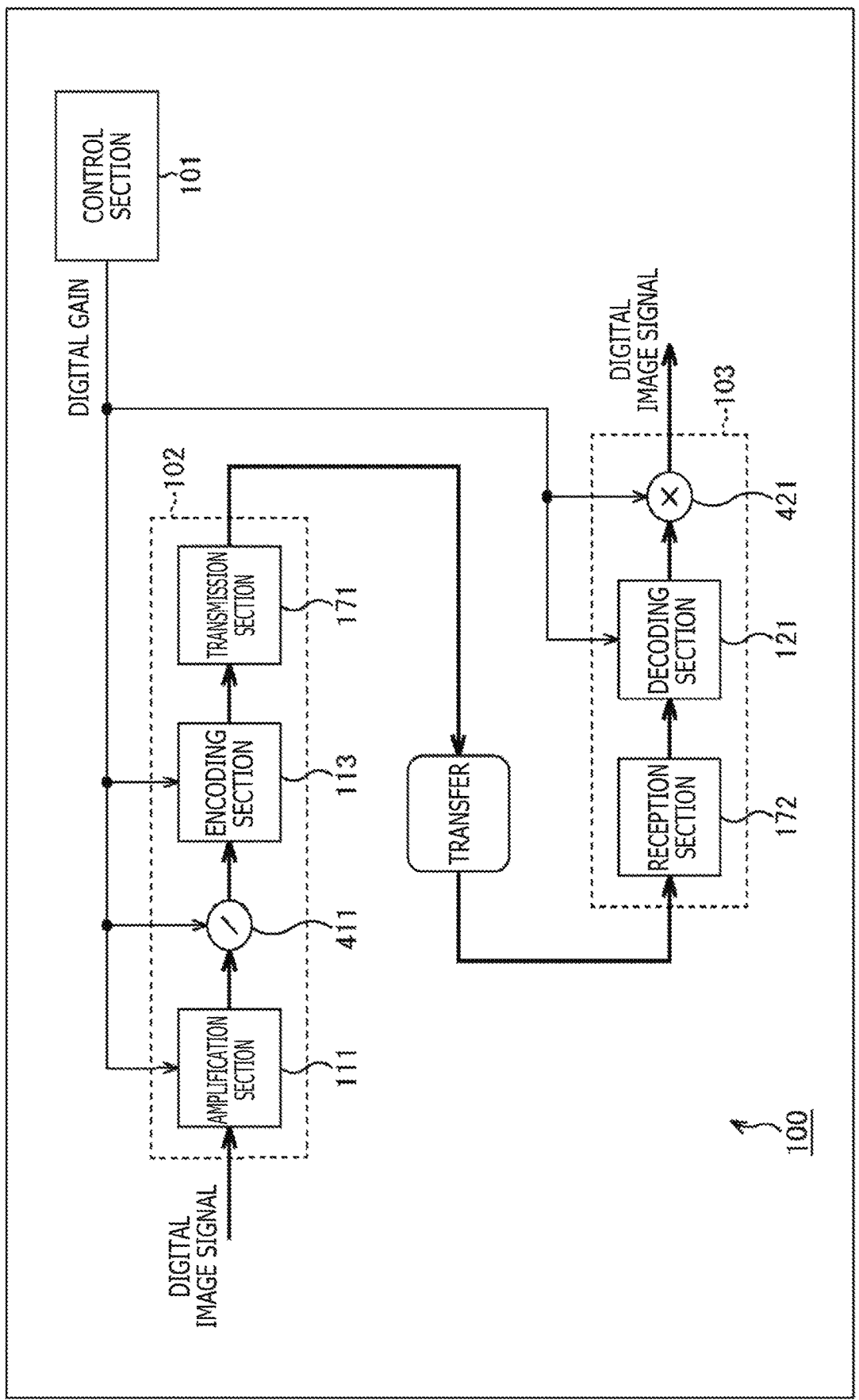
FIG. 33 is a block diagram depicting another configuration example of an image processing system that performs the method #4.

In this case, the image processing system 100 further includes a transmission section 171 in the encoding-side structure 102, as depicted in FIG. 33. In addition, the image processing system 100 further includes a reception section 172 in the decoding-side structure 103.

That is, for example, the transmission section 171 converts (for example, packetizes) a bitstream supplied from the encoding section 113, to transmission data of a format conforming to the communication standard, and supplies the transmission data (e.g., packets) to the reception section 172 via a prescribed transmission path. The reception section 172 receives the transmission data (e.g., packets) of the prescribed format, and decompresses the encoded data. The reception section 172 supplies the encoded data thus decompressed, to the decoding section 121.

In the manner described so far, encoded data (a bitstream) having undergone simple encoding can be transmitted from an encoding side to a decoding side by a scheme conforming to a prescribed communication standard. Consequently, for example, an existing communication standard can be adopted as the communication standard in this case, and development thereof can be facilitated.

7. Fifth Embodiment

<Application Example: Imaging Element>

Figure 34:
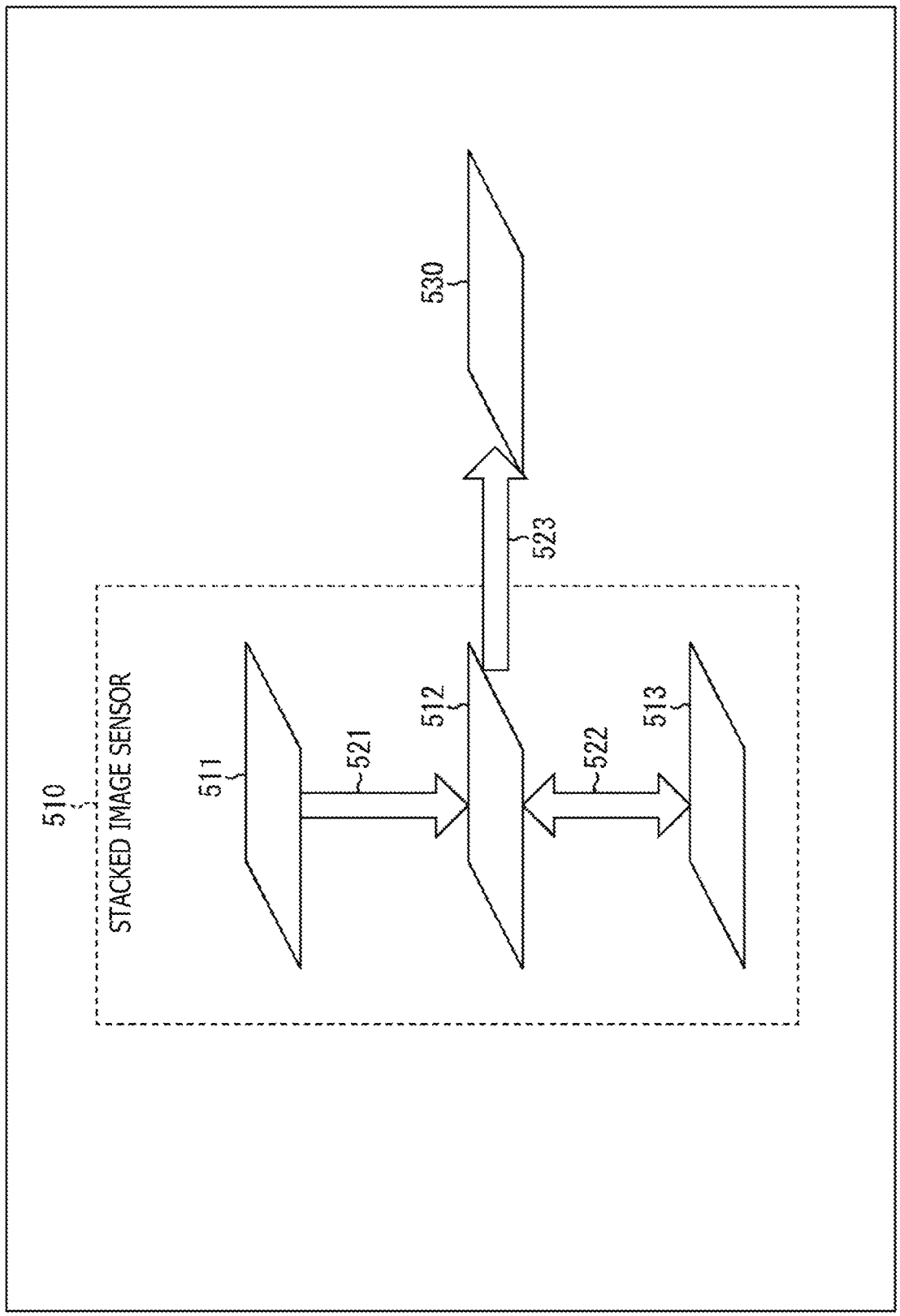
FIG. 34 is a diagram depicting a main configuration example of an imaging element to which the present technology is applied.

Next, an example of applying the present technology described so far to a certain device will be explained. FIG. 34 is a block diagram depicting a main configuration example of a stacked image sensor 510 to which the present technology is applied. The stacked image sensor 510 depicted in FIG. 34 is an image sensor (imaging element) that captures an image of a subject, obtains digital data (image data) about the captured image, and outputs the image data.

As depicted in FIG. 34, the stacked image sensor 510 includes three semiconductor substrates 511 to 513. These semiconductor substrates that are in a state of being stacked are sealed to be formed into a module (formed integrally). That is, these semiconductor substrates constitute a multiplayer structure (stacked structure). Electronic circuits are formed on the respective semiconductor substrates 511 to 513. The circuits formed on the respective semiconductor substrates are connected to each other through vias etc. A path between the (circuits formed on the) semiconductor substrates is also referred to as bus. For example, through a bus 521, data, etc. can be exchanged between the circuit on the semiconductor substrate 511 and the circuit on the semiconductor substrate 512. Also, through a bus 522, data, etc. can be exchanged between the circuit on the semiconductor substrate 512 and the circuit on the semiconductor substrate 513.

Further, an interface 523 of the stacked image sensor 510 is formed on the circuit formed on the semiconductor substrate 512. That is, through the interface 523, the circuit formed on the semiconductor substrate 512 can exchange data etc. with a circuit (e.g., a circuit formed on a circuit substrate 530) external to the stacked image sensor 510. Communication based on a communication scheme conforming to a prescribed communication standard is performed through the interface 523. The communication standard is arbitrarily defined. For example, MIPI (Mobile Industry Processor Interface), SLVS-EC (Scalable Low Voltage Signaling Embedded Clock), or another standard may be used. It is to be noted that the specific configuration of the interface 523 is arbitrarily defined. For example, not only a component for controlling inputs and outputs, but also transmission paths such as a bus and a cable may be included in the interface 523.

In the stacked image sensor 510, the multilayer structure of the semiconductor substrates is formed in the module, as described above, whereby larger circuits can be mounted without involving an increase in the sizes of the semiconductor substrates. That is, in the stacked image sensor 510, larger circuits can be mounted while an increase in the cost is restrained.

Figure 35:
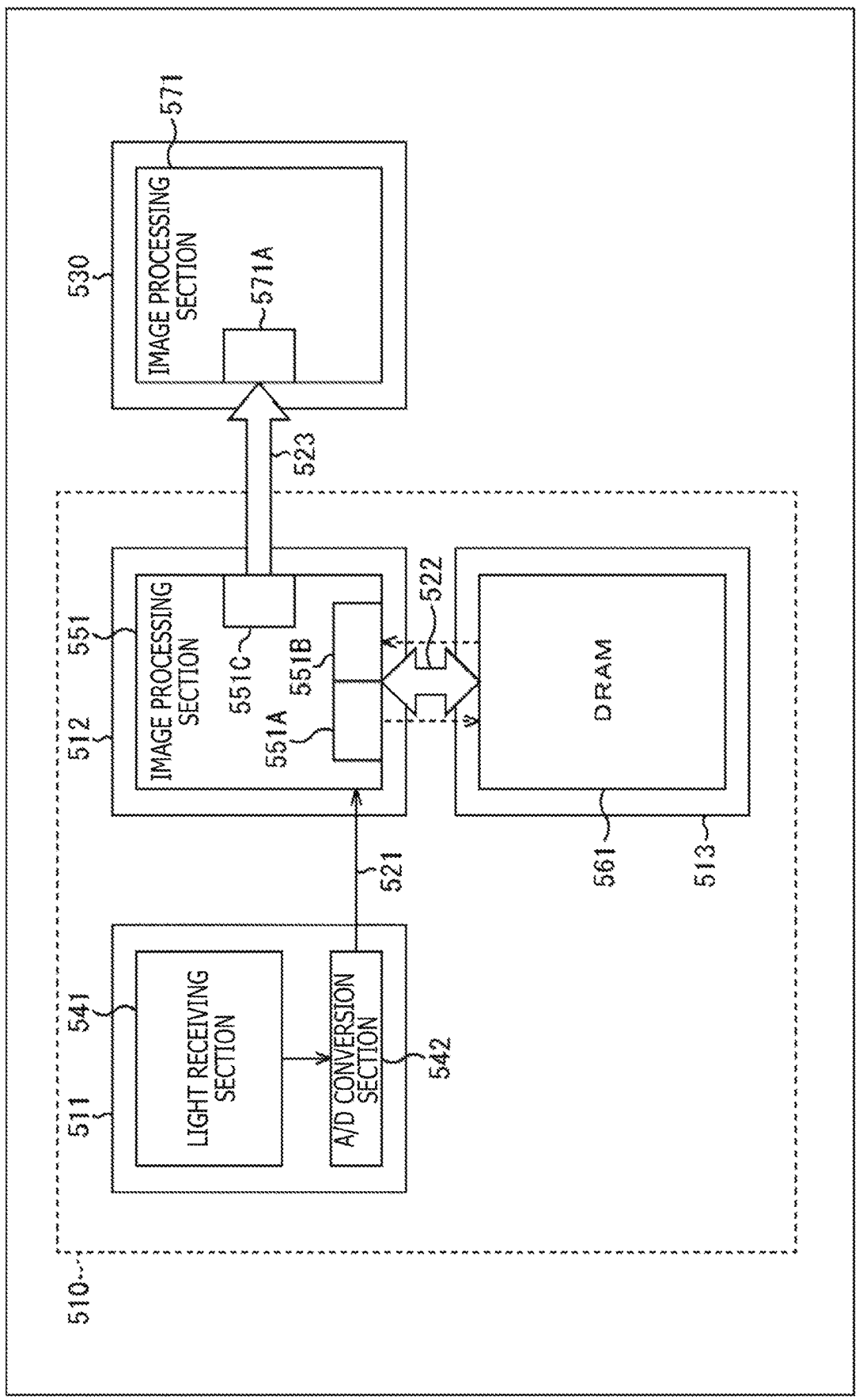
FIG. 35 is a diagram depicting a main configuration example of an imaging element to which the present technology is applied.

FIG. 35 depicts an example of the configuration of the circuits formed on the respective semiconductor substrates. For convenience of explanation the semiconductor substrates 511 to 513 are arranged on the same plane in FIG. 35. However, in actual, the semiconductor substrates 511 to 513 are stacked, as depicted in FIG. 34.

A light receiving section 541, an A/D conversion section 542, etc. are formed on the top semiconductor substrate 511. The light receiving section 541 includes a plurality of unit pixels each having a photoelectric conversion element such as a diode, and performs, for each of unit pixels, photoelectric conversion of incident light, generates electric signals (pixel signals) of charges which correspond to the incident light, and outputs the signals to the A/D conversion section 542.

The A/D conversion section 542 generates pixel data which is digital data, by executing A/D conversion of the pixel signals supplied from the light receiving section 541. The A/D conversion section 542 supplies, as image data, a set of the generated pixel data on the unit pixels to the semiconductor substrate 512 via the bus 521.

An image processing section 551 which is a logic circuit that executes image processing etc. is formed on the middle semiconductor substrate 512. Upon acquiring the image data supplied from the semiconductor substrate 511 via the bus 521, the image processing section 551 executes prescribed image processing on the image data. The details of the image processing are arbitrarily defined. For example, the image processing may include correcting defect pixels, detecting a phase difference for autofocusing, adding pixels, a digital gain, noise reduction, and the like. Other processes may be included.

A DRAM (Dynamic Random Access Memory) 561 is formed on the bottom semiconductor substrate 513. The DRAM 561 is capable of storing data etc. supplied from the semiconductor substrate 512 (image processing section 551) via the bus 522. Further, the DRAM 561 is capable of, in response to a request from the semiconductor substrate 512 (image processing section 551) or the like, reading out stored data etc. and suppling the data etc. to the semiconductor substrate 512 via the bus 522. That is, with use of the DRAM 561, the image processing section 551 can execute image processing of temporarily holding image data that is being processed, for example. For example, images are captured at a high-speed frame rate, the captured images in the frames are stored into the DRAM 561, and the images are read out at a low-speed frame rate and outputted, whereby what is called slow motion imaging can be performed.

With use of the DRAM 561 thus configured, the image processing section 551 encodes (compresses) image data, records encoded data thus generated into the DRAM 561, and generates image data (decoded image data) by reading out the encoded data from the DRAM 561 and decoding the encoded data. For example, the image processing section 551 includes an encoding section 551A and a decoding section 551B. The encoding section 551A encodes image data, supplies the encoded data thus generated to the DRAM 561 to record the encoded data. The decoding section 551B generates image data (decoded image data) by decoding encoded data read out from the DRAM 561. When image data is recorded as encoded data (compressed data) into the DRAM 561 in this manner, the amount of data stored in the DRAM 561 can be reduced. Accordingly, the storage region in the DRAM 561 and the band use efficiency of the bus 522 can be improved. Consequently, an increase in the capacity of the DRAM 561 and an increase in the band width of the bus 522 can be restrained so that an increase in the production cost can be restrained.

When the aforementioned encoding-side structure 102 (for example, FIG. 5, FIG. 14, FIG. 23, or FIG. 30) of the image processing system 100 is adopted as the encoding section 551A and the decoding-side structure 103 (for example, FIG. 5, FIG. 14, FIG. 23, or FIG. 30) is adopted as the decoding section 551B, the aforementioned effects of the image processing system 100 (for example, FIG. 5, FIG. 14, FIG. 23, or FIG. 30) can be provided. For the specific configuration of the encoding-side structure 102 and the specific configuration of the decoding-side structure 103, any of those based on the methods #1 to #4 may be adopted.

As a result of this, even in a case where, for example, high-digital gain imaging of multiplying image data by a digital gain by means of the image processing section 551 is executed, an average signal value deviation which is generated by encoding and decoding of an amplified signal group can be restrained. Consequently, for example, deterioration in the accuracy of data (as a measurement result) can be restrained. In addition, for example, deterioration in the subjective image quality of a decoded image can be restrained. Moreover, deterioration in the encoding efficiency can be restrained so that deterioration in the subjective image quality of a decoded image can be restrained.

In addition, an image processing section 571 that is a logic circuit for executing image processing etc. is formed on the circuit substrate 530. Upon acquiring image data supplied from the semiconductor substrate 512 (image processing section 551) of the stacked image sensor 510 via the interface 523, the image processing section 571 executes prescribed image processing on the image data. The details of the image processing are arbitrarily defined.

That is, the image processing section 551 is capable of supplying data etc. to the image processing section 571 via the interface 523 (outputting data etc. to the outside of the stacked image sensor 510). In such a case, the image processing section 551 encodes (compresses) image data and outputs the encoded data. For example, the image processing section 551 includes an encoding section 551C, and the image processing section 571 includes a decoding section 571A. The encoding section 551C encodes image data and outputs the encoded data via the interface 523. The decoding section 571A generates image data (decoded image data) by decoding the encoded data supplied via the interface 523. The image processing section 571 executes image processing on the decoded image data thus generated.

When encoded data (compressed data) is transmitted via the interface 523 in this manner, the amount of transmission data can be reduced. Accordingly, the efficiency of using the band of the interface 523 can be improved. That is, an increase in the band width of the interface 523 can be restrained so that an increase in the production cost can be restrained.

When the aforementioned encoding-side structure 102 (for example, FIG. 13, FIG. 22, FIG. 29, or FIG. 33) of the image processing system 100 is adopted as the encoding section 551C and the decoding-side structure 103 (for example, FIG. 13, FIG. 22, FIG. 29, or FIG. 33) is adopted as the decoding section 571A, the aforementioned effects of the image processing system 100 (for example, FIG. 13, FIG. 22, FIG. 29, or FIG. 33) can be provided. For the specific configuration of the encoding-side structure 102 and the specific configuration of the decoding-side structure 103, any of those based on the methods #1 to #4 may be adopted.

As a result of this, even in a case where, for example, high-digital gain imaging of multiplying image data by a digital gain by means of the image processing section 551 is executed, an average signal value deviation which is generated through encoding and decoding of an amplified signal group can be restrained. Consequently, for example, deterioration in the accuracy of data (as a measurement result) can be restrained. In addition, for example, deterioration in the subjective image quality of a decoded image can be restrained. Moreover, deterioration in the encoding efficiency can be restrained so that deterioration in the subjective image quality of a decoded image can be restrained.

Figure 36:
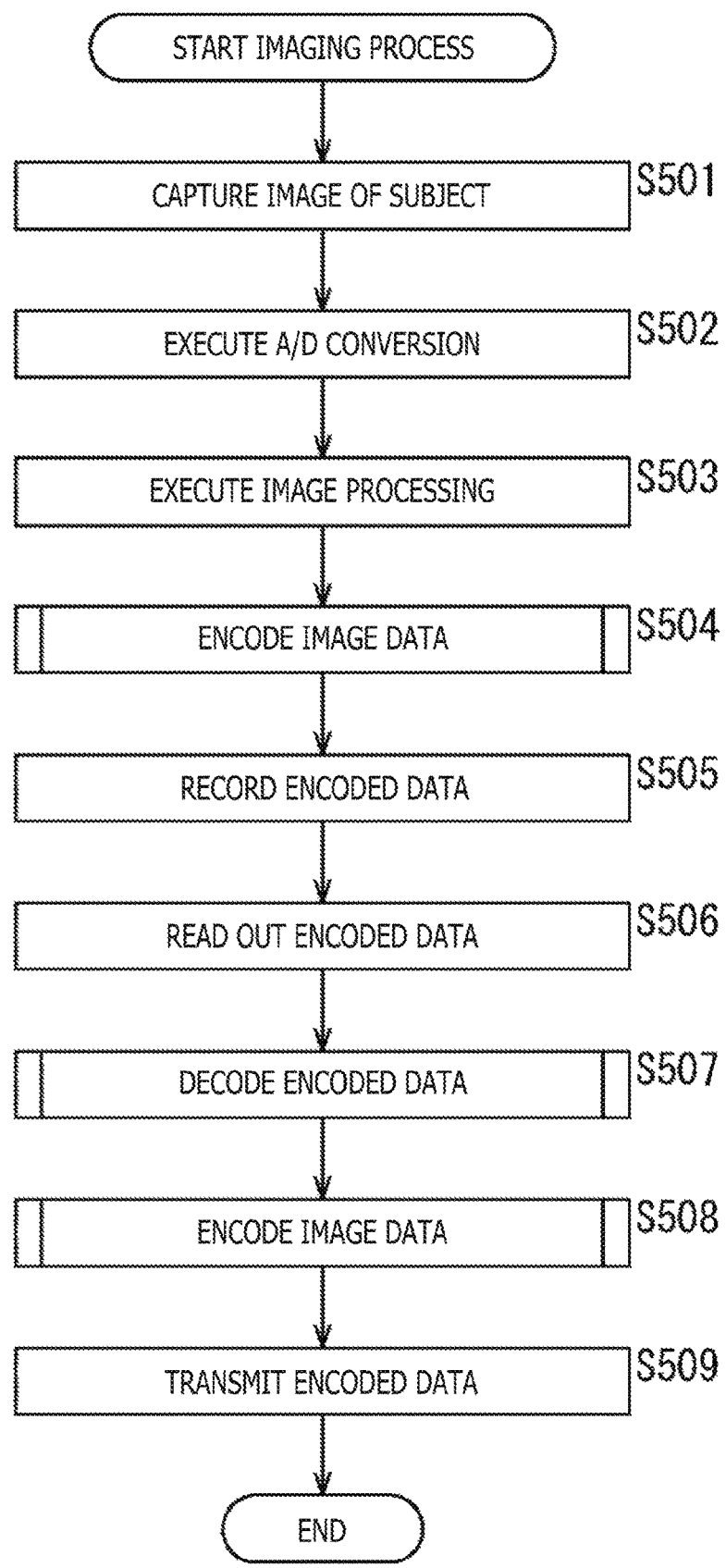
FIG. 36 is a flowchart for explaining an example of the flow of an imaging process.

An example of the flow of an imaging process of capturing an image by using the stacked image sensor 510 will be explained with reference to a flowchart in FIG. 36.

When the imaging process is started, the light receiving section 541 captures an image of a subject, and photoelectrically converts incident light, at step S501.

At step S502, the A/D conversion section 542 executes A/D conversion of an electric signal generated at step S501, thereby generates image data which is digital data.

At step S503, the image processing section 551 acquires the image data generated at step S502 via the bus 521, and executes prescribed image processing on the image data, that is, multiplies the image data by a digital gain, for example.

At step S504, the encoding section 551A encodes image data to be recorded into the DRAM 561. Encoding in this case is executed in a way explained previously in any of the first to fourth embodiments (that is, by any one of the methods #1 to #4).

At step S505, the DRAM 561 acquires the encoded data generated at step S505 via the bus 522, and records the encoded data.

At step S506, the DRAM 561 reads out, from among encoded data recorded therein, encoded data corresponding to a request, and supplies the read-out data to the image processing section 551 via the bus 522.

At step S507, the decoding section 551B decodes the encoded data. Decoding in this case is executed in a way explained previously in any of the first to fourth embodiments (that is, by any one of the methods #1 to #4). The image processing section 551 may execute prescribed image processing on the image data (decoded image data) generated by decoding.

At step S508, the encoding section 551C encodes image data to be outputted to the outside of the stacked image sensor 510. Encoding in this case is executed in a way explained previously in any of the first to fourth embodiments (that is, by any one of the methods #1 to #4).

At step S509, the encoding section 551C supplies the encoded data generated at step S508, to the outside of the stacked image sensor 510 (e.g., to the image processing section 571 of the circuit substrate 530) via the interface 523.

The decoding section 571A of the image processing section 571 generates image data (decoded image data) by decoding the supplied encoded data. Decoding in this case is executed in a way explained previously in any of the first to fourth embodiments (that is, by any one of the methods #1 to #4). The image processing section 571 executes prescribed image processing on the generated image data.

When step S509 is completed, the imaging process is ended.

By executing the imaging process in the manner described so far, the stacked image sensor 510 can restrain an average signal value deviation which is generated through encoding and decoding of an amplified signal group. That is, for example, while deterioration in the subjective image quality of a captured image obtained by high-digital gain imaging is restrained, an increase in the production cost of the stacked image sensor 510 can be restrained.

It is to be noted that the configuration of the stacked image sensor 510 is arbitrarily defined, and thus, is not limited to the aforementioned example. For example, the semiconductor substrates 511 to 513 in the stacked image sensor 510 do not need to be stacked. For example, the semiconductor substrates 511 to 513 may be arranged side by side so as to have a plane shape. In addition, the circuit configuration formed on each of the semiconductor substrates 511 to 513 is not limited to the aforementioned example.

Moreover, the number of semiconductor substrates in the stacked image sensor 510 may be two or less, or may be four or more. For example, the image processing section 551 and the DRAM 561 (including the bus 522) may be formed on one semiconductor substrate.

8. Sixth Embodiment

<Application Example: Imaging Device>

Figure 37:
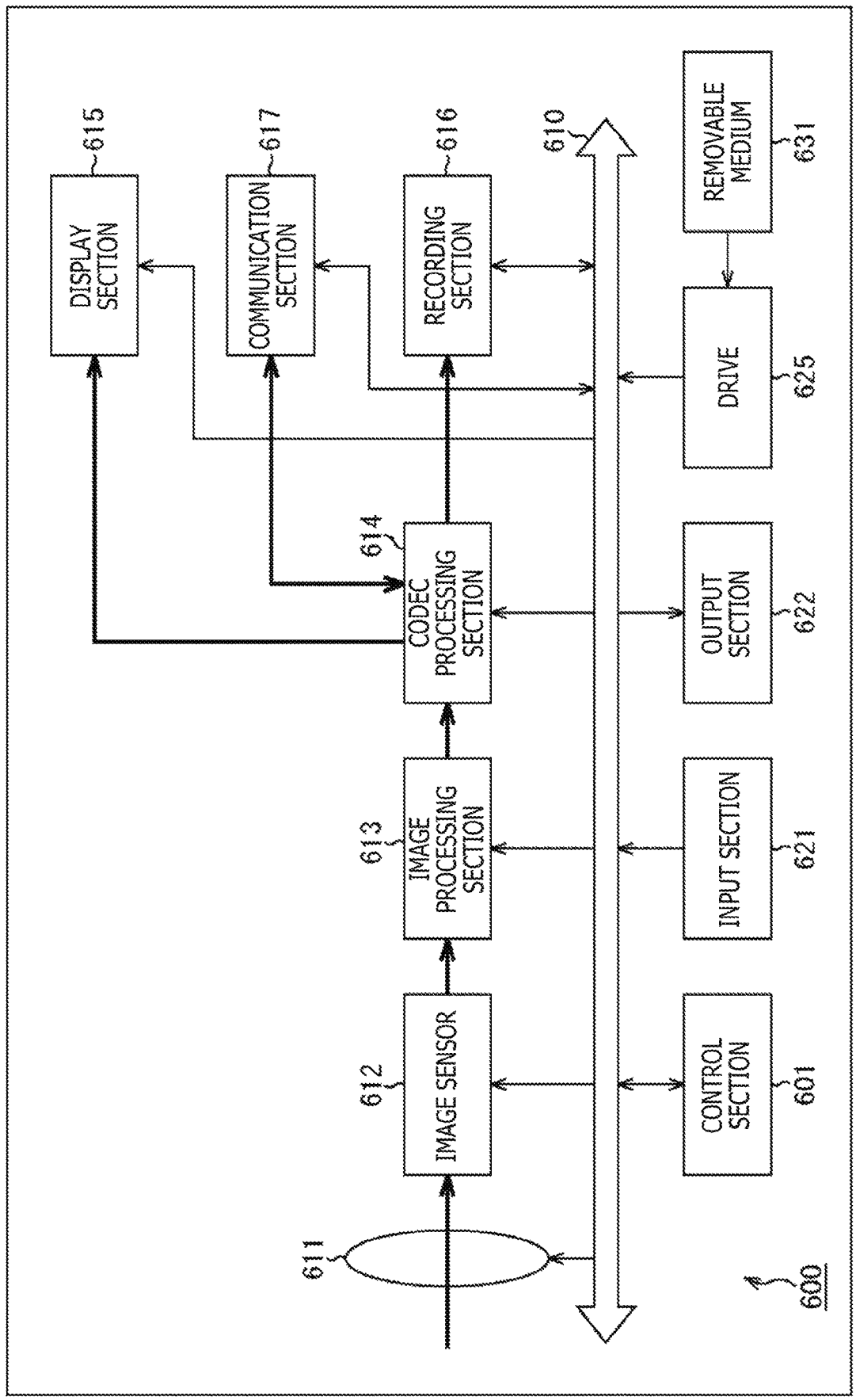
FIG. 37 is a diagram depicting a main configuration example of an imaging device to which the present technology is applied.

FIG. 37 is a block diagram depicting a main configuration example of an imaging device to which the present technology is applied. An imaging device 600 depicted in FIG. 37 is a device that captures an image of a subject and outputs the image of the subject in the form of an electric signal.

As depicted in FIG. 37, the imaging device 600 includes a control section 601 and a bus 610. Further, the imaging device 600 includes an optical section 611, an image sensor 612, an image processing section 613, a codec processing section 614, a display section 615, a recording section 616, and a communication section 617. Moreover, the imaging device 600 includes an input section 621, an output section 622, and a drive 625.

The control section 601 is connected, via the bus 610, with the optical section 611 to the communication section 617, the input section 621, the output section 622, and the drive 625. By controlling the operations of these sections, the control section 601 controls the entire process in the imaging device 600.

Light (incident light) from a subject enters the image sensor 612 via the optical section 611. The optical section 611 includes an arbitrary optical element, and is driven, under control of the control section 601, to exert a certain optical influence on the incident light. For example, the optical section 611 includes a lens that adjusts the focal point with respect to a subject, and collects light from the focused position, an aperture that executes exposure adjustment, a shutter that controls an imaging timing, and the like.

The image sensor 612 receives the incident light, and executes photoelectric conversion thereon to generate image data. The image sensor 612 supplies the image data to the image processing section 613.

The image processing section 613 executes prescribed image processing on the supplied image data. The details of the image processing are arbitrarily defined. For example, the image processing section 613 may be configured to execute demosaic processing, advanced correction of defective pixels, or the like, on the supplied image data (RAW data). The image processing section 613 supplies the image data having undergone the image processing, to the codec processing section 614.

The codec processing section 614 encodes image data, and decodes encoded data, as appropriate. For example, the codec processing section 614 encodes image data supplied from the image processing section 613, by a prescribed encoding method that is suitable for encoding the image data. An encoding method in this case is arbitrarily defined. For example, an advanced compression method such as JPEG (Joint Photographic Experts Group), JPEG2000, MPEG (Moving Picture Experts Group), AVC (Advanced Video Coding), or HEVC (High Efficiency Video Coding) can be adopted.

The codec processing section 614 is capable of generating and supplying encoded data to the recording section 616, for example, to record the encoded data, or generating and supplying encoded data to the communication section 617 to output the encoded data to the outside of the imaging device 600. It is to be noted that the codec processing section 614 may supply image data supplied from the image processing section 613, for example, to the display section 615 without encoding the image data, and causes the display section 615 to display the image.

In addition, the codec processing section 614 is capable of reading out encoded data recorded in the recording section 616, for example. For example, the codec processing section 614 is capable of outputting the encoded data to the outside of the imaging device 600 via the communication section 617.

Moreover, the codec processing section 614 is also capable of decompressing image data by decoding the encoded data. For example, the codec processing section 614 is capable of supplying the decompressed image data to the display section 615 such that an image corresponding to the image data is displayed. Furthermore, for example, the codec processing section 614 is capable of encoding the decompressed image data by another method, and then, supplying the encoded data thus generated to the recording section 616 to record the encoded data, or supplying the encoded data to the communication section 617 to output the encoded data to the outside of the imaging device 600.

For example, under control of the control section 601, the codec processing section 614 executes a necessary process by selecting any one of the aforementioned processes, as appropriate.

The display section 615 includes an arbitrary display device such as an LCD (Liquid Crystal Display), is driven, under control of the control section 601, to cause the display device to display an image of image data supplied from the codec processing section 614.

The recording section 616 includes an arbitrary recording medium such as a hard disk or a flash memory, is driven, under control of the control section 601, to cause the recording medium to record encoded data supplied from the codec processing section 614. Any type medium can be used as the recording medium. A removable medium that is attachable to and detachable from the imaging device 600 may be used. In this case, the recording section 616 includes a drive (not illustrated) that can access data in a removable medium when the removable medium is attached to the drive, and of the removable medium attached to the drive. The recording section 616 may include a plurality of the recording media, or may include a plurality of types of the recording media.

The communication section 617 is a communication interface that communicates with a device external to the imaging device 600 by a prescribed communication scheme, and is driven under control of the control section 601. The communication section 617 may perform any kind of communication, which may be wired communication or may be wireless communication. The communication section 617 transmits encoded data supplied from the codec processing section 614, for example, to a separate device.

The input section 621 includes an arbitrary input device (e.g., a jog dial (registered trademark), a key, a button, or a touch panel), an external input terminal, or the like, and is, under control of the control section 601, driven to receive an operation input from a user or the like, and receive a control signal, data, etc. supplied from the outside. The input section 621 supplies the received information (the operation input, data, etc.) to the control section 601 via the bus 610. The control section 601 executes a process regarding control of the imaging device 600 in accordance with the information.

The output section 622 includes an arbitrary output device (e.g., an LED (Light Emitting Diode), a display, or a loudspeaker), an external output terminal, or the like, and is driven, under control of the control section 601, to output information (e.g., data or a control signal) supplied from the control section 601 or the like (for example, display an image, output a sound, or output information to a separate device).

The drive 625 is driven, under control of the control section 601, to drive a removable medium 631, such as a magnetic disk, an optical disk, a magneto-optical disk, or a semiconductor memory, which is attached to the drive 625, thereby reads out information (a program, data, etc.) recorded in the removable medium 631 and supplies the information to the control section 601 or the like.

As the image sensor 612 of the imaging device 600 thus configured, the stacked image sensor 510 which has been explained in the fifth embodiment is adopted. That is, the image sensor 612 is configured to execute encoding and decoding using the present technology. It is to be noted that, in a case encoding and decoding using the present technology are applied to an output of image data from the image sensor 612 (that is, in a case where the encoding section 551C is adopted), a decoding section that is equivalent to the decoding section 571A needs to be provided to the image processing section 613.

As a result of this, the image sensor 612 can restrain an average signal value deviation which is generated through encoding and decoding of an amplified signal group. That is, while restraining deterioration in the subjective image quality of a captured image obtained by high-digital gain imaging, for example, the imaging device 600 can restrain an increase in the production cost of the imaging device 600.

Figure 38:
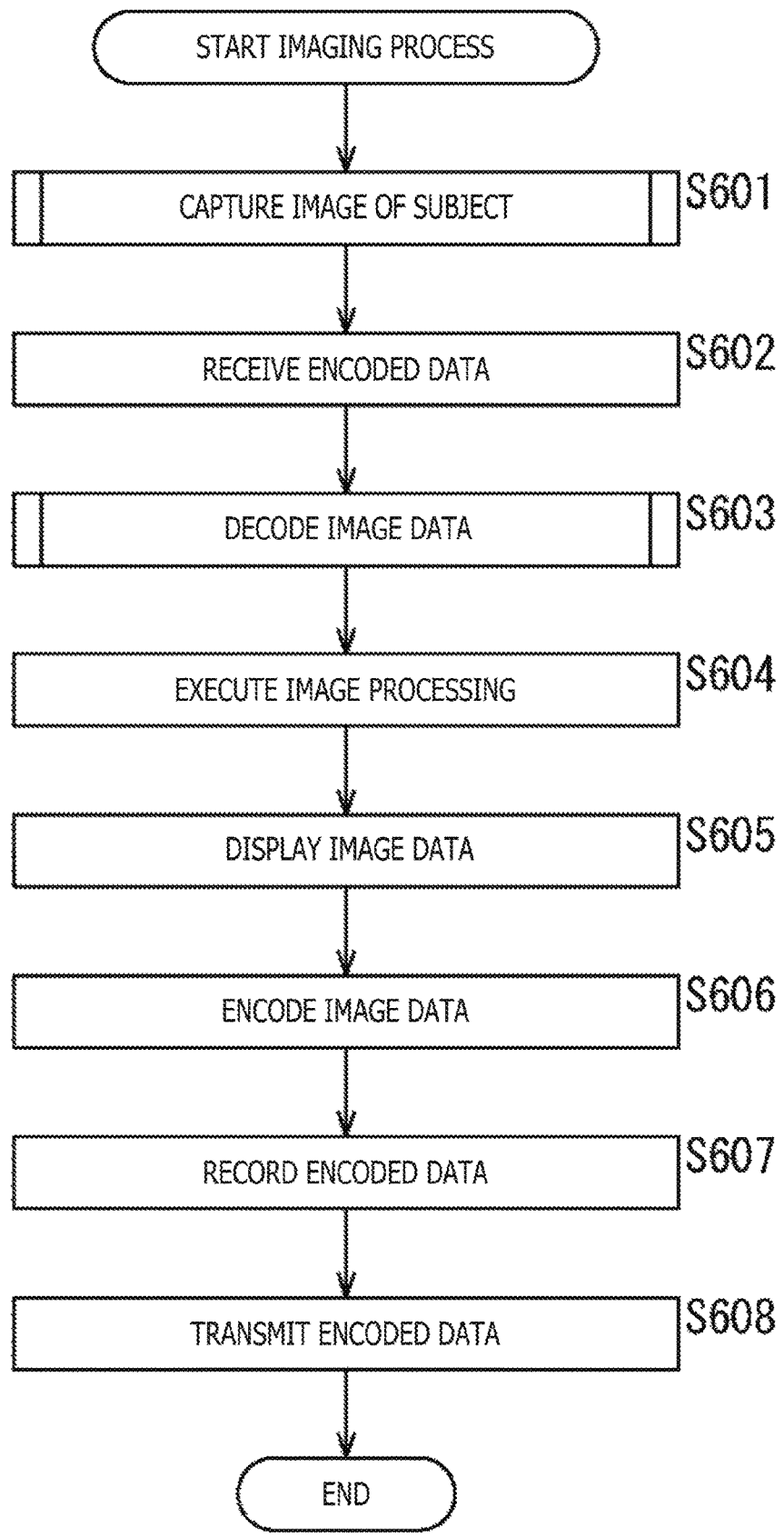
FIG. 38 is a flowchart for explaining an example of the flow of an imaging process.

An example of the flow of an imaging process which is executed by the imaging device 600 to capture an image of a subject, will be explained with reference to a flowchart in FIG. 38.

When the imaging process is started, the image sensor 612 of the imaging device 600 captures an image of a subject and generates image data (also referred to as captured image data) on the captured image, at step S601. It is to be noted that this step is executed in the way similar to that in the imaging process which has been explained with reference to the flowchart in FIG. 36. That is, the image sensor 612 executes prescribed image processing on the captured image data, encodes the data, and outputs the encoded data. It is to be noted that the image sensor 612 executes the image processing of encoding data on the captured image, recording the encoded data into the DRAM 561, and decompressing the captured image data by reading out the encoded data from the DRAM 561 and decoding the data, as appropriate.

The image sensor 612 executes such encoding and decoding in a way using the present technology. That is, the image sensor 612 executes such encoding and decoding by any one of the aforementioned methods #1 to #4.

At step S602, the image processing section 613 acquires the encoded data outputted from the image sensor 612.

At step S603, the image processing section 613 decodes the encoded data acquired at step S602. This step is executed in the way similar to that at step S507 (FIG. 36). That is, this step is executed by a method corresponding to that at step S508 (FIG. 36), that is, by a method the same as that at step S508 (FIG. 36) in any of the aforementioned methods #1 to #4.

At step S604, the image processing section 613 executes prescribed image processing on image data on the decoded image generated at step S603.

At step S605, the display section 615 acquires the image data via the codec processing section 614, and displays an image corresponding to the image data.

At step S606, the codec processing section 614 acquires the image data from the image processing section 613, and encodes the image data.

At step S607, the recording section 616 acquires the encoded data from the codec processing section 614, and records the data.

At step S608, the communication section 617 acquires the encoded data from the codec processing section 614, and transmits the data to the outside of the imaging device 600 (to a separate device).

When step S609 is completed, the imaging process is ended.

By executing the imaging process in the aforementioned manner, the imaging device 600 can restrain an average signal value deviation which is generated through encoding and decoding of an amplified signal group. That is, for example, while deterioration in the subjective image quality of a captured image obtained by high-digital gain imaging is restrained, an increase in the production cost of the imaging device 600 can be restrained.

It is to be noted that the configuration of the imaging device 600 is arbitrarily defined, and is not limited to the aforementioned example.

As examples to which the present technology is applied, the imaging element and the imaging device have been explained above. However, the present technology is applicable to any device or any system as long as the device or system executes fixed length encoding and decoding of an amplified signal group while involving quantization such as that disclosed in any one of PTL 1 to 4, for example.

For example, the present technology is also applicable to an image processing device that acquires image data from the outside without executing imaging and executes image processing thereon. In addition, a target to be encoded is arbitrarily defined, and thus, does not need to be image data. For example, an arbitrary detection signal of sounds, temperature, moisture, an acceleration, or the like, which is not regarding light, can be a target to be encoded. In addition, the present technology is also applicable to a device or a system that processes image data while considering that the image data is a set of light (brightness) detection results (detection signals), for example. For example, the present technology is also applicable to a device or a system that sets a black level on the basis of a set of detection signals.

9. Supplementary Note

<Computer>

A series of the aforementioned processes can be executed by hardware, or can be executed by software. In a case where the series of the processes is executed by software, a program constituting the software is installed into a computer. Here, examples of the computer include a computer incorporated in dedicated-hardware, and a general-purpose personal computer capable of executing various functions by installing various programs.

In the case where the series of the processes is executed by software, a device or system (e.g., the image processing system 100, the stacked image sensor 510, or the imaging device 600) is only required to have a configuration as a computer capable of executing the software. For example, in the imaging device 600, the control section 601 (FIG. 37) is only required to execute the series of the aforementioned processes by software by reading out a program from the recording section 616 or the like and executing the program.

In the case where the series of the aforementioned processes is executed by software, the program, etc. constituting the software may be installed from a recording medium, for example. For example, in the imaging device 600, the recording medium may include the removable medium 631 which is provided, separately from the device main body, in order to distribute the program etc. to users, and in which the program etc. is recorded. For example, the control section 601 may read out the program stored in the removable medium 631 attached to the drive 625, and install the program into the recording section 616 or the like.

In addition, the program may be provided via a wired/wireless transmission medium such as a local area network, the internet, or a digital satellite broadcast. For example, in the imaging device 600, the control section 601 may be configured to control the communication section 617 to receive the program provided via the transmission medium, and to install the program into the recording section 616 or the like.

Alternatively, the program may be installed in advance. For example, in the imaging device 600, the program may be installed in advance in the recording section 616, a ROM included in the control section 601, or the like.

<Application Target of Present Technology>

The present technology is applicable to an arbitrary image encoding and decoding method. That is, as long as no inconsistency with the present technology described so far is caused, specifications of the processes regarding image encoding and decoding are arbitrarily defined. The specifications are not limited to any of the aforementioned examples.

In addition, the case where the present technology is applied to an imaging device has been explained above, but the present technology is applicable to not only imaging devices, but also arbitrary devices (electronic devices). For example, the present technology is also applied to an image processing device or the like for executing image processing on a captured image obtained by high-digital gain imaging executed by means of another device.

In addition, the present technology can be implemented by any structure that is mounted in an arbitrary device or a device constituting the system, such as a processor (e.g., a video processor) serving as a system LSI (Large Scale Integration) or the like, a module (e.g., a video module) using a plurality of processors etc., a unit (e.g., a video unit) using a plurality of modules, a set (e.g., a video set) obtained by adding other functions to the unit (that is, the structure means a part of the device).

Moreover, the present technology is also applicable to a network system including a plurality of devices. For example, the present technology is applicable to a cloud service for providing image (video)-related services to arbitrary terminals such as computers, AV (Audio Visual) devices, mobile information processing terminals, or IoT (Internet of Things) devices.

It is to be noted that a system, a device, a processing section, etc. to which the present technology is applied, can be used for an arbitrary field pertaining to traffics, medicine, security, agriculture, stockbreeding, mining, cosmetic, industry, home electric appliances, weather, or nature monitoring. Further, an application thereof is also arbitrarily defined.

For example, the present technology is applicable to a system or a device for providing viewing content etc. In addition, for example, the present technology is applicable to a system and a device for traffic use such as monitoring of a traffic condition or control of automatic driving. Moreover, for example, the present technology is applicable to a system or a device for security use. Furthermore, for example, the present technology is applicable to a system and a device for automatic control of machines etc. Moreover, for example, the present technology is applicable to a system and a device for agricultural or stockbreeding use. Moreover, for example, the present technology is applicable to a system and a device for monitoring the states of nature such as volcanos, forests, or oceans and wildlife, etc. Moreover, for example, the present technology is applicable to a system and a device for sports use.

Others

In the present description, "flag" refers to information for discriminating a plurality of states from one another. The information encompasses not only information which is used to discriminating two states of true (1) and false (0) from each other, but also information for discriminating three or more states from one another. Therefore, the numbers that can be taken by the "flag" may be two values which are I/O, for example, or may be three or more values. That is, the number of bits constituting the "flag" is arbitrarily defined, and thus, may be 1 bit or a plurality of bits. In addition, regarding identification information (including a flag), it can be assumed that the identification information is contained into a bitstream, and also, information regarding the difference of the identification information from certain reference information is contained into a bitstream. Thus, the terms "flag" and "identification information" each encompass not only information thereof, but also information regarding the difference from reference information.

In addition, various types of information (meta data etc.) concerning encoded data (a bitstream) can be transmitted or recorded in any form as long as the information is associated with the encoded data. Here, the term "associate" means, for example, enabling use of one data set when processing the other data set (enabling establishment of a link therebetween). That is, data sets that are associated with each other may be integrated into a single data set, or may be formed as separate data sets. For example, information associated with encoded data (image) may be transmitted over a transmission path different from that for the encoded data (image). Further, for example, information associated with encoded data (image) may be recorded into a recording medium different from a recording medium in which the encoded data (image) is recorded (or in a different record area of the same recording medium). It is to be noted that the "association" may be performed for the entirety of data but for a part of the data. For example, an image and information corresponding to the image may be associated with each other by arbitrarily defined unit of, for example, a plurality of frames, one frame, or a part of a frame.

It is to be noted that, in the present description, the terms "synthesize," "multiplex," "add," "integrate," "include," "store," "place into," "put into," "insert," etc. each means gathering a plurality of things together, that is, for example, gathering encoded data and meta data into one data set, and thus, means one method for the aforementioned "association."

Furthermore, the embodiments of the present technology are not limited to the aforementioned embodiments, and various modifications can be made within the gist of the present technology.

In addition, the present technology can be implemented by any component that constitutes a device or system, such as a processor serving as a system LSI (Large Scale Integration) or the like, a module using a plurality of processors etc., a unit using a plurality of modules, a set obtained by adding other functions to the unit (that is, the component means a part of the device).

It is to be noted that, in the present description, a system refers to a set of a plurality of constituent elements (devices, modules (components), etc.). Whether or not the constituent elements are all included in the same casing does not matter. Therefore, both a set of a plurality of devices that are housed in different casings and are connected to one another over a network, and a single device having a plurality of modules housed in a single casing are referred to as system.

In addition, for example, the configuration explained above as a single device (or processing section) may be divided into a plurality of devices (or processing sections). Conversely, the configurations explained as a plurality of devices (or processing sections) may be formed into a single device (or processing section). Also, a configuration not described above may be added to the configurations of the devices (or processing sections). Moreover, as long as the configuration or operation in the entire system is substantially the same, a part of a certain device (or processing section) may be included in another device (or processing section).

In addition, for example, the present technology can have a configuration of cloud computing in which one function is shared and jointly processed by a plurality of devices over a network.

In addition, for example, the aforementioned program can be executed by an arbitrary device. In this case, it is sufficient that the device has necessary functions (functional blocks etc.) and is capable of acquiring necessary information.

In addition, for example, the steps of the flowcharts explained above may be executed by one device, or may be jointly executed by a plurality of devices. Moreover, in a case where a plurality of processes is included in one step, the one step may be executed by one device, or may be jointly executed by a plurality of devices. In other words, a plurality of processes included in one step may be executed like a plurality of steps. Conversely, a plurality of the steps in the above explanation may be collectively executed like one step.

It is to be noted that the program which is executed by a computer may be a program for executing the processes in accordance with the time-series order explained in the present description, or may be a program for executing the processes separately at necessary timings, such as each time a call is made. That is, as long as no inconsistency is produced, the steps may be executed in accordance with an order that is different from the aforementioned one. Moreover, steps written in the program may be executed in parallel with processes of another program, or may be executed in combination with processes of another program.

It is to be noted that a plurality of exemplifications of the present technology explained in the present description can be implemented independently as long as no inconsistency is produced. A plurality of arbitrarily defined exemplifications of the present technology can be implemented in combination. For example, a part or the whole of the present technology explained in any one of the embodiments can be implemented in combination with a part or the whole of the present technology explained in another embodiment. In addition, an arbitrarily defined part or the whole of the present technology can be implemented in combination with another technology that is has not been described above.

It is to be noted that the present technology also may have the following configurations.

(1)

An image processing device including:

an adaptive processing section that executes adaptive image processing of an image in which signal amplification has been executed; and an encoding section that executes simple encoding of the image having undergone the adaptive image processing executed by the adaptive processing section.

(2)

The image processing device according to (1), in which the adaptive processing section executes the imaging processing of adding, to each pixel value of the image, an offset value that is randomly set within a value range that depends on a gain value of the signal amplification executed on the image, and the encoding section executes simple encoding of the image in which the offset value has been added to each pixel value by the adaptive processing section.

(3)

The image processing device according to (2), in which the adaptive processing section adds, as the offset value, a pseudo random number corrected to fall within the value range that depends on the gain value, to each pixel value of the image.

(4)

The image processing device according to any one of (1) to (3), in which the adaptive processing section executes the image processing of subtracting, from each pixel value of the image, an offset value that is based on an average pixel value of the image and a quantization value of simple encoding to be executed by the encoding section, and the encoding section executes simple encoding of the image in which the offset value has been subtracted from each pixel value by the adaptive processing section.

(5)
The image processing device according to (4), in which the average pixel value includes an average pixel value of an image of a frame prior to a current frame which is a process target.
(6)
The image processing device according to (5), in which the quantization value includes a value that depends on a compression rate of the simple encoding.
(7)
The image processing device according to (5) or (6), in which
the quantization value is an average of quantization values, for respective pixels, of the simple encoding of the image of a frame prior to a current frame which is a process target.
(8)
The image processing device according to any one of (4) to (7), in which
for each color, the adaptive processing section subtracts the offset value from each pixel value of the image.
(9)
The image processing device according to (4), further including:
a decoding section that executes simple decoding of encoded data generated by the encoding section; and
an offset adding section that adds, to each pixel value of a decoded image generated by the decoding section, an offset value that is based on an average pixel value of the image and a quantization value of the simple encoding.
(10)
The image processing device according to any one of (1) to (9), in which
the adaptive processing section executes the image processing of setting a range of a quantization value of simple encoding to be executed by the encoding section, and
the encoding section executes simple encoding of the image on a basis of the range of a quantization value set by the adaptive processing section, and generates encoded data including information regarding the range of a quantization value.
(11)
The image processing device according to (10), in which the adaptive processing section sets the range of a quantization value according to a gain value of the signal amplification executed on the image.
(12)
The image processing device according to (10), further including:
a decoding section that executes simple decoding of the encoded data generated by the encoding section, on the basis of the information regarding the range of a quantization value included in the encoded data.
(13)
The image processing device according to any one of (1) to (12), in which
the adaptive processing section executes the image processing of dividing each pixel value of the image by a gain value of the signal amplification executed on the image, and
the encoding section executes simple encoding of the image in which each pixel value has been divided by the gain value by the adaptive processing section.
(14)
The image processing device according to (13), further including:
a decoding section that decodes encoded data generated by the encoding section; and a gain value multiplication section that multiplies, by the gain value, each pixel value of a decoded image generated by the decoding section.
(15)
The image processing device according to any one of (1) to (14), further including:
an amplification section that executes signal amplification on the image, in which
the adaptive processing section executes the adaptive image processing of the image in which signal amplification has been executed by the amplification section.
(16)
The image processing device according to any one of (1) to (15), further including:
a gain value setting section that sets a gain value of the signal amplification executed on the image.
(17)
The image processing device according to any one of (1) to (16), further including:
a recording section that records encoded data generated by the encoding section.
(18)
An image processing method including:
executing adaptive image processing of an image in which signal amplification has been executed; and
executing simple encoding of the image having undergone the adaptive image processing.
(19)
An imaging element including:
an imaging section that captures an image of a subject;
an adaptive processing section that executes adaptive image processing of the captured image which has been generated by the imaging section and in which signal amplification has been executed; and
an encoding section that executes simple encoding of the captured image having undergone the adaptive image processing executed by the adaptive processing section.
(20)
An imaging device including:
an imaging element including
an imaging section that captures an image of a subject,
an adaptive processing section that executes adaptive image processing of the captured image which has been generated by the imaging section and in which signal amplification has been executed, and
an encoding section that generates encoded data by executing simple encoding of the captured image having undergone the adaptive image processing executed by the adaptive processing section; and
a decoding section that executes simple decoding of the encoded data generated by the encoding section.

REFERENCE SIGNS LIST

100 Image processing system, 101 Control section, 102 Encoding-side structure, 103 Decoding-side structure, 111 Amplification section, 112 Random offset adding section, 113 Encoding section, 121 Decoding section, 141 Pseudo random number generation section, 142 Value range limiting section, 143 Computing section, 144 Clipping section, 171 Transmission section, 172 Reception section, 211 Subtraction offset setting section, 212 Computing section, 213 Clipping section, 221 Addition offset setting section, 222 Computing section, 223 Clipping section, 231 Average value measuring section, 232 Offset value selection section, 233 Offset value supply section, 251 Compression section, 252 Average value measuring section, 311 Quantization value range setting section, 411 Computing section, 421 Computing section, 510 Stacked image sensor, 511 to 513 Semiconductor substrate, 521, 522 Bus, 523 Interface, 530 Circuit substrate, 541 Light receiving section, 542 A/D conversion section, 551 Image processing section, 561 DRAM, 571 Image processing section, 600 Imaging device, 601 Control section, 610 Bus, 611 Optical section, 612 Image sensor, 613 Image processing section, 614 Codec processing section, 615 Display section, 616 Recording section, 617 Communication section, 621 Input section, 622 Output section, 625 Drive

The invention claimed is:

1. An image processing device, comprising:
 an adaptive processing section configured to execute adaptive image processing of an image in which signal amplification has been executed, wherein the adaptive image processing is executed to set a range of a quantization value of simple encoding; and
 an encoding section configured to:
  execute, based on the range of the quantization value, the simple encoding of the image having undergone the adaptive image processing, and
  generate, based on the execution of the simple encoding, encoded data that includes information regarding the range of the quantization value.

2. The image processing device according to claim 1, wherein
 the adaptive processing section is further configured to execute the adaptive imaging processing to add, to each pixel value of the image, an offset value that is randomly set within a value range that depends on a gain value of the signal amplification executed on the image, and
 the encoding section is further configured to execute the simple encoding of the image in which the offset value has been added to each pixel value.

3. The image processing device according to claim 2, wherein the adaptive processing section is further configured to add, as the offset value, a pseudo random number corrected to fall within the value range that depends on the gain value, to each pixel value of the image.

4. The image processing device according to claim 1, wherein
 the adaptive processing section is further configured to execute the adaptive image processing to subtract, from each pixel value of the image, an offset value that is based on an average pixel value of the image and the quantization value, and
 the encoding section is further configured to execute the simple encoding of the image in which the offset value has been subtracted from each pixel value.

5. The image processing device according to claim 4, wherein the average pixel value includes an average pixel value of an image of a frame prior to a current frame which is a process target.

6. The image processing device according to claim 5, wherein the quantization value includes a value that depends on a compression rate of the simple encoding.

7. The image processing device according to claim 5, wherein the quantization value is an average of quantization values, for respective pixels, of the simple encoding of the image of the frame prior to the current frame which is the process target.

8. The image processing device according to claim 4, wherein for each color, the adaptive processing section is further configured to subtract the offset value from each pixel value of the image.

9. The image processing device according to claim 4, further comprising:
 a decoding section configured to:
  execute simple decoding of the generated encoded data, and
  generate a decoded image based on the execution of the simple decoding; and
 an offset adding section configured to add, to each pixel value of the decoded image, the offset value that is based on the average pixel value of the image and the quantization value.

10. The image processing device according to claim 1, wherein the adaptive processing section is further configured to set the range of the quantization value according to a gain value of the signal amplification executed on the image.

11. The image processing device according to claim 1, further comprising a decoding section configured to execute simple decoding of the generated encoded data based on the information regarding the range of the quantization value included in the generated encoded data.

12. The image processing device according to claim 1, wherein
 the adaptive processing section is further configured to execute the adaptive image processing to divide each pixel value of the image by a gain value of the signal amplification executed on the image, and
 the encoding section is further configured to execute the simple encoding of the image in which each pixel value has been divided by the gain value.

13. The image processing device according to claim 12, further comprising:
 a decoding section configured to:
  execute simple decoding of the generated encoded data, and
  generate a decoded image based on the execution of the simple decoding; and
 a gain value multiplication section configured to multiply, by the gain value, each pixel value of the decoded image.

14. The image processing device according to claim 1, further comprising an amplification section configured to execute the signal amplification on the image.

15. The image processing device according to claim 1, further comprising a gain value setting section configured to set a gain value of the signal amplification executed on the image.

16. The image processing device according to claim 1, further comprising a recording section configured to record the generated encoded data.

17. An image processing method, comprising:
 executing adaptive image processing of an image in which signal amplification has been executed, wherein the adaptive image processing is executed for setting a range of a quantization value of simple encoding;
 executing, based on the range of the quantization value, the simple encoding of the image having undergone the adaptive image processing; and
 generating, based on the execution of the simple encoding, encoded data that includes information regarding the range of the quantization value.

18. An imaging element, comprising:
 an imaging section configured to capture an image of a subject;
 an adaptive processing section configured to execute adaptive image processing of the captured image in which signal amplification has been executed, wherein the adaptive image processing is executed to set a range of a quantization value of simple encoding; and an encoding section configured to:
    execute, based on the range of the quantization value, the simple encoding of the captured image having undergone the adaptive image processing, and
    generate, based on the execution of the simple encoding, encoded data that includes information regarding the range of the quantization value.

19. An imaging device, comprising:
an imaging element that includes:
    an imaging section configured to capture an image of a subject,
    an adaptive processing section configured to execute adaptive image processing of the captured image in which signal amplification has been executed, wherein the adaptive image processing is executed to set a range of a quantization value of simple encoding, and
    an encoding section configured to:
        execute, based on the range of the quantization value, the simple encoding of the captured image having undergone the adaptive image processing, and
        generate, based on the execution of the simple encoding, encoded data that includes information regarding the range of the quantization value; and
a decoding section configured to execute simple decoding of the generated encoded data.

* * * * *